US012406672B2

(12) United States Patent
Fu et al.

(10) Patent No.: US 12,406,672 B2
(45) Date of Patent: Sep. 2, 2025

(54) SYSTEMS AND METHODS FOR LIVE BROADCASTING OF CONTEXT-AWARE TRANSCRIPTION AND/OR OTHER ELEMENTS RELATED TO CONVERSATIONS AND/OR SPEECHES

(71) Applicant: Otter.ai, Inc., Mountain View, CA (US)

(72) Inventors: Yun Fu, Cupertino, CA (US); Tao Xing, San Jose, CA (US); Kaisuke Nakajima, Sunnyvale, CA (US); Brian Francis Williams, San Carlos, CA (US); James Mason Altreuter, Belmont, CA (US); Xiaoke Huang, Foster City, CA (US); Simon Lau, San Jose, CA (US); Sam Song Liang, Palo Alto, CA (US); Kean Kheong Chin, Santa Clara, CA (US); Wen Sun, San Francisco, CA (US); Julius Cheng, Cupertino, CA (US); Hitesh Anand Gupta, Santa Clara, CA (US)

(73) Assignee: Otter.ai, Inc., Mountain View, CA (US)

( * ) Notice: Subject to any disclaimer, the term of this patent is extended or adjusted under 35 U.S.C. 154(b) by 0 days.

(21) Appl. No.: 17/863,837

(22) Filed: Jul. 13, 2022

(65) Prior Publication Data
US 2022/0343918 A1    Oct. 27, 2022

Related U.S. Application Data

(63) Continuation of application No. 16/598,820, filed on Oct. 10, 2019, now Pat. No. 11,423,911.
(Continued)

(51) Int. Cl.
*G10L 17/02* (2013.01)
*G10L 15/04* (2013.01)
(Continued)

(52) U.S. Cl.
CPC .............. *G10L 17/02* (2013.01); *G10L 15/04* (2013.01); *G10L 15/183* (2013.01); *G10L 15/26* (2013.01);
(Continued)

(58) Field of Classification Search
CPC ....... G10L 17/02; G10L 15/04; G10L 15/183; G10L 15/26; G10L 17/00; H04H 20/95;
(Continued)

(56) References Cited

U.S. PATENT DOCUMENTS 6,088,669 A * 7/2000 Maes ...................... G10L 17/00
704/231
6,363,352 B1    3/2002 Dailey et al.
(Continued)

FOREIGN PATENT DOCUMENTS

CN      111164676 A *  5/2020 ........... G10L 15/063
JP      3376487         5/2001
(Continued)

OTHER PUBLICATIONS

Tur et al., "The CALO Meeting Assistant System," IEEE Transactions on Audio, Speech, and Language Processing, vol. 18, No. 6, pp. 1601-1611, Aug. 2010.
(Continued)

*Primary Examiner* — Edwin S Leland, III
(74) *Attorney, Agent, or Firm* — Faegre Drinker Biddle & Reath LLP

(57) ABSTRACT

Computer-implemented method and system for processing and broadcasting one or more moment-associating elements. For example, the computer-implemented method includes granting subscription permission to one or more subscribers; receiving the one or more moment-associating elements; transforming the one or more moment-associating elements into one or more pieces of moment-associating information;
(Continued)

and transmitting at least one piece of the one or more pieces of moment-associating information to the one or more subscribers. In certain examples, transforming the one or more moment-associating elements includes: segmenting the one or more moment-associating elements into a plurality of moment-associating segments; assigning a segment speaker for each segment of the plurality of moment-associating segments; transcribing the plurality of moment-associating segments into a plurality of transcribed segments; and generating the one or more pieces of moment-associating information based the plurality of transcribed segments and the segment speaker assigned for each segment of the plurality of moment-associating segments.

15 Claims, 28 Drawing Sheets

Related U.S. Application Data

(60) Provisional application No. 62/747,001, filed on Oct. 17, 2018.

(51) Int. Cl.
    *G10L 15/183*     (2013.01)
    *G10L 15/26*     (2006.01)
    *G10L 17/00*     (2013.01)
    *H04H 20/95*     (2008.01)
    *H04L 12/18*     (2006.01)

(52) U.S. Cl.
    CPC .............. *G10L 17/00* (2013.01); *H04H 20/95* (2013.01); *H04L 12/18* (2013.01); *H04L 12/1822* (2013.01); *H04L 12/1831* (2013.01)

(58) Field of Classification Search
    CPC .. H04L 12/18; H04L 12/1822; H04L 12/1831
    USPC ......................................................... 704/235
    See application file for complete search history.

(56) References Cited

U.S. PATENT DOCUMENTS

| | | | | |
|---|---|---|---|---|
| 6,434,520 | B1* | 8/2002 | Kanevsky | G10L 15/26 704/243 |
| 6,513,003 | B1* | 1/2003 | Angell | G10L 15/26 704/235 |
| 8,407,049 | B2 | 3/2013 | Cromack et al. | |
| 8,612,211 | B1* | 12/2013 | Shires | G10L 15/26 704/235 |
| 8,645,138 | B1* | 2/2014 | Weinstein | G10L 15/19 704/270.1 |
| 8,818,803 | B2 | 8/2014 | Weber | |
| 9,311,932 | B2 | 4/2016 | Carter | |
| 9,443,518 | B1 | 9/2016 | Gauci | |
| 9,571,652 | B1* | 2/2017 | Zeppenfeld | H04L 9/3231 |
| 10,339,918 | B2 | 7/2019 | Hofer et al. | |
| 10,388,272 | B1* | 8/2019 | Thomson | G10L 15/22 |
| 10,573,312 | B1* | 2/2020 | Thomson | G10L 15/22 |
| 10,616,278 | B1 | 4/2020 | Johansson et al. | |
| 10,630,733 | B2* | 4/2020 | Modai | H04L 12/1822 |
| 10,978,073 | B1* | 4/2021 | Fu | G10L 15/26 |
| 11,012,575 | B1 | 5/2021 | Leblang et al. | |
| 11,017,778 | B1* | 5/2021 | Thomson | H04M 3/42382 |
| 11,024,316 | B1* | 6/2021 | Fu | G10L 17/00 |
| 11,100,943 | B1* | 8/2021 | Fu | H04L 12/1822 |
| 11,222,185 | B2 | 1/2022 | Waibel | G10L 13/00 |
| 11,330,229 | B1 | 5/2022 | Crumley et al. | |
| 11,330,299 | B2* | 5/2022 | Huo | H04N 19/176 |
| 11,423,911 | B1* | 8/2022 | Fu | G10L 15/26 |
| 11,431,517 | B1* | 8/2022 | Lau | G10L 15/26 |
| 11,657,822 | B2* | 5/2023 | Fu | H04M 3/42391 704/270 |
| 11,676,623 | B1* | 6/2023 | Younes | H04L 65/403 704/235 |
| 11,869,508 | B2 | 1/2024 | Fu et al. | |
| 12,020,722 | B2 | 6/2024 | Fu et al. | |
| 12,080,299 | B2* | 9/2024 | Lau | G10L 17/02 |
| 12,182,502 | B1* | 12/2024 | Nakajima | G06F 40/169 |
| 2002/0099552 | A1 | 7/2002 | Rubin et al. | |
| 2004/0107256 | A1 | 6/2004 | Odenwald et al. | |
| 2004/0117446 | A1 | 6/2004 | Swanson | |
| 2005/0034079 | A1 | 2/2005 | Gunasekar et al. | |
| 2005/0152523 | A1* | 7/2005 | Fellenstein | H04M 3/565 379/202.01 |
| 2006/0149558 | A1* | 7/2006 | Kahn | G10L 15/063 704/278 |
| 2006/0182249 | A1 | 8/2006 | Archambault et al. | |
| 2007/0071206 | A1* | 3/2007 | Gainsboro | H04M 3/42221 379/168 |
| 2007/0106724 | A1 | 5/2007 | Gorti et al. | |
| 2007/0118374 | A1* | 5/2007 | Wise | G10L 21/06 704/235 |
| 2007/0183458 | A1 | 8/2007 | Bouazizi et al. | |
| 2008/0181417 | A1* | 7/2008 | Pereg | G10L 17/00 704/E11.001 |
| 2008/0293443 | A1* | 11/2008 | Pettinato | G06F 9/542 704/235 |
| 2008/0294434 | A1* | 11/2008 | Pettinato | H04N 21/4532 704/235 |
| 2008/0300872 | A1 | 12/2008 | Basu et al. | |
| 2009/0019367 | A1 | 1/2009 | Cavagnari et al. | |
| 2009/0030680 | A1* | 1/2009 | Mamou | G06F 16/685 704/235 |
| 2009/0210391 | A1* | 8/2009 | Hall | G06F 16/24578 |
| 2009/0240488 | A1 | 9/2009 | White et al. | |
| 2009/0306981 | A1 | 12/2009 | Cromack et al. | |
| 2009/0307189 | A1* | 12/2009 | Bobbitt | G06F 16/00 |
| 2010/0146438 | A1* | 6/2010 | Bush | G06Q 10/109 715/810 |
| 2011/0228922 | A1 | 9/2011 | Dhara et al. | |
| 2011/0307241 | A1* | 12/2011 | Waibel | G06F 40/44 704/2 |
| 2011/0320197 | A1* | 12/2011 | Conejero | G06F 16/61 704/E15.044 |
| 2012/0046936 | A1 | 2/2012 | Kandekar et al. | |
| 2012/0253805 | A1* | 10/2012 | Rajakumar | G10L 17/26 704/E15.001 |
| 2012/0275761 | A1* | 11/2012 | Li | H04N 9/8233 386/239 |
| 2012/0281921 | A1 | 11/2012 | Dowell | |
| 2012/0310644 | A1 | 12/2012 | Zimmerman et al. | |
| 2012/0323575 | A1* | 12/2012 | Gibbon | G06F 3/167 704/E17.001 |
| 2012/0324355 | A1 | 12/2012 | Mbenkum et al. | |
| 2013/0144603 | A1* | 6/2013 | Lord | H04L 67/306 704/235 |
| 2013/0300939 | A1* | 11/2013 | Chou | H04N 7/147 348/700 |
| 2013/0311177 | A1* | 11/2013 | Bastide | H04N 7/15 704/235 |
| 2013/0346077 | A1* | 12/2013 | Mengibar | G06F 16/211 704/235 |
| 2014/0029757 | A1* | 1/2014 | Aronowitz | G10L 17/00 381/59 |
| 2014/0134576 | A1* | 5/2014 | Edge | G09B 19/04 434/157 |
| 2014/0136999 | A1 | 5/2014 | Leibovich et al. | |
| 2014/0207449 | A1* | 7/2014 | Johnson | G10L 15/26 704/235 |
| 2015/0012844 | A1* | 1/2015 | Paulik | H04L 65/1096 715/753 |
| 2015/0206544 | A1* | 7/2015 | Carter | G10L 15/04 704/235 |
| 2015/0249747 | A1 | 9/2015 | Box et al. | |
| 2015/0255068 | A1* | 9/2015 | Kim | G10L 17/04 704/246 |

(56) References Cited

U.S. PATENT DOCUMENTS

| | | | |
|---|---|---|---|
| 2015/0310863 A1* | 10/2015 | Chen | G10L 15/26 704/235 |
| 2016/0004732 A1 | 1/2016 | Hsu et al. | |
| 2016/0014222 A1 | 1/2016 | Chen et al. | |
| 2016/0284354 A1* | 9/2016 | Chen | H04N 7/15 |
| 2016/0322049 A1* | 11/2016 | Bakshi | G06F 16/3329 |
| 2017/0068423 A1* | 3/2017 | Napolitano | H04N 21/41265 |
| 2017/0068670 A1* | 3/2017 | Orr | H04N 21/41265 |
| 2017/0070706 A1 | 3/2017 | Ursin et al. | |
| 2017/0169816 A1* | 6/2017 | Blandin | G06F 16/683 |
| 2017/0180780 A1 | 6/2017 | Jeffries | |
| 2017/0199934 A1 | 7/2017 | Nongplur | |
| 2017/0294184 A1 | 10/2017 | Bradley | |
| 2017/0301037 A1* | 10/2017 | Baughman | G06Q 10/10 |
| 2017/0329943 A1 | 11/2017 | Choi et al. | |
| 2017/0372693 A1 | 12/2017 | Rangarajan Sridhar et al. | |
| 2018/0007060 A1 | 1/2018 | Leblang et al. | |
| 2018/0012598 A1 | 1/2018 | Thirukovalluru et al. | |
| 2018/0032226 A1* | 2/2018 | Ryu | G06F 3/04883 |
| 2018/0061083 A1 | 3/2018 | Suzuki et al. | |
| 2018/0143956 A1* | 5/2018 | Skarbovsky | G06F 40/166 |
| 2018/0174108 A1* | 6/2018 | Kang | G06Q 10/04 |
| 2018/0197548 A1* | 7/2018 | Palakodety | G10L 17/06 |
| 2018/0315428 A1 | 11/2018 | Johnson et al. | |
| 2018/0316893 A1 | 11/2018 | Rosenberg et al. | |
| 2019/0073640 A1 | 3/2019 | Odezue et al. | |
| 2019/0273767 A1 | 9/2019 | Nelson et al. | |
| 2019/0341050 A1* | 11/2019 | Diamant | G06V 40/172 |
| 2019/0364009 A1 | 11/2019 | Joseph et al. | |
| 2020/0051582 A1 | 2/2020 | Gilson | |
| 2020/0145616 A1 | 5/2020 | Nassar | |
| 2020/0175961 A1* | 6/2020 | Thomson | G10L 15/28 |
| 2020/0228358 A1 | 7/2020 | Rampton | |
| 2020/0243095 A1 | 7/2020 | Adlersberg et al. | |
| 2020/0257587 A1 | 8/2020 | Chau et al. | |
| 2020/0311122 A1* | 10/2020 | Ramamurthy | G06N 20/20 |
| 2020/0365160 A1 | 11/2020 | Nassar et al. | |
| 2020/0403818 A1 | 12/2020 | Daredia et al. | |
| 2020/0412564 A1 | 12/2020 | Roedel et al. | |
| 2021/0021558 A1 | 1/2021 | Mahmoud et al. | |
| 2021/0044645 A1 | 2/2021 | Jayaweera | |
| 2021/0058263 A1 | 2/2021 | Fahrendorff et al. | |
| 2021/0058517 A1 | 2/2021 | Serbajlo et al. | |
| 2021/0092168 A1 | 3/2021 | Ranalli et al. | |
| 2021/0150211 A1* | 5/2021 | Ahmad Hambaly et al. | G10L 25/93 |
| 2021/0217420 A1* | 7/2021 | Fu | H04M 3/56 |
| 2021/0319797 A1* | 10/2021 | Fu | G10L 17/00 |
| 2021/0327454 A1* | 10/2021 | Fu | G10L 21/10 |
| 2021/0367802 A1 | 11/2021 | Yarlagadda | |
| 2021/0369042 A1 | 12/2021 | Gustman et al. | |
| 2021/0374391 A1* | 12/2021 | Jorasch | G06V 40/19 |
| 2021/0390144 A1 | 12/2021 | Ganesh | |
| 2021/0407520 A1 | 12/2021 | Neckermann et al. | |
| 2021/0409547 A1 | 12/2021 | Channapragada et al. | |
| 2022/0122436 A1 | 4/2022 | Volkerink et al. | |
| 2022/0343918 A1* | 10/2022 | Fu | G10L 17/02 |
| 2022/0353102 A1 | 11/2022 | Lau et al. | |
| 2022/0385758 A1 | 12/2022 | Tadesse et al. | |
| 2022/0398544 A1 | 12/2022 | Chung et al. | |
| 2022/0414130 A1 | 12/2022 | Master Ben-Dor | |
| 2023/0245660 A1 | 8/2023 | Fu et al. | |
| 2023/0267948 A1 | 8/2023 | Younes et al. | |
| 2023/0297765 A1 | 9/2023 | Vendrow | |
| 2023/0325611 A1 | 10/2023 | Garg et al. | |
| 2024/0037145 A1 | 2/2024 | Ziccardi et al. | |
| 2024/0087574 A1 | 3/2024 | Fu et al. | |
| 2024/0095440 A1 | 3/2024 | Rony et al. | |
| 2024/0127804 A1 | 4/2024 | Shirodkar et al. | |
| 2024/0170006 A1 | 5/2024 | Fu et al. | |
| 2024/0205037 A1 | 6/2024 | Callegari | |
| 2024/0338860 A1* | 10/2024 | Trzyna | G06F 40/44 |
| 2024/0340193 A1* | 10/2024 | Zhu | G06F 40/30 |
| 2024/0354493 A1* | 10/2024 | Nakajima | G10L 17/18 |
| 2024/0395254 A1* | 11/2024 | Fu | G10L 15/26 |
| 2024/0428800 A1* | 12/2024 | Lau | G10L 15/183 |
| 2025/0117128 A1 | 4/2025 | Omoigui | |

FOREIGN PATENT DOCUMENTS

| | | | | |
|---|---|---|---|---|
| JP | 2018190431 A | * | 11/2018 | G06F 16/3329 |
| JP | 6542983 B2 | * | 7/2019 | G06F 16/00 |

OTHER PUBLICATIONS

United States Patent and Trademark Office, Office Action mailed Feb. 23, 2022, in U.S. Appl. No. 17/195,202.

United States Patent and Trademark Office, Office Action mailed Jul. 14, 2022, in U.S. Appl. No. 17/195,202.

United States Patent and Trademark Office, Office Action mailed Jun. 24, 2022, in U.S. Appl. No. 17/678,676.

United States Patent and Trademark Office, Office Action mailed Oct. 14, 2022, in U.S. Appl. No. 17/678,676.

United States Patent and Trademark Office, Notice of Allowance mailed Jan. 12, 2023, in U.S. Appl. No. 17/195,202.

United States Patent and Trademark Office, Office Action mailed Dec. 8, 2022, in U.S. Appl. No. 17/242,465.

United States Patent and Trademark Office, Office Action mailed Dec. 7, 2022, in U.S. Appl. No. 17/863,881.

Basu et al., "An Overview of Speaker Diarization: Approaches, Resources and Challenges," 2016 Conference of The Oriental Chapter of International Committee for Coordination and Standardization of Speechx Databases and Assessment Technique (O-COCOSDA), Bali, Indonesia, Oct. 26-28, 2016.

United States Patent and Trademark Office, Office Action mailed May 11, 2023, in U.S. Appl. No. 17/210,108.

United States Patent and Trademark Office, Office Action mailed Apr. 5, 2023, in U.S. Appl. No. 17/242,465.

United States Patent and Trademark Office, Office Action mailed Jul. 5, 2023, in U.S. Appl. No. 17/863,881.

United States Patent and Trademark Office, Office Action mailed Jun. 8, 2023, in U.S. Appl. No. 18/127,343.

United States Patent and Trademark Office, Notice of Allowance mailed Oct. 12, 2023, in U.S. Appl. No. 17/210,108.

United States Patent and Trademark Office, Office Action mailed Oct. 24, 2023, in U.S. Appl. No. 17/863,881.

United States Patent and Trademark Office, Office Action mailed Sep. 20, 2023, in U.S. Appl. No. 18/127,343.

United States Patent and Trademark Office, Notice of Allowance mailed Dec. 13, 2023, in U.S. Appl. No. 18/127,343.

United States Patent and Trademark Office, Office Action mailed Nov. 15, 2023, in U.S. Appl. No. 18/131,982.

United States Patent and Trademark Office, Notice of Allowance mailed Mar. 25, 2024, in U.S. Appl. No. 18/127,343.

United States Patent and Trademark Office, Notice of Allowance mailed Aug. 15, 2024, in U.S. Appl. No. 18/127,343.

United States Patent and Trademark Office, Office Action mailed Apr. 4, 2024, in U.S. Appl. No. 18/131,982.

United States Patent and Trademark Office, Office Action mailed Jul. 26, 2024, in U.S. Appl. No. 18/131,982.

United States Patent and Trademark Office, Office Action mailed Mar. 25, 2024, in U.S. Appl. No. 18/140,981.

United States Patent and Trademark Office, Notice of Allowance mailed Aug. 5, 2024, in U.S. Appl. No. 18/140,981.

United States Patent and Trademark Office, Office Action mailed Aug. 15, 2024, in U.S. Appl. No. 18/514,666.

United States Patent and Trademark Office, Office Action mailed Mar. 29, 2024, in U.S. Appl. No. 18/438,145.

United States Patent and Trademark Office, Notice of Allowance mailed Jul. 23, 2024, in U.S. Appl. No. 18/438,145.

United States Patent and Trademark Office, Office Action mailed Sep. 10, 2024, in U.S. Appl. No. 18/673,235.

United States Patent and Trademark Office, Office Action mailed Aug. 13, 2024, in U.S. Appl. No. 18/744,259.

United States Patent and Trademark Office, Office Action mailed Jan. 22, 2025, in U.S. Appl. No. 18/131,982.

(56) References Cited

OTHER PUBLICATIONS

United States Patent and Trademark Office, Notice of Allowance mailed Oct. 10, 2024, in U.S. Appl. No. 18/140,981.
United States Patent and Trademark Office, Office Action mailed Jan. 24, 2025, in U.S. Appl. No. 18/514,666.
United States Patent and Trademark Office, Office Action mailed Oct. 11, 2024, in U.S. Appl. No. 18/438,145.
United States Patent and Trademark Office, Office Action mailed Feb. 6, 2025, in U.S. Appl. No. 18/438,145.
United States Patent and Trademark Office, Office Action mailed Jan. 28, 2025, in U.S. Appl. No. 18/673,235.
United States Patent and Trademark Office, Office Action mailed Feb. 7, 2025, in U.S. Appl. No. 18/744,259.
United States Patent and Trademark Office, Office Action mailed Jan. 29, 2025, in U.S. Appl. No. 18/737,530.
United States Patent and Trademark Office, Notice of Allowance mailed Jun. 23, 2025, in U.S. Appl. No. 18/131,982.
United States Patent and Trademark Office, Notice of Allowance mailed Apr. 30, 2025, in U.S. Appl. No. 18/140,981.
United States Patent and Trademark Office, Notice of Allowance mailed Apr. 25, 2025, in U.S. Appl. No. 18/514,666.
United States Patent and Trademark Office, Notice of Allowance mailed Jul. 8, 2025, in U.S. Appl. No. 18/673,235.
United States Patent and Trademark Office, Notice of Allowance mailed Jul. 8, 2025, in U.S. Appl. No. 18/737,530.

* cited by examiner

SYSTEMS AND METHODS FOR LIVE BROADCASTING OF CONTEXT-AWARE TRANSCRIPTION AND/OR OTHER ELEMENTS RELATED TO CONVERSATIONS AND/OR SPEECHES

1. CROSS-REFERENCES TO RELATED APPLICATIONS

This application is a continuation of U.S. patent application Ser. No. 16/598,820, filed Oct. 10, 2019, which claims priority to U.S. Provisional Patent Application No. 62/747,001, filed Oct. 17, 2018, incorporated by reference herein for all purposes.

2. BACKGROUND OF THE INVENTION

Certain embodiments of the present invention are directed to signal processing. More particularly, some embodiments of the invention provide systems and methods for capturing, processing, and rendering one or more context-aware moment-associating elements such as one or more speeches and/or one or more photos. Merely by way of example, some embodiments of the invention have been applied to conversations captured in audio form. For example, some embodiments of the invention provide methods and systems for live broadcasting context-aware transcription and/or other elements related to conversations and/or speeches. But it would be recognized that the invention has a much broader range of applicability.

Conversations, such as human-to-human conversations, include information that is often difficult to comprehensively, efficiently, and accurately extract, using conventional methods and systems. For example, conventional note-taking performed during a conversation not only distracts the note-taker from the conversation but can also lead to inaccurate recordation of information due to human-error, such as for human's inability to multitask well and process information efficiently with high accuracy in real time.

Hence it is highly desirable to provide systems and methods for capturing, processing, and rendering conversations (e.g., in an automatic manner) to increase the value of conversations, such as human-to-human conversations, at least by increasing the comprehensiveness and accuracy of information extractable from the conversations.

3. BRIEF SUMMARY OF THE INVENTION

Certain embodiments of the present invention are directed to signal processing. More particularly, some embodiments of the invention provide systems and methods for capturing, processing, and rendering one or more context-aware moment-associating elements such as one or more speeches and/or one or more photos. Merely by way of example, some embodiments of the invention have been applied to conversations captured in audio form. For example, some embodiments of the invention provide methods and systems for live broadcasting context-aware transcription and/or other elements related to conversations and/or speeches. But it would be recognized that the invention has a much broader range of applicability.

In various embodiments, a computer-implemented method for processing and broadcasting one or more moment-associating elements includes: granting subscription permission to one or more subscribers; receiving the one or more moment-associating elements; transforming the one or more moment-associating elements into one or more pieces of moment-associating information; and transmitting at least one piece of the one or more pieces of moment-associating information to the one or more subscribers. In certain examples, the transforming the one or more moment-associating elements into one or more pieces of moment-associating information includes: segmenting the one or more moment-associating elements into a plurality of moment-associating segments; assigning a segment speaker for each segment of the plurality of moment-associating segments; transcribing the plurality of moment-associating segments into a plurality of transcribed segments; and generating the one or more pieces of moment-associating information based at least in part on the plurality of transcribed segments and the segment speaker assigned for each segment of the plurality of moment-associating segments.

In various embodiments, a system for processing and broadcasting one or more moment-associating elements includes: a permission module configured to grant subscription permission to one or more subscribers; a receiving module configured to receive the one or more moment-associating elements; a transforming module configured to transform the one or more moment-associating elements into one or more pieces of moment-associating information; and a transmitting module configured to transmit at least one piece of the one or more pieces of moment-associating information to the one or more subscribers. In certain examples, the transforming module is further configured to: segment the one or more moment-associating elements into a plurality of moment-associating segments; assign a segment speaker for each segment of the plurality of moment-associating segments; transcribe the plurality of moment-associating segments into a plurality of transcribed segments; and generate the one or more pieces of moment-associating information based at least in part on the plurality of transcribed segments and the segment speaker assigned for each segment of the plurality of moment-associating segments.

In various embodiments, a non-transitory computer-readable medium with instructions stored thereon, that when executed by a processor, perform the processes including granting subscription permission to one or more subscribers; receiving the one or more moment-associating elements; transforming the one or more moment-associating elements into one or more pieces of moment-associating information; and transmitting at least one piece of the one or more pieces of moment-associating information to the one or more subscribers. In certain examples, transforming the one or more moment-associating elements into one or more pieces of moment-associating information includes: segmenting the one or more moment-associating elements into a plurality of moment-associating segments; assigning a segment speaker for each segment of the plurality of moment-associating segments; transcribing the plurality of moment-associating segments into a plurality of transcribed segments; and generating the one or more pieces of moment-associating information based at least in part on the plurality of transcribed segments and the segment speaker assigned for each segment of the plurality of moment-associating segments.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to signal processing. More particularly, some embodiments of the invention provide systems and methods for capturing, processing, and rendering one or more context-aware moment-associating elements such as one or more speeches and/or one or more photos. Merely by way of example, some embodiments of the invention have been applied to conversations captured in audio form. For example, some embodiments of the invention provide methods and systems for live broadcasting context-aware transcription and/or other elements related to conversations and/or speeches. But it would be recognized that the invention has a much broader range of applicability.

Figure 1:
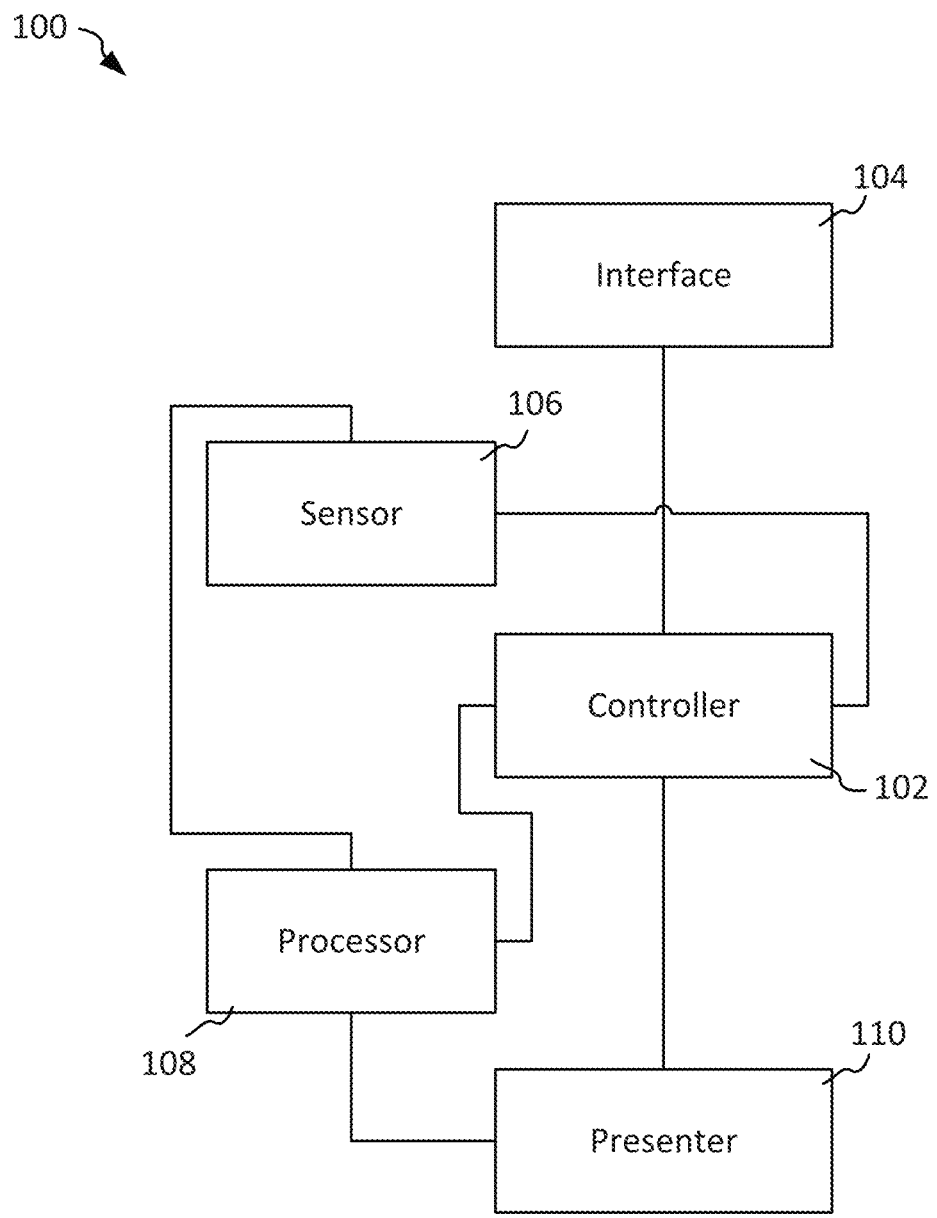
FIG. 1 is a simplified diagram showing a system for processing and presenting one or more conversations according to some embodiments of the present invention.

FIG. 1 is a simplified diagram showing a system for processing and presenting one or more conversations according to some embodiments of the present invention. This diagram is merely an example, which should not unduly limit the scope of the claims. One of ordinary skill in the art would recognize many variations, alternatives, and modifications. The system 100 includes a controller 102, an interface 104, a sensor 106, a processor 108, and a presenter 110. In some examples, the presenter 110 includes a mobile device, a web browser, a computer, a watch, a phone, a tablet, a robot, a projector, a television, and/or a display. In certain examples, the presenter 110 includes part of a mobile device, part of a web browser, part of a computer, part of a watch, part of a phone, part of a tablet, part of a robot, part of a projector, part of a television, and/or part of a display. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the controller 102 is configured to receive and/or send one or more instructions to other components of the system 100. For example, the controller 102 is configured to receive a first instruction from the interface 104 and send a second instruction to the sensor 106. In some examples, the controller 102 is or is part of a computing device (e.g., a computer, a phone, a laptop, a tablet, a watch, a television, a recording device, and/or a robot). In some embodiments, the controller includes hardware (e.g., a processor, a memory, a transmitter, and/or a receiver) and/or software for receiving, transmitting, and/or transforming instructions.

According to some embodiments, the interface 104 includes a user interface and/or is configured to receive a user instruction from a user of the system 100 and send a system instruction to one or more other components of the system 100 (e.g., the controller 102). For example, the interface includes a touchscreen, a button, a keyboard, a dialer (e.g., with number pad), an audio receiver, a gesture receiver, an application such as Otter for IOS or Android, and/or a webpage. In another example, the user is a human or another hardware and/or software system. In some embodiments, the interface 104 is configured to receive a first start instruction (e.g., when a user taps a start-record button in a mobile application) and to send a second start instruction to the controller 102 which in turn sends a third start instruction to, for example, the sensor 106. In some embodiments, the interface 104 is controlled by the controller 102 to provide one or more selectable actions (e.g., by the user). For example, the controller 102 controls the interface 104 to display a search bar and/or a record button for receiving instructions such as user instructions. In some embodiments, the interface 104 is communicatively coupled to the controller 102 and/or structurally contained or included in a common device (e.g., a phone).

In some embodiments, the sensor 106 is configured to receive an instruction and sense, receive, collect, detect, and/or capture a conversation in audio form (e.g., an audio file and/or an audio signal). For example, the sensor 106 includes an audio sensor and is configured to capture a conversation in audio form, such as to record a conversation (e.g., a human-to-human conversation). In some examples, the audio sensor is a microphone, which is included as part of a device (e.g., a mobile phone) and/or a separate component coupled to the device (e.g., the mobile phone), and the device (e.g., the mobile phone) includes one or more components of the system 100 (e.g., controller 102). In some examples, the human-to-human conversation captured by the sensor 106 is sent (e.g., transmitted) to other components of the system 100. For example, the audio-form conversation captured by the sensor 106 (e.g., the audio recorded by the sensor 106) is sent to the processor 108 of the system 100. In some embodiments, the sensor 106 is communicatively coupled to the controller 102 such that the sensor 106 is configured to send a status signal (e.g., a feedback signal) to the controller 102 to indicate whether the sensor 106 is on (e.g., recording or capturing) or off (e.g., not recording or not capturing).

According to some embodiments, the processor 108 is configured to receive input including data, signal, and/or information from other components of the system 100, and to process, transform, transcribe, extract, and/or summarize the received input (e.g., audio recording). In some examples, the processor 108 is further configured to send, transmit, and/or present the processed output (e.g., transformed conversation). For example, the processor 108 is configured to receive the captured audio-form conversation (e.g., the audio recorded by the sensor 106) from the sensor 106. As an example, the processor 108 is configured to receive the conversation in audio form (e.g., an audio file and/or an audio signal) from the sensor 106. In some examples, the processor 108 is configured to be controlled by the controller 102, such as to process the data, signal, and/or information transmitted by the sensor 106, when an instruction sent from the controller 102 is received by the processor 108. In some embodiments, the processor 108 includes an automated speech recognition (ASR) system that is configured to automatically transform and/or transcribe a conversation (e.g., a captured conversation sent from the sensor 106), such as transforming the conversation from audio recording to synchronized transcription.

In some embodiments, the processor 108 is communicatively coupled to the controller 102 such that the processor 108 is configured to send a status signal (e.g., a feedback signal) to the controller 102 to indicate whether the processor 108 is processing or idling and/or to indicate a progress of a processing job. In some examples, the processor 108 includes an on-board processor of a client device such as a mobile phone, a tablet, a watch, a wearable, a computer, a television, and/or a robot. In some examples, the processor 108 includes an external processor of a server device and/or an external processor of another client device, such that the capturing (e.g., by the sensor 106) and the processing (e.g., by the processor 108) of the system 100 are performed with more than one device. For example, the sensor 106 is a microphone on a mobile phone (e.g., located at a client position) and is configured to capture a phone conversation in audio form, which is transmitted (e.g., wirelessly) to a server computer (e.g., located at a server position). For example, the server computer (e.g., located at a server position) includes the processor 108 configured to process the input (e.g., an audio file and/or an audio signal) that is sent by the sensor 106 and received by the processor 108.

According to some embodiments, the processor 108 is configured to output processed data, signal, and/or information, to the presenter 110 (e.g., a display) of the system 100. In some examples, the output is a processed or transformed form of the input received by the processor 108 (e.g., an audio file and/or an audio signal sent by the sensor 106). For example, the processor 108 is configured to generate a transformed conversation and send the transformed conversation to the presenter 110 (e.g., a display) of the system 100. As an example, the processor 108 is configured to output synchronized text accompanied by a timestamped audio recording by transforming the conversation that is captured in audio form (e.g., captured by the sensor 106). In some embodiments, the processing and/or transforming performed by the processor 108 is real-time or near real-time. In some embodiments, the processor 108 is configured to process a live recording (e.g., a live recording of a human-to-human conversation) and/or a pre-recording (e.g., a pre-recording of a human-to-human conversation).

In some embodiments, the presenter 110 is configured to present, display, play, project, and/or recreate the conversation that is captured, for example, by the sensor 106, before and/or after transformation by the processor 108. For example, the presenter 110 (e.g., a display) is configured to receive the transformed conversation from the processor 108 and present the transformed conversation. As an example, the presenter 110 (e.g., a display) receives the captured conversation from the processor 108 before and/or after input (e.g., an audio file and/or an audio signal) to the processor 108 is transformed by the processor 108 into output (e.g., transformed conversation).

In some examples, the presenter 110 is or is part of a mobile device, a web browser, a computer, a watch, a phone, a tablet, a robot, a projector, a television, and/or a display. In some embodiments, the presenter 110 is provided similarly to the interface 104 by the same device. In some examples, a mobile phone is configured to provide both the interface 104 (e.g., touchscreen) and the presenter 110 (e.g., display).

In certain examples, the interface 104 (e.g., touchscreen) of the mobile phone is configured to also function as the presenter 110 (e.g., display).

In certain embodiments, the presenter 110 includes a presenter interface configured for a user, an analyzer, and/or a recipient to interact with, edit, and/or manipulate the presented conversation. In some examples, the presenter 110 is communicatively coupled to the controller 102 such that the controller 102 provides instructions to the presenter 110, such as to switch the presenter 110 on (e.g., presenting a transformed conversation) and/or switch the presenter 110 off.

As discussed above and further emphasized here, FIG. 1 is merely an example, which should not unduly limit the scope of the claims. One of ordinary skill in the art would recognize many variations, alternatives, and modifications. In certain examples, the system 100 further includes other components and/or features in addition to the controller 102, the interface 104, the sensor 106, the processor 108, and/or the presenter 110. For example, the system 100 includes one or more sensors additional to the sensor 106, such as a camera, an accelerometer, a temperature sensor, a proximity sensor, a barometer, a biometric sensor, a gyroscope, a magnetometer, a light sensor, and/or a positioning system (e.g. a GPS).

Figure 2:
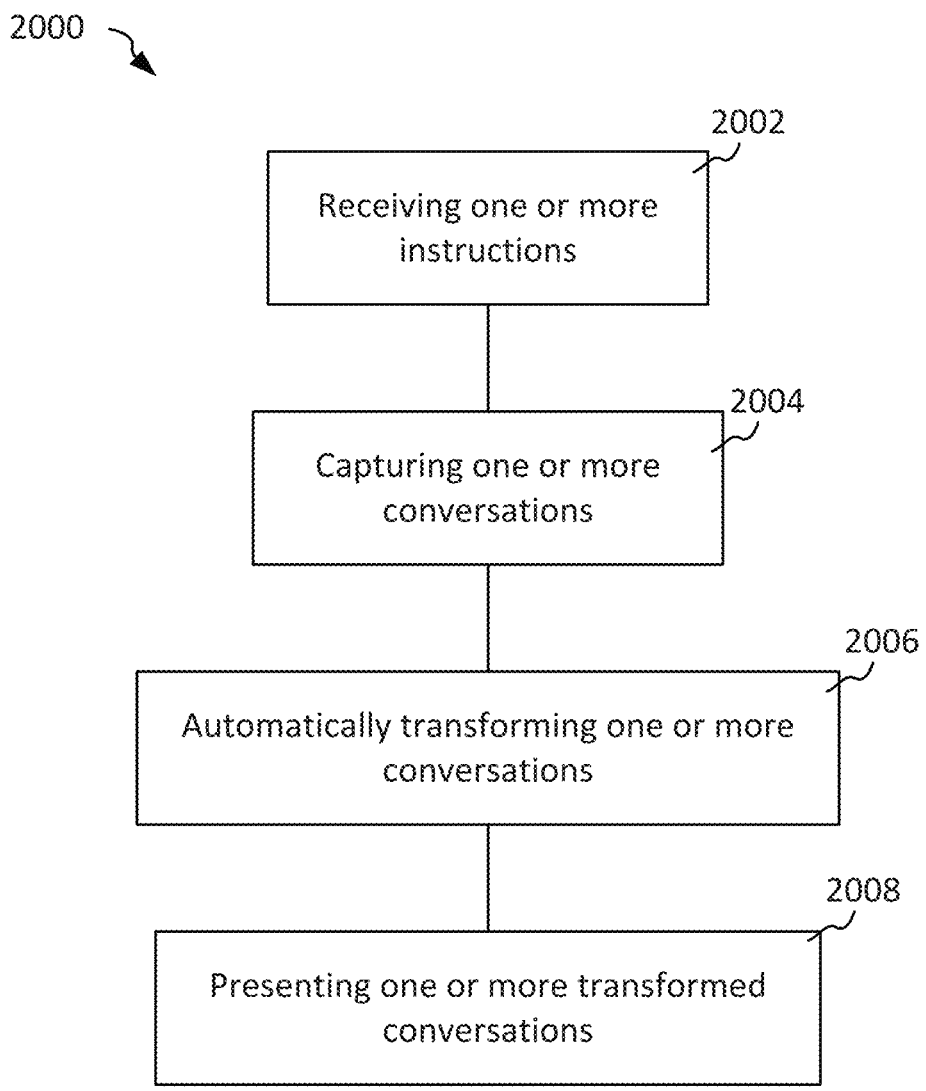
FIG. 2 is a simplified diagram showing a method for processing and presenting one or more conversations according to some embodiments of the present invention.

FIG. 2 is a simplified diagram showing a method for processing and presenting one or more conversations according to some embodiments of the present invention. This diagram is merely an example, which should not unduly limit the scope of the claims. One of ordinary skill in the art would recognize many variations, alternatives, and modifications. The method 2000 includes process 2002 for receiving one or more instructions, process 2004 for capturing one or more conversations, process 2006 for automatically transforming one or more conversations, and process 2008 for presenting one or more transformed conversations. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some examples, some or all processes (e.g., steps) of the method 2000 are performed by the system 100. In certain examples, some or all processes (e.g., steps) of the method 2000 are performed by a computer and/or a processor directed by a code. For example, a computer includes a server computer and/or a client computer (e.g., a smartphone). In some examples, some or all processes (e.g., steps) of the method 2000 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone). As an example, instructions included by a non-transitory computer-readable medium are executed by a processor including a processor of a server computer and/or a processor of a client computer (e.g., a smartphone).

At the process 2002, one or more instructions are received. In some examples, one or more instructions are provided by a user (e.g., a human, and/or a hardware and/or software system) and received by one or more components of the system 100 described above, such as received by the interface 104, the controller 102, the sensor 106, the processor 108, and/or the presenter 110. For example, the one or more instructions include a direct instruction (e.g., when the instruction is provided directly to a component) and/or an indirect instruction (e.g., when the instruction is provided to a gateway component which then instructs the component of interest to perform a process).

In certain examples, the one or more instructions cause the controller 102 to switch the sensor 106 between a capturing state and an idling state. For example, in the capturing state, the sensor 106 captures one or more conversations. In another example, in the idling state, the sensor 106 does not capture any conversation. In some examples, receiving a direct instruction includes a user directly switching on the sensor 106 to start the capturing of a conversation. In certain examples, receiving an indirect instruction includes receiving a start instruction via the interface 104, which then instructs the controller 102 to instruct the sensor 106 to start capturing a conversation.

At the process 2004, one or more conversations (e.g., one or more human-to-human conversations) are captured. In some examples, one or more conversations (e.g., a meeting conversation and/or a phone conversation) are captured by live recording via the sensor 106 (e.g., a microphone, a phone, a receiver, and/or a computing device). In certain examples, one or more conversations are captured by loading (e.g., by wire and/or wirelessly) one or more conversations in audio form (e.g., a .mp3 file, a .wav file, and/or a .m4a file). In some embodiments, capturing one or more conversations include capturing an incoming and/or outgoing phone conversation. In some embodiments, capturing one or more conversations includes capturing minutes, notes, ideas, and/or action items (e.g., of a meeting). In some embodiments, capturing one or more conversations includes capturing metadata corresponding to the one or more conversations, and the metadata include date of capture, time of capture, duration of capture, and/or title of the capture (e.g., a title that is entered via the interface 104).

In some embodiments, capturing one or more conversations includes utilizing one or more components (e.g., the sensor 106, the controller 102, the processor 108, and/or the interface 104) of the system 100 and/or utilizing one or more components external to the system 100. In some examples, the sensor 106 of the system 100 is configured to capture a live conversation. In certain examples, the controller 102 and/or the processor 108 are configured to receive a pre-recorded conversation (e.g., a .mp3 file, a .wav file, and/or a .m4a file). In some examples, the interface 104 is configured to capture metadata associated to the conversation. In certain examples, a clock (e.g., of the system 100 or external to the system 100) is configured to provide date and time information associated to the conversation.

At the process 2006, one or more conversations (e.g., the one or more conversations captured at the process 2004) are transformed (e.g., transcribed, extracted, converted, summarized, and/or processed) automatically. In some examples, the captured conversations are transformed by the processor 108. In certain examples, the process 2006 is implemented according to FIG. 3.

Figure 3:
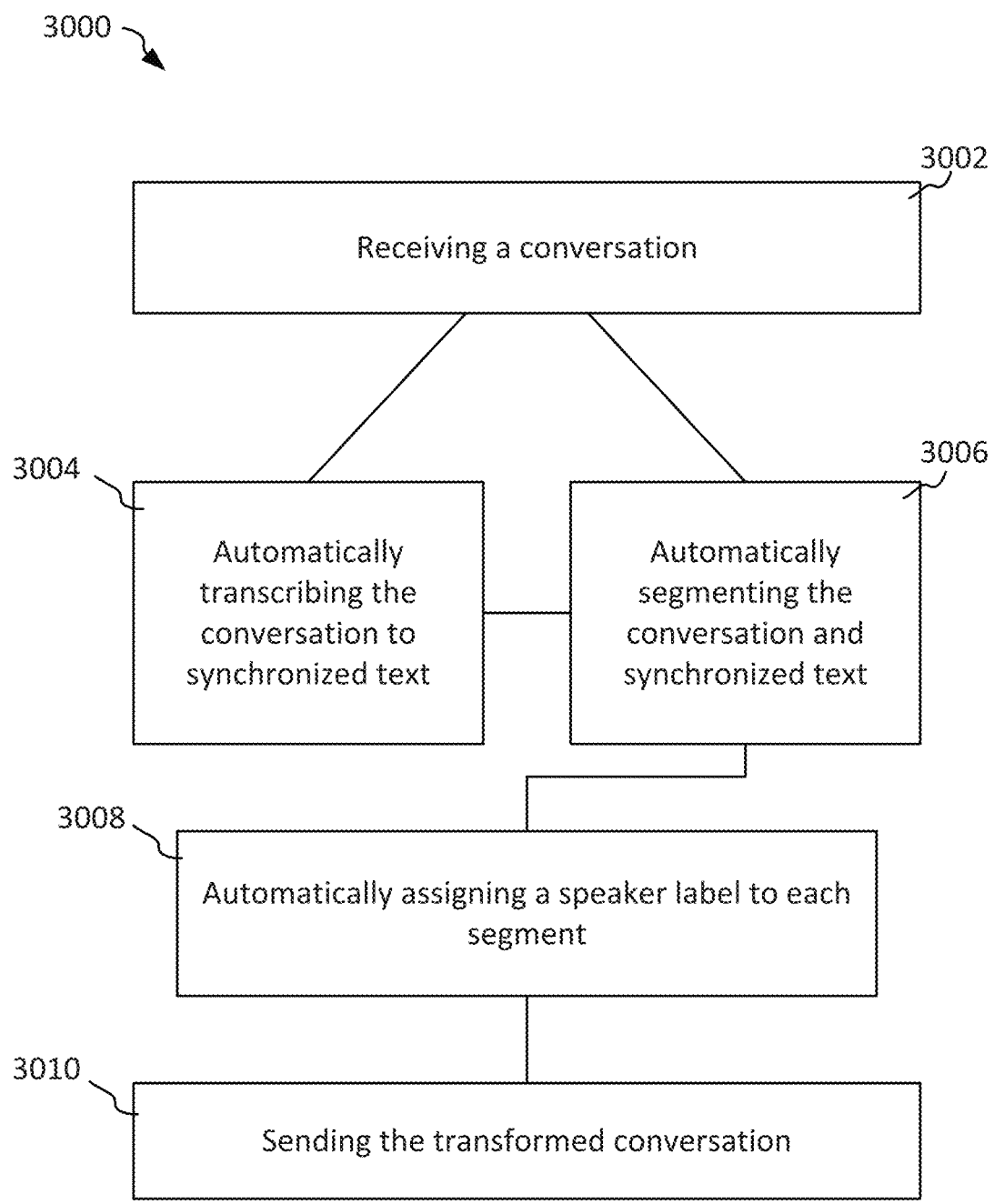
FIG. 3 is a simplified diagram showing the process for automatically transforming one or more conversations as shown in FIG. 2 according to some embodiments of the present invention.

FIG. 3 is a simplified diagram showing the process 3000 for automatically transforming one or more conversations according to some embodiments of the present invention. This diagram is merely an example, which should not unduly limit the scope of the claims. One of ordinary skill in the art would recognize many variations, alternatives, and modifications. The process 3000 includes process 3002 for receiving a conversation, process 3004 for automatically transcribing the conversation to synchronized text (e.g., synchronized transcript), process 3006 for automatically segmenting the conversation in audio form and the synchronized text, process 3008 for automatically assigning a speaker label to each conversation segment, and process 3010 for sending the transformed conversation (e.g., including synchronized text with speaker-labeled conversation segments). Although the above has been shown using a selected group of processes for the process 3000, there can be many alternatives, modifications, and variations. For example, some of the processes may be expanded and/or combined. Other processes may be inserted to those noted above. Depending upon the embodiment, the sequence of processes may be interchanged with others replaced.

In some examples, some or all processes (e.g., steps) of the process 3000 are performed by the system 100. In certain examples, some or all processes (e.g., steps) of the process 206 are performed by a computer and/or a processor directed by a code. For example, a computer includes a server computer and/or a client computer (e.g., a smartphone). In some examples, some or all processes (e.g., steps) of the process 3000 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone). As an example, instructions included by a non-transitory computer-readable medium are executed by a processor including a processor of a server computer and/or a processor of a client computer (e.g., a smartphone).

At the process 3002, a conversation (e.g., a human-to-human conversation) is received. For example, a conversation is received by the system 100, such as by the processor 108. In some embodiments, the conversation (e.g., a human-to-human conversation) received in process 3002 is in audio form (e.g., sound wave and/or digital signal) and is captured by and/or sent from the sensor 106 of the system 100. In some embodiments, the conversation received in process 3002 is a live recording (e.g., a live recording of a human-to-human conversation). In some examples, the conversation is received (e.g., by the processor 108 of the system 100) continuously and/or intermittently (e.g., via fixed frequency push). In certain examples, the conversation is received (e.g., by the processor 108 of the system 100) in real-time and/or in near real-time (e.g., with a time delay less than 5 minutes, 1 minutes, or 4 seconds between capture and reception of a conversation).

In certain embodiments, the conversation (e.g., a human-to-human conversation) received in process 3002 is a pre-recorded conversation in audio form (e.g., sound wave and/or digital signal). For example, the pre-recorded conversation is an audio recording (e.g., a .mp3 file, a .wav file, and/or a .m4a file) uploaded from an internal device and/or an external device (e.g., a local storage device such as a hard drive, and/or a remote storage device such as cloud storage). In some examples, the conversation received in process 3002 is a phone conversation. In certain examples, the conversation is automatically received in process 3002, such as by the processor 108, such as whenever a conversation is sent to the processor 108 (e.g., from the sensor 106 and/or from the controller 102).

At the process 3004, a conversation (e.g., an audio-form conversation received at process 3002) is automatically transcribed into synchronized text. In some embodiments, the conversation is automatically transcribed (e.g., with no user input or with minimal user input). In some examples, the transcribing is performed by at least the processor 108 of the system 100. In certain examples, the transcribing is performed by the processor 108 and also modified by a human. In some embodiments, the conversation transcribed at process 3004 includes the conversation received at process 3002, which is in audio form (e.g., sound wave and/or digital signal).

In some embodiments, the text (e.g., the transcript) generated at process 3004 includes English words, phrases, and/or terms. In certain embodiments, the audio-form conversation received at process 3002 and the text generated at process 3004 are timestamped and/or indexed with time, to synchronize the audio and the text. For example, the audio-form conversation received at process 3002 and the text (e.g., the transcript) generated at process 3004 are synchronized. In some examples, the text (e.g., the transcript) generated at process 3004 is searchable. For example, the text (e.g., the transcript) is searchable via a search bar. In certain examples, once transcribed at process 3004, the conversation (e.g., from process 3002) becomes a transcribed conversation including both audio and text that is synchronized with the audio.

At the process 3006, a conversation in audio form (e.g., the conversation in audio form received at process 3002) and a synchronized text (e.g., the synchronized text generated at process 3004) are automatically segmented. In some embodiments, the audio-form conversation and the synchronized text are automatically segmented (e.g., with no user input or with minimal user input), and the segmented audio-form conversation and the segmented synchronized text are automatically generated. In some examples, the segmenting is performed by the processor 108 of the system 100. In certain examples, the segmenting is performed by the processor 108 and also modified by a human. In certain embodiments, the conversation (e.g., audio-form conversation and/or the synchronized text) is segmented at process 3004 into different segments when a speaker change occurs and/or a natural pause occurs. In some embodiments, each segment of the audio-form conversation and the synchronized text generated at process 3006 is associated with one or more timestamps, each timestamp corresponding to the start time, and/or the end time. In certain embodiments, each segment of the audio-form conversation and the synchronized text generated at process 3006 is associated with a segment timestamp, the segment timestamp indicating the start time, the segment duration, and/or the end time.

In some embodiments, the audio-form conversation and the synchronized text are segmented at process 3006 into a plurality of segments that include one or more segments corresponding to the same speaker. In some examples, each segment is spoken by a single speaker. For example, the processor 140 is configured to automatically distinguish one or more speakers of the audio-form conversation. In certain examples, multiple segments spoken by the same speaker are next to each other and/or are separated by one or more segments spoken by one or more other speakers.

In certain embodiments, once segmented at process 3006, the audio-form conversation (e.g., the conversation in audio form received at process 3002) and the synchronized text (e.g., the synchronized text generated at process 3004) becomes a segmented audio-form conversation and a segmented synchronized text. In some embodiments, segments of the audio-form conversation and segments of the synchronized text have one-to-one correspondence relationship. In some examples, each segment of audio-form conversation corresponds to one segment of synchronized text, and the segment of synchronized text is synchronized with that segment of audio-form conversation. In certain examples, different segments of audio-form conversation correspond to different segments of synchronized text, and the different segments of synchronized text are synchronized with the different segments of audio-form conversation respectively.

At the process 3008, a speaker label is automatically assigned to each segment of text synchronized to one segment of audio-form conversation as generated by the process 3006. In some embodiments, the speaker label is automatically assigned (e.g., with no user input or minimal user input), and the speaker-assigned segmented synchronized text and corresponding segmented audio-form conversation are automatically generated. In some examples, the assigning of speaker label is performed by the processor 108 of the system 100. In certain examples, the assigning of speaker label is performed by the processor 108 (e.g., assisted with user input). In some embodiments, the speaker label includes a speaker name and/or a speaker picture.

In some embodiments, at the process 3008, one or more segments of text, which are synchronized to one or more corresponding segments of audio-form conversation, are grouped into one or more segment sets each associated with the same speaker pending a speaker label assignment. In those embodiments, the speaker label is assigned to each segment set, which in turn assign the speaker label to all segments belonging to the segment set.

In some embodiments, at the process 3008, the speaker label is assigned to each segment of text synchronized to one corresponding segment of audio-form conversation, by matching a voiceprint of the corresponding segment of audio-form conversation to a reference voiceprint corresponding to a speaker label.

In certain embodiments, the process 3008 includes assigning an "unknown" speaker label (e.g., with no name and/or with a placeholder picture) to a segment. In some embodiments, once assigned with one or more speaker labels at process 3008, the segmented text that is synchronized with the segmented audio-form conversation (e.g., as generated at process 3006) becomes a speaker-assigned segmented text that is synchronized with the segmented audio-form conversation, with a speaker label assigned to each segment.

In some embodiments, a speaker corresponds to a speaker label, but a speaker label may or may not include a speaker name. In some examples, the speaker label corresponding to an unknown speaker does not include a speaker name. In certain examples, the process 3000 automatically identifies a new speaker voiceprint, but the user has not provided the name and/or the picture of the speaker yet; hence the speaker is determined to be, for example, an unknown speaker.

At the process 3010, a transformed conversation (e.g., including the speaker-assigned segmented synchronized text and its corresponding segmented audio-form conversation) is sent. For example, the transformed conversation is sent from the processor 108 to the controller 102 and/or to the presenter 110. In some embodiments, the transformed conversation sent at process 3010 includes the speaker-assigned segmented synchronized text and its corresponding segmented audio-form conversation as generated by the process 3008. In certain embodiments, the transformed conversation sent at process 3010 includes the segmented audio-form conversation and the segmented synchronized text as generated by the process 3006.

In some embodiments, the transformed conversation includes segmented audio, segmented text synchronized with segmented audio, speaker labels (e.g., name and/or picture) associated with the segments, and/or metadata (e.g., including a date, a time, a duration and/or a title). In certain embodiments, the transformed conversation is sent automatically, for example, by the processor 108. In certain embodiments, the transformed conversation is further sent or shared with other users, for example, via email.

As discussed above and further emphasized here. FIG. 3 is merely an example, which should not unduly limit the scope of the claims. One of ordinary skill in the art would recognize many variations, alternatives, and modifications. In some examples, the process 3004 and the process 3006 are modified such that segmenting the conversation in audio form occurs before synchronized text is transcribed for each segment. In certain examples, the process 3008, at which one or more speaker labels are assigned, occurs before transcribing the conversation in audio form and/or segmenting the conversation in audio form.

In certain embodiments, transcribing, segmenting, and/or assigning speaker label to a conversation are performed with the aid of a user and/or human. For example, a transcript automatically generated (e.g., at process 3004) is editable (e.g., by a user and/or human). In yet another example, segments automatically generated (e.g., at process 3006) is editable to split one segment and/or combine multiple segments (e.g., by a user and/or human). In yet another example, speaker labels automatically assigned (e.g., at process 3010) are editable (e.g., by a user and/or human).

In certain embodiments, the conversation to which transcribing, segmenting, and/or assigning speaker label are performed includes the conversation in audio form or the transcription. In some examples, the conversation in audio form is first segmented and/or speaker-assigned, and followed by having each segment transcribed to generate the synchronized text associated with each segment of conversation in audio form. In certain examples, the conversation in audio form is first transcribed to generate synchronized transcript, and followed by segmenting and/or assigning speaker label to the transcript. For example, the conversation in audio form is not directly segmented, but instead is indirectly segmented or remains unsegmented and merely corresponds to the transcript in a word-by-word relationship (e.g., each transcribed text corresponds to a timestamp with an associated audio).

Returning to FIG. 2, at process 2008, one or more transformed conversations (e.g., the transformed conversation sent at the process 3010) are presented. In certain embodiments, the process 2008 includes presenting the transformed conversation (e.g., including the speaker-assigned segmented synchronized text and its corresponding segmented audio-form conversation) with the presenter 110. In some examples, when the audio-form conversation is played, the corresponding word in the synchronized text is highlighted when the word is spoken. In certain examples, the text is synchronized with the audio-form conversation at both the segment level and the word level.

In certain embodiments, the process 2008 includes presenting the metadata associated with the transformed conversation. For example, the metadata include a date (e.g., of capturing, processing, or presenting), a time (e.g., of capturing, processing, or presenting), a duration (e.g., of the conversation), and/or a title. In some embodiments, the process 2008 includes presenting a player, such as an audio player. For example, the audio player is a navigable audio player configured to provide control (e.g., to a user) such that the presenting of the transformed conversation is interactive.

In some embodiments, the process 2008 includes presenting the speaker-assigned segmented synchronized text (e.g., generated by the process 3008) in a searchable manner, such as via a search bar. In some embodiments, the process 2008 includes presenting search results that match a searched text (e.g., via the search bar) in the speaker-assigned segmented synchronized text in a first marked form, such as a first highlighted form (e.g., highlighted in saturated and/or faded yellow).

In certain embodiments, at the process 2008, the transformed conversation is presented such that the search results (e.g., in the speaker-assigned segmented synchronized text) and/or the audio corresponding to the search results (e.g., indexed with the same timestamp) are highlighted, such as in a first marked form. In some embodiments, the text being presented (e.g., matching the audio during a playback or when paused) is highlighted, such as in a second marked form, (e.g., highlighted in green). For example, the text being presented (e.g., the text being played back) is indexed with the same timestamp as the audio instance within the conversation, such as at a particular time indicated by a progress indicator along a progress bar.

As discussed above and further emphasized here, FIG. 1, FIG. 2, and FIG. 3 are merely examples, which should not unduly limit the scope of the claims. One of ordinary skill in the art would recognize many variations, alternatives, and modifications. In some examples, the system as shown in FIG. 1 is used to process and present a speech by a single-speaker and/or a conversation made by a single speaker talking to himself or herself. In certain examples, the method as shown in FIG. 1 is used to process and present a speech by a single-speaker and/or a conversation made by a single speaker talking to himself or herself. In some examples, the process 3000 as shown in FIG. 3 is used to automatically transform a speech by a single-speaker and/or a conversation made by a single speaker talking to himself or herself.

According to certain embodiments, a system is configured to capture, process, render, and/or display one or more context-aware moment-associating elements (e.g., one or more speeches and/or one or more photos). For example, the system is described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14. In one embodiment, the context includes location, time, one or more participants, topic, historical information, and/or a person's social network profile and/or history. In another embodiment, the context is used by the system such that, based on the context, the interpretation of the current speech and/or the current conversation can be different. For example, the historical information is used by the system such that, based on what a person spoke or heard in the past, the interpretation of the current speech and/or the current conversation can be different.

Figure 4:
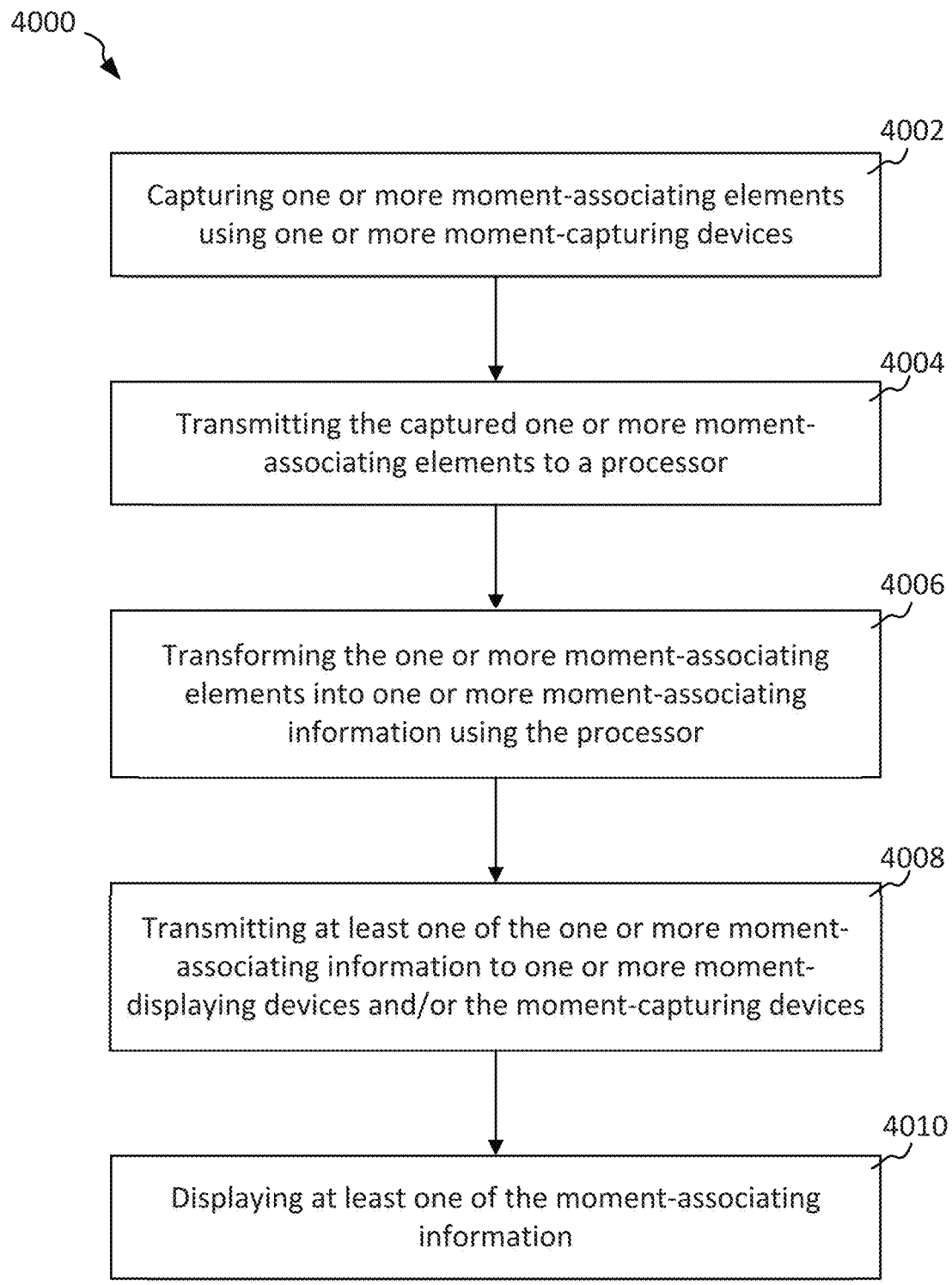
FIG. 4 is a simplified diagram showing a method of capturing and displaying one or more moments according to certain embodiments of the present invention.

FIG. 4 is a simplified diagram showing a method of capturing and displaying one or more moments (e.g., one or more multi-party speeches, and/or one or more inline photos) according to certain embodiments of the present invention. This diagram is merely an example, which should not unduly limit the scope of the claims. One of ordinary skill in the art would recognize many variations, alternatives, and modifications. The method 4000 includes processes 4002, 4004, 4006, 4008, and 4010. In some examples, the method 4000 is performed by the system 100. In certain examples, the method 4000 is the same as the method 2000. For example, the one or more moments include one or more multi-party speeches, and/or one or more inline photos.

Although the above has been shown using a selected group of processes for the method 4000, there can be many alternatives, modifications, and variations. For example, some of the processes may be expanded and/or combined. Other processes may be inserted to those noted above. Depending upon the embodiment, the sequence of processes may be interchanged with others replaced.

At process 4002, capturing one or more moment-associating elements using one or more moment-capturing devices is performed. For example, one or more moment-associating elements are captured using one or more moment-capturing devices (e.g., the sensor 106). At process 4004, transmitting the captured one or more moment-associating elements to a processor is performed. For example, the captured one or more moment-associating elements are transmitted to a processor (e.g., the processor 108).

At process 4006, transforming the one or more moment-associating elements into one or more moment-associating information using the processor. For example, the one or more moment-associating elements are transformed into one or more moment-associating information using the processor (e.g., the processor 108). At process 4008, transmitting at least one of the one or more moment-associating information to one or more moment-displaying devices and/or the moment-capturing devices is performed. For example, at least one of the one or more moment-associating information is transmitted to one or more moment-displaying devices (e.g., the presenter 110) and/or the moment-capturing devices. At process 4010, displaying at least one of the moment-associating information is performed. For example, at least one of the moment-associating information is displayed (e.g., by the presenter 110).

Figure 5:
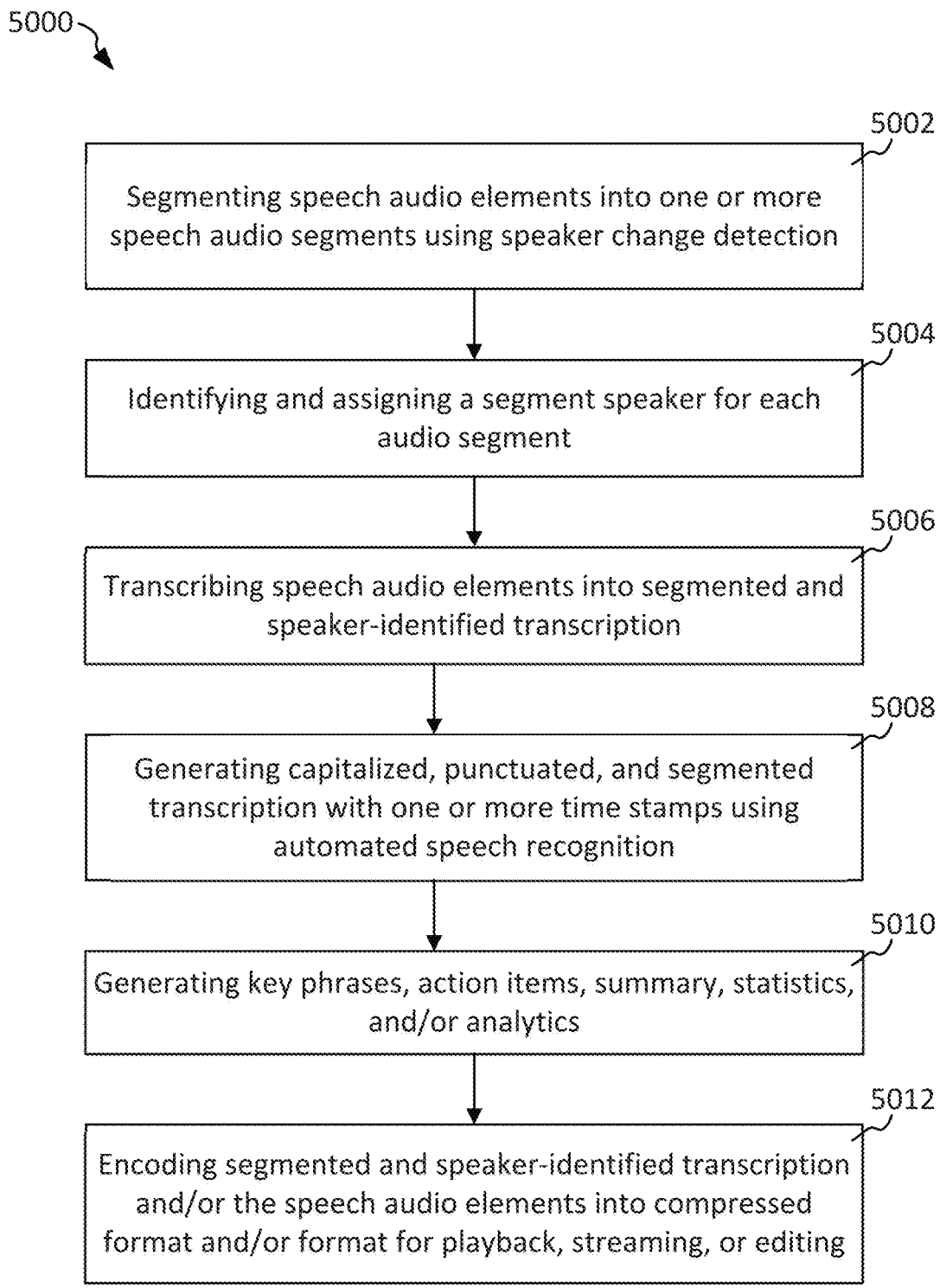
FIG. 5 is a simplified diagram showing process for transforming the one or more moment-associating elements into one or more moment-associating information as shown in FIG. 4 according to some embodiments of the present invention.

FIG. 5 is a simplified diagram showing process 5000 for transforming the one or more moment-associating elements into one or more moment-associating information according to some embodiments of the present invention. The process 5000 of the method 4000 includes processes 5002, 5004, 5006, 5008, 5010, and 5012. In some examples, the method 4006 is performed by the processor 108. In certain examples, the process 5000 is the same as the process 4006 and/or the process 3000.

Although the above has been shown using a selected group of processes for the process 5000, there can be many alternatives, modifications, and variations. For example, some of the processes may be expanded and/or combined. Other processes may be inserted to those noted above. Depending upon the embodiment, the sequence of processes may be interchanged with others replaced.

At process 5002, segmenting speech audio elements into one or more speech audio segments using speaker change detection is performed. At process 5004, identifying and assigning a segment speaker for each audio segment is performed. At process 5006, transcribing speech audio elements into segmented and speaker-identified transcription is performed. At process 5008, generating capitalized, punctuated, and segmented transcription with one or more timestamps using automated speech recognition is performed. At process 5010, generating key phrases, action items, summary, statistics, and/or analytics is performed. At process 5012, encoding segmented and speaker-identified transcription and/or the speech audio elements into compressed format and/or format for playback, streaming, or editing. For example, segmented and speaker-identified transcription and/or the speech audio elements are encoded into compressed format and/or format for playback, streaming, and/or editing.

Figure 6:
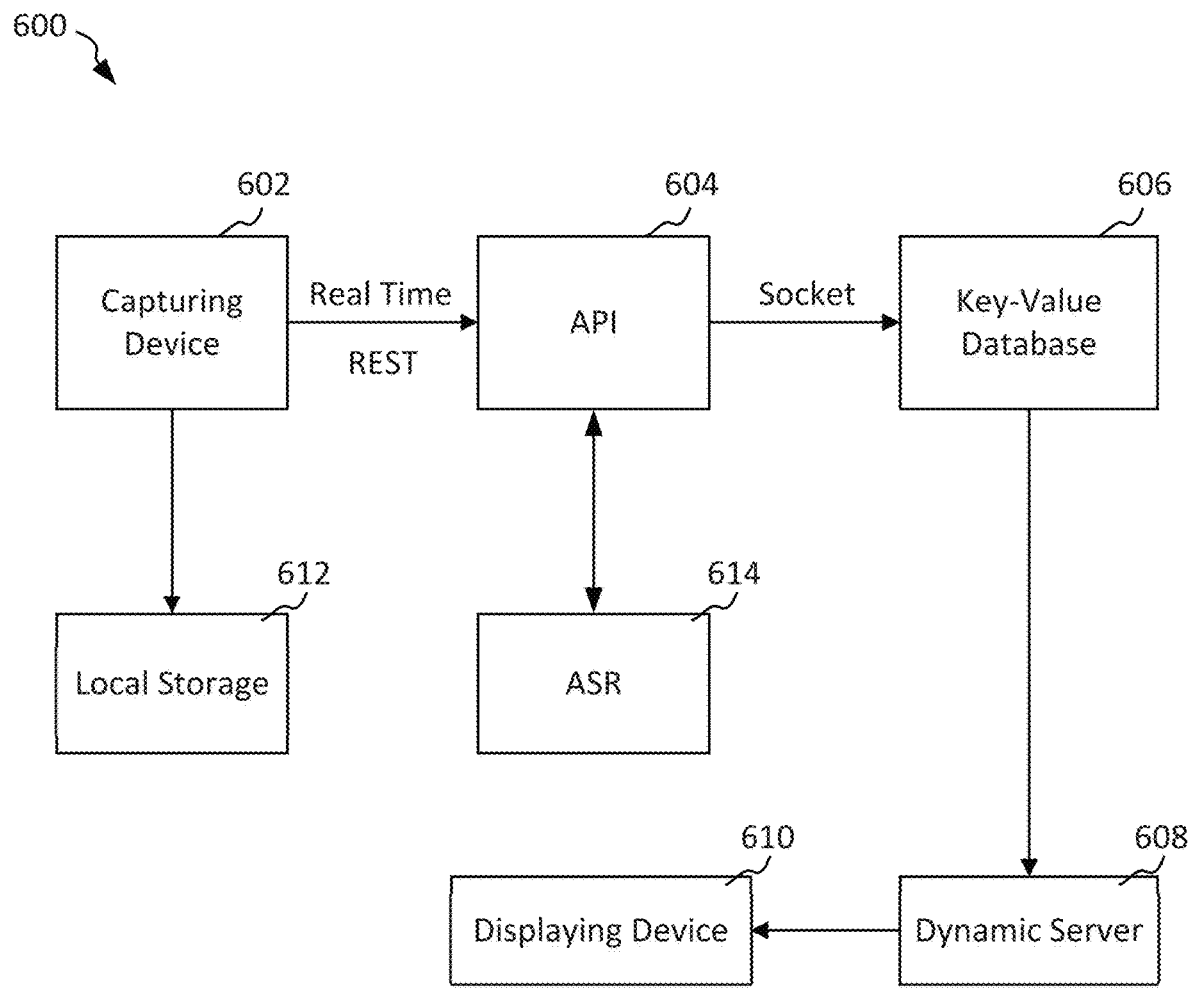
FIG. 6 is a simplified diagram showing a system for capturing, processing, and rendering a context-aware moment-associating element according to certain embodiments of the present invention.

FIG. 6 is a simplified diagram showing a system for capturing, processing, and rendering a context-aware moment-associating element according to certain embodiments of the present invention. This diagram is merely an example, which should not unduly limit the scope of the claims. One of ordinary skill in the art would recognize many variations, alternatives, and modifications. The system 600 includes a capturing device 602, a local storage 612, an application programming interface (API) 604, an automatic speech recognition (ASR) system 614, a key-value database 606, a dynamic server 608, and/or a displaying device 610. In some examples, the system 600 is the same as the system 100. In certain examples, the system 600 performs the method 2000 and/or the method 4000. For example, the context-aware moment-associating element includes a multi-party speech and/or an inline photo.

Although the above has been shown using a selected group of components for the system 600, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As an example, the representational state transfer (REST) API is removed from the system 600 as shown in FIG. 6. For example, the real time API is removed from the system 600 as shown in FIG. 6. As an example, both the real time API and the representational state transfer (REST) API are removed from the system 600 as shown in FIG. 6, and are replaced by one or more other protocols.

In some embodiments, the component 602 is a capturing device such as an App (e.g., on IOS, Android, or ChromeOS) or a Browser (e.g., java-based). In certain embodiments, the component 604 is an application programming interface (API). In some embodiments, the component 606 is a key-value (K-V) database (e.g., a database that stores time sequence and audio recording). In certain embodiments, the component 608 is a dynamic server (e.g., Amazon Web Services). For example, the dynamic server 608 stores one or more dynamic libraries.

In some embodiments, the component 610 is a displaying device (e.g., for playback, streaming, and/or editing). In certain embodiments, the component 612 is a local storage. In some embodiments, the component 614 is an automatic speech recognition (ASR) system for transcribing the audio recording into information (e.g., start time and end time of a phrase, and/or start time and end time of text).

As discussed above and further emphasized here, FIG. 6 is merely an example, which should not unduly limit the scope of the claims. One of ordinary skill in the art would recognize many variations, alternatives, and modifications. For example, the system 600 is described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14.

Figure 7:
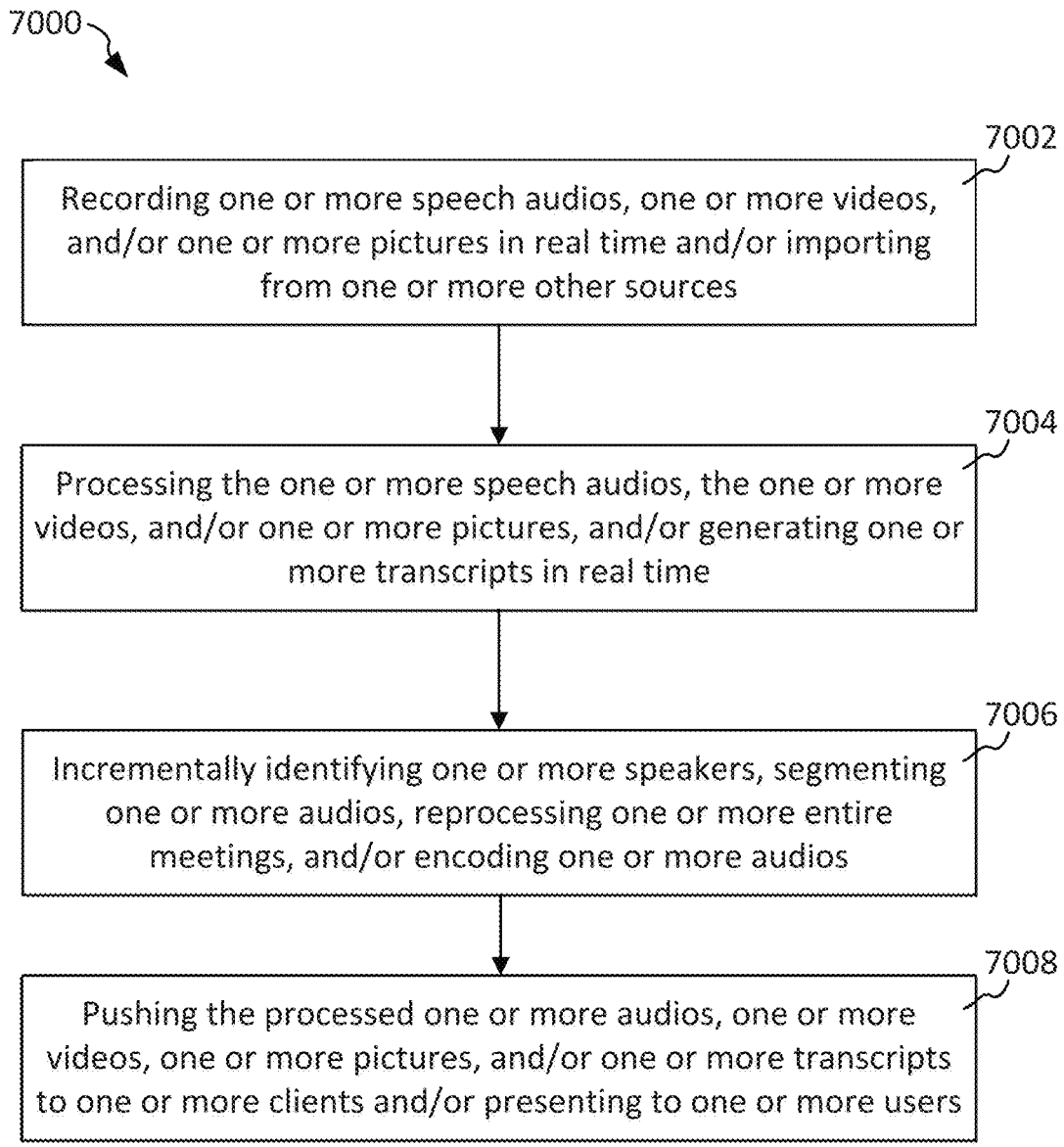
FIG. 7 is a simplified diagram showing a method of operation for the system as shown in FIG. 6 according to some embodiments of the present invention.

FIG. 7 is a simplified diagram showing a method of operation for the system 600 as shown in FIG. 6 according to some embodiments of the present invention. This diagram is merely an example, which should not unduly limit the scope of the claims. One of ordinary skill in the art would recognize many variations, alternatives, and modifications. The method 7000 includes processes 7002, 7004, 7006, and 7008. For example, the method 7000 is the same as the method 2000 and/or the method 4000. As an example, the method 7000 is performed by the system 100 and/or the system 600. Although the above has been shown using a selected group of processes for the method 7000, there can be many alternatives, modifications, and variations. For example, some of the processes may be expanded and/or combined. Other processes may be inserted to those noted above. Depending upon the embodiment, the sequence of processes may be interchanged with others replaced.

At process 7002, recording one or more speech audios, one or more videos and/or one or more pictures in real time on one or more mobile phones and/or one or more browsers and/or importing from one or more other sources are performed. For example, the one or more pictures are one or more photos. At process 7004, processing the one or more speech audios, the one or more videos, and/or one or more pictures, and/or generating one or more transcripts in real-time are performed.

At process 7006, incrementally identifying one or more speakers, segmenting one or more audios into one or more bubbles, reprocessing one or more entire meetings, and/or encoding one or more audios are performed. At process 7008, pushing the processed one or more audios, one or more videos, one or more pictures, and/or one or more transcripts to one or more clients and/or presenting to one or more users are performed.

Figure 8:
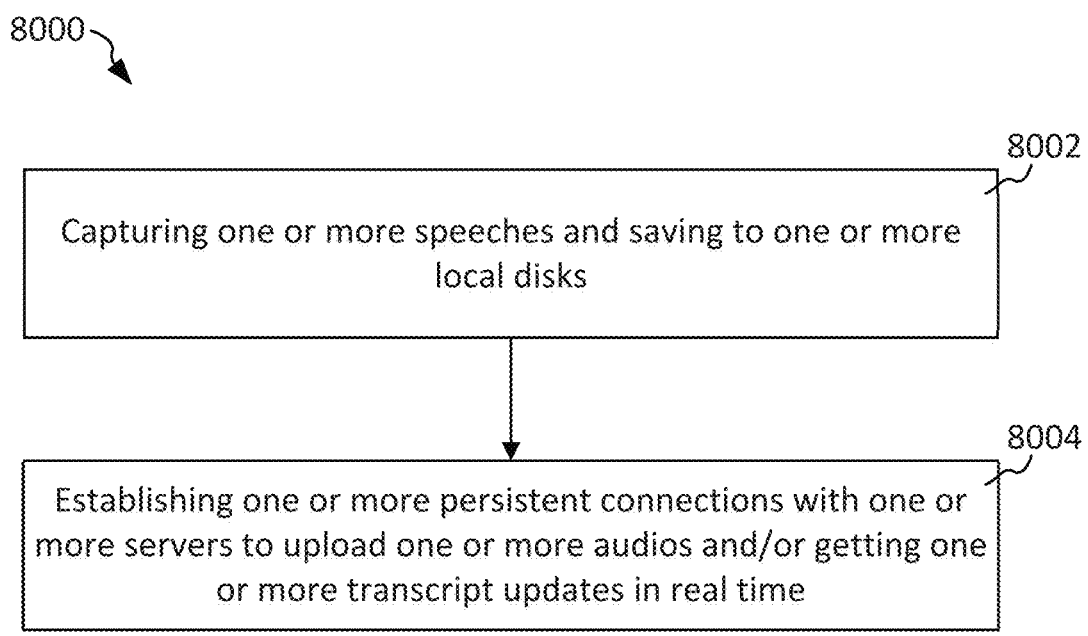
FIG. 8 is a simplified diagram showing a process of operation for front-end and/or client related to FIG. 7 according to certain embodiments of the present invention.

FIG. 8 is a simplified diagram showing a process of operation for front-end and/or client related to FIG. 7 according to certain embodiments of the present invention. This diagram is merely an example, which should not unduly limit the scope of the claims. One of ordinary skill in the art would recognize many variations, alternatives, and modifications. The process 8000 includes processes 8002 and 8004. For example, the process 8000 is related to at least the process 7002 as shown in FIG. 7. Although the above has been shown using a selected group of processes for the process 8000, there can be many alternatives, modifications, and variations. For example, some of the processes may be expanded and/or combined. Other processes may be inserted to those noted above. Depending upon the embodiment, the sequence of processes may be interchanged with others replaced.

At process 8002, capturing one or more speeches and saving to one or more local disks are performed. At process 8004, establishing one or more persistent connections with one or more servers to upload one or more audios and/or getting one or more transcript updates in real time are performed.

Figure 9:
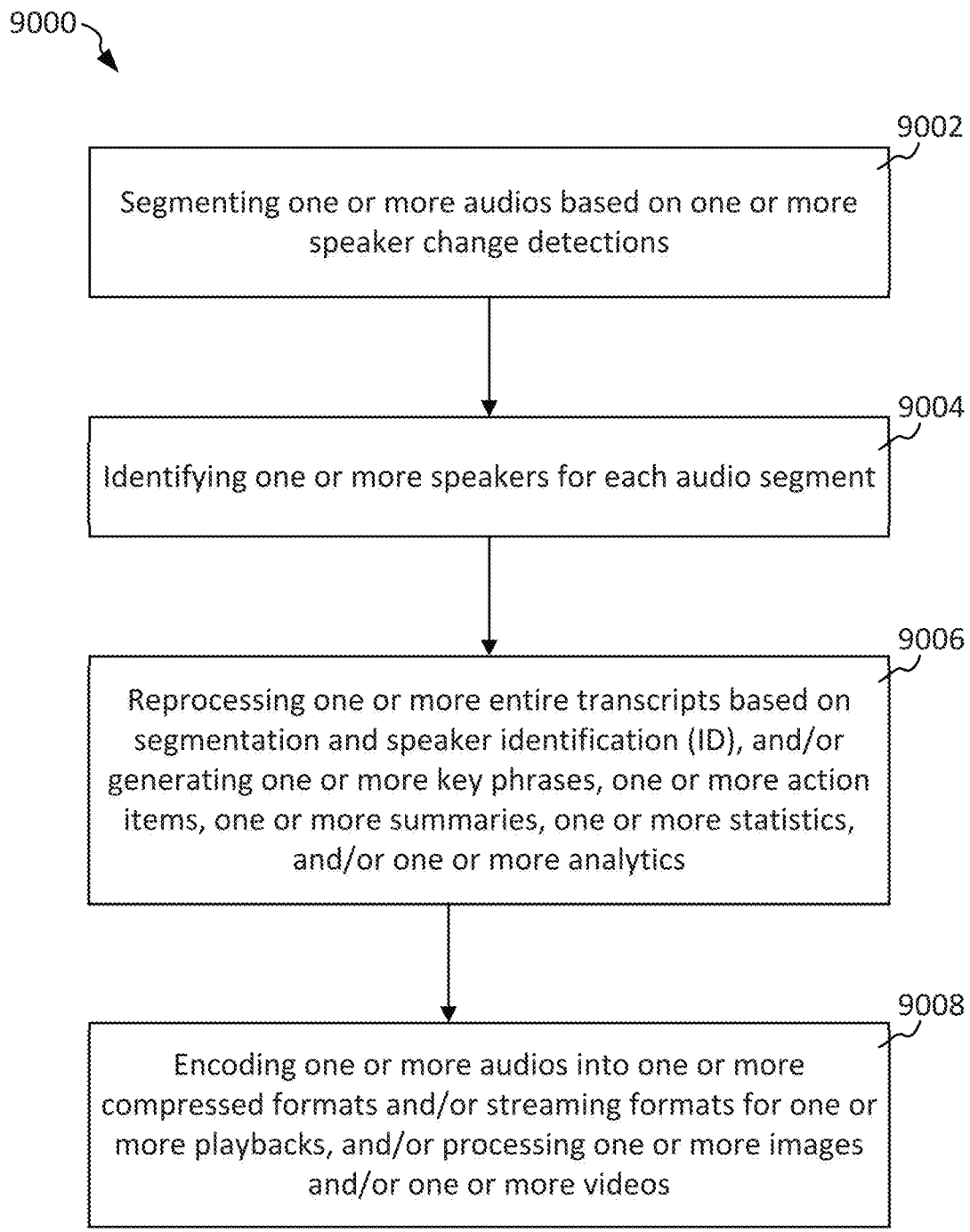
FIG. 9 is a simplified diagram showing a process of operation for backend incremental processing related to FIG. 7 according to some embodiments of the present invention.

FIG. 9 is a simplified diagram showing a process of operation for backend incremental processing related to FIG. 7 according to some embodiments of the present invention. This diagram is merely an example, which should not unduly limit the scope of the claims. One of ordinary skill in the art would recognize many variations, alternatives, and modifications. The process 9000 includes processes 9002, 9004, 9006, and 9008. For example, the process 9000 is related to at least the process 7006 as shown in FIG. 7. Although the above has been shown using a selected group of processes for the process 9000, there can be many alternatives, modifications, and variations. For example, some of the processes may be expanded and/or combined. Other processes may be inserted to those noted above. Depending upon the embodiment, the sequence of processes may be interchanged with others replaced.

At process 9002, segmenting one or more audios based on one or more speaker change detections is performed. At process 9004, identifying one or more speakers for each audio segment is performed. At process 9006, reprocessing one or more entire transcripts based on segmentation and speaker identification (ID), and/or generating one or more key phrases, one or more action items, one or more summaries, one or more statistics, and/or one or more analytics are performed. At process 9008, encoding one or more audios into one or more compressed formats and/or streaming formats for one or more playbacks, and/or processing one or more images and/or one or more videos are performed.

Figure 10:
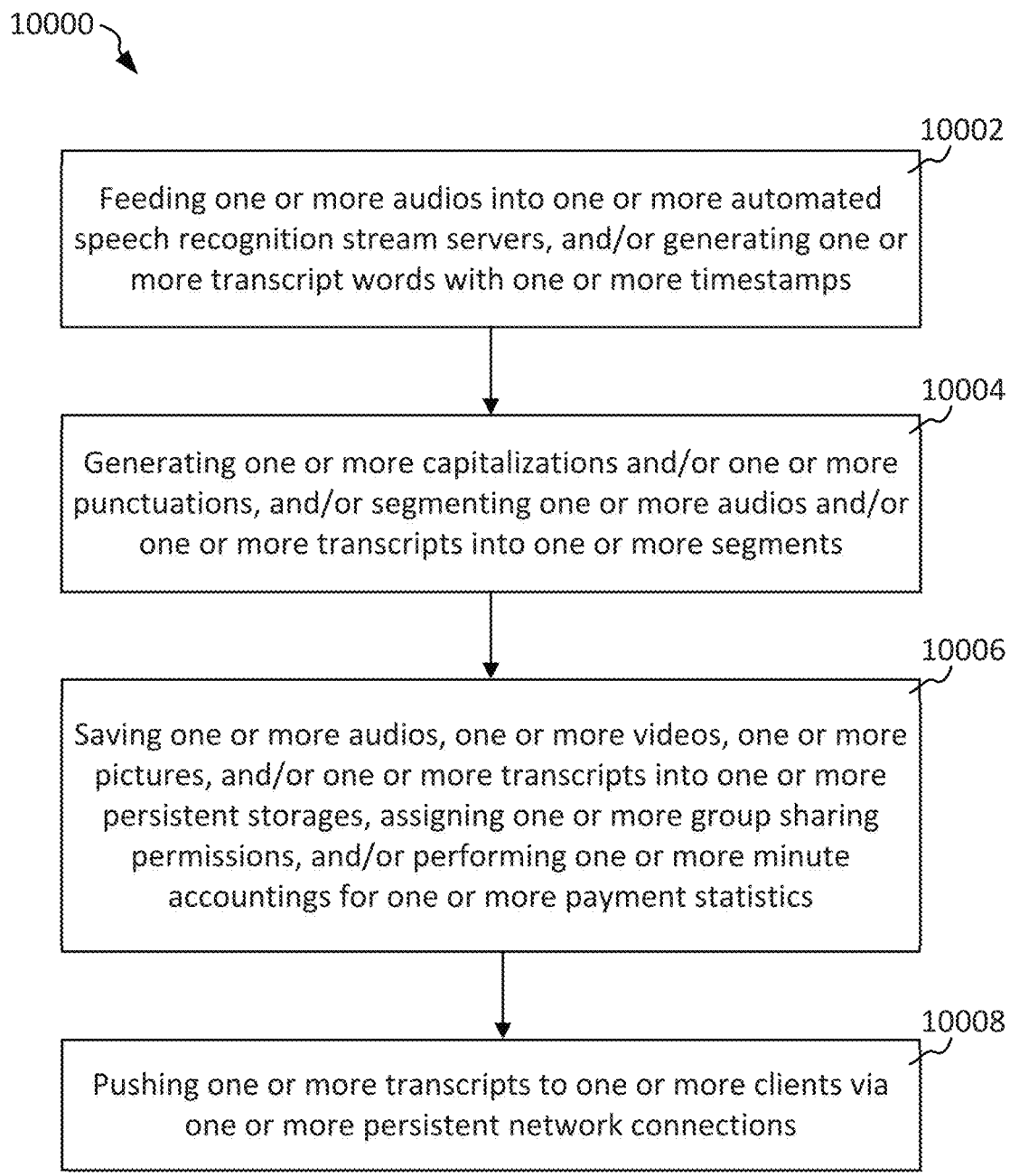
FIG. 10 is a simplified diagram showing a process of operation for backend real-time processing related to FIG. 7 according to certain embodiments of the present invention.

FIG. 10 is a simplified diagram showing a process of operation for backend real-time processing related to FIG. 7 according to certain embodiments of the present invention. This diagram is merely an example, which should not unduly limit the scope of the claims. One of ordinary skill in the art would recognize many variations, alternatives, and modifications. The process 10000 includes processes 10002, 10004, 10006, and 10008. For example, the process 10000 is related to at least the process 7004 as shown in FIG. 7. Although the above has been shown using a selected group of processes for the process 10000, there can be many alternatives, modifications, and variations. For example, some of the processes may be expanded and/or combined. Other processes may be inserted to those noted above. Depending upon the embodiment, the sequence of processes may be interchanged with others replaced.

At process 10002, feeding one or more audios into one or more automated speech recognition stream servers, and/or generating one or more transcript words with one or more timestamps for one or more current windows are performed. At process 10004, generating one or more capitalizations and/or one or more punctuations, and/or segmenting one or more audios and/or one or more transcripts into one or more segments are performed.

At process 10006, saving one or more audios, one or more videos, one or more pictures, and/or one or more transcripts into one or more persistent storages, assigning one or more group sharing permissions, and/or performing one or more minute accountings for one or more payment statistics are performed. At process 10008, pushing one or more transcripts to one or more clients via one or more persistent network connections is performed.

Figure 11:
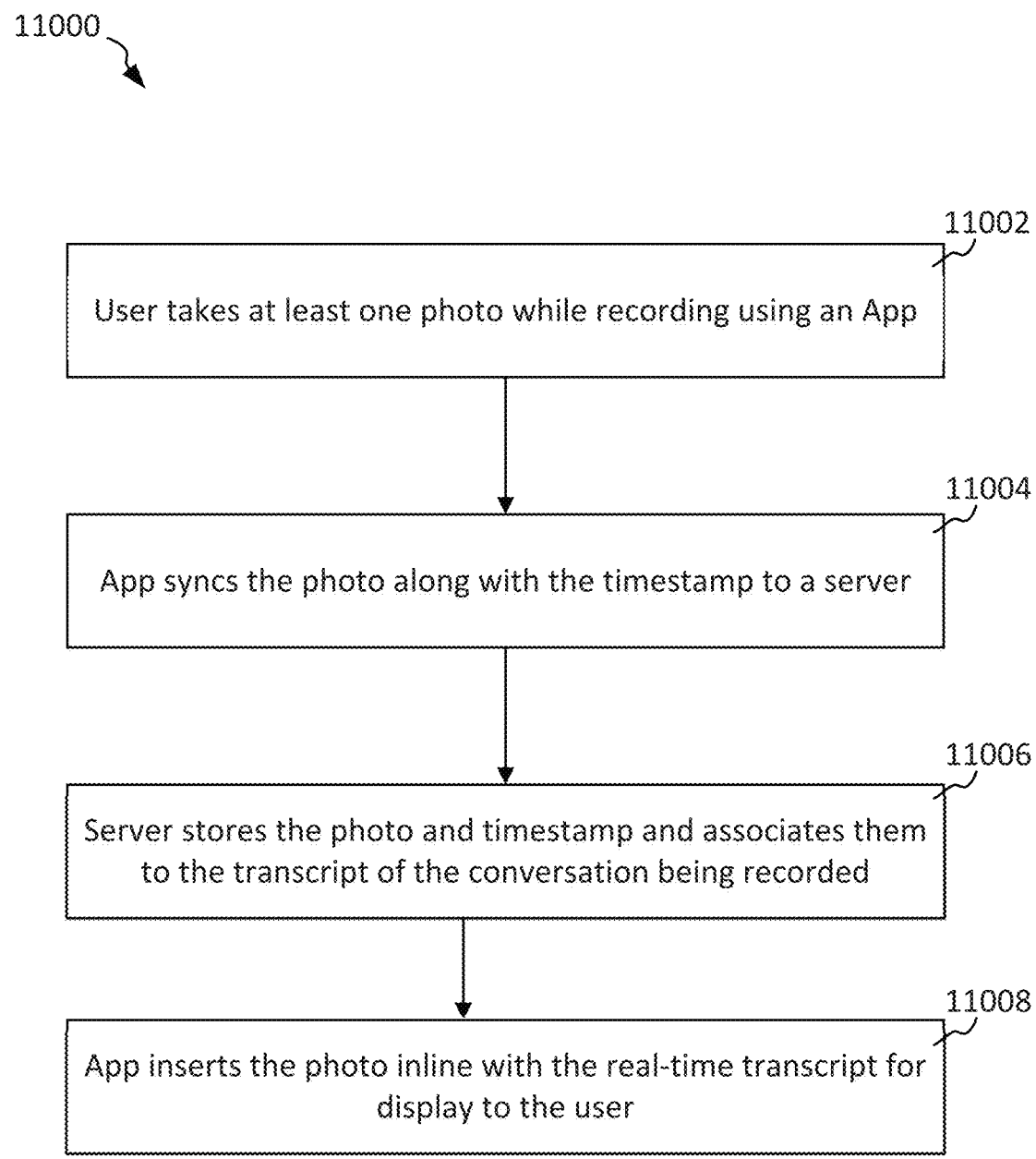
FIG. 11 is a simplified diagram showing a method for real-time capturing of one or more inline photos according to some embodiments of the present invention.

FIG. 11 is a simplified diagram showing a method for real-time capturing of one or more inline photos according to some embodiments of the present invention. This diagram is merely an example, which should not unduly limit the scope of the claims. One of ordinary skill in the art would recognize many variations, alternatives, and modifications. The method 11000 includes processes 11002, 11004, 11006, and 11008. For example, the method 11000 is performed with one or more long-form, multi-party, and/or far-field conversations with voice, photo, and/or video. As an example, the method 11000 is one or more parts of the method 2000, one or more parts of the method 4000, and/or one or more parts of the method 7000.

Although the above has been shown using a selected group of processes for the method 11000, there can be many alternatives, modifications, and variations. For example, some of the processes may be expanded and/or combined. Other processes may be inserted to those noted above. Depending upon the embodiment, the sequence of processes may be interchanged with others replaced.

At process 11002, a user takes at least one photo while recording using an App (e.g., using the Otter App). At process 11004, the App syncs the photo along with the timestamp to a server. At process 11006, the server stores the photo and timestamp and associates them to the transcript of the conversation being recorded. At process 11008, the App (e.g., Otter App) inserts the phone inline with the real-time transcript for display to the user. For example, the photo is an inline photo.

Figure 12:
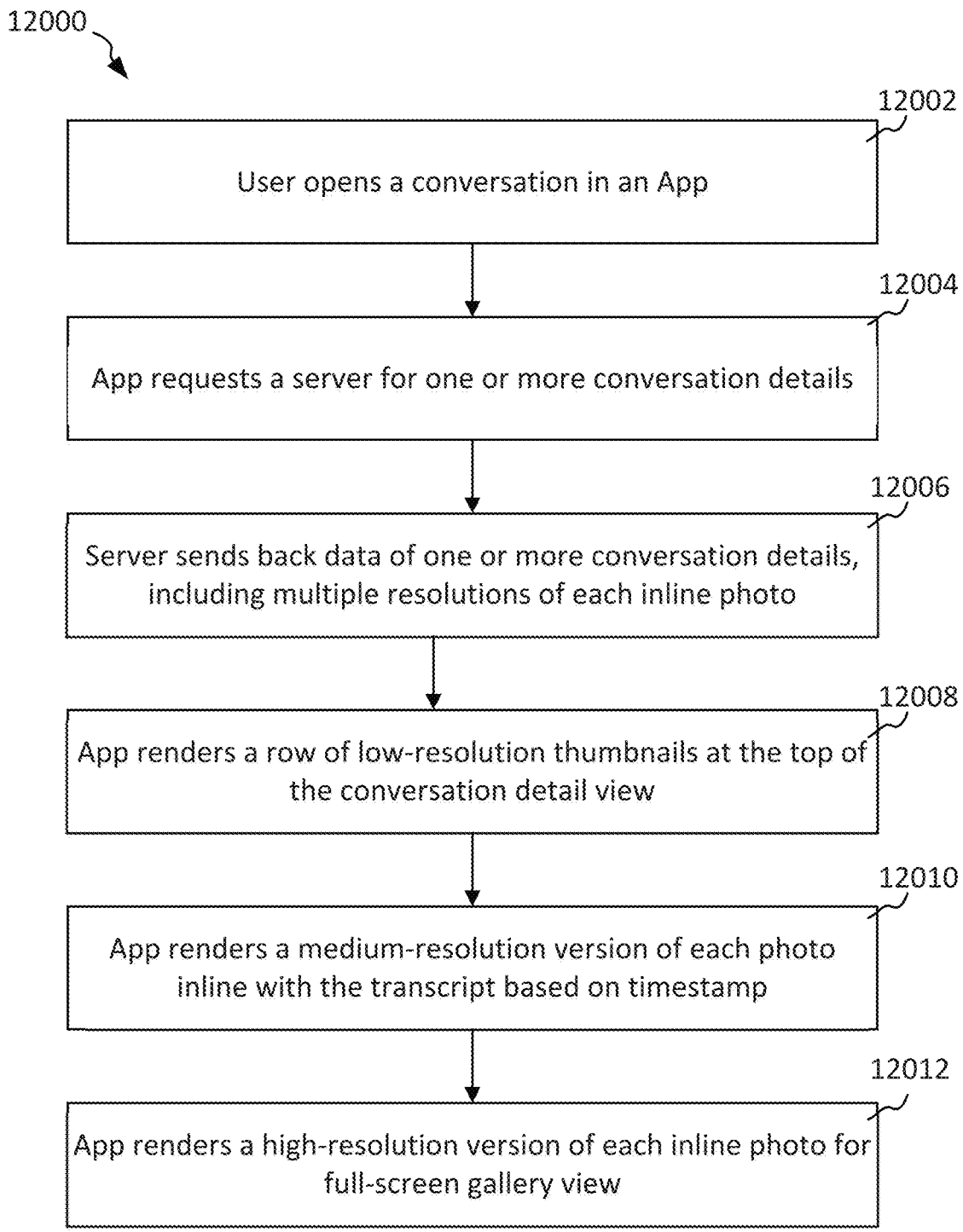
FIG. 12 is a simplified diagram showing a method for rendering of one or more inline photos according to certain embodiments of the present invention.

FIG. 12 is a simplified diagram showing a method for rendering of one or more inline photos according to certain embodiments of the present invention. This diagram is merely an example, which should not unduly limit the scope of the claims. One of ordinary skill in the art would recognize many variations, alternatives, and modifications. The method 12000 includes processes 12002, 12004, 12006, 12008, 12010, and 12012. For example, the method 12000 is performed with one or more long-form, multi-party, and/or far-field conversations with voice, photo, and/or video. As an example, the method 12000 is one or more parts of the method 2000, one or more parts of the method 4000, and/or one or more parts of the method 7000.

At process 12002, a user opens a conversation in an App (e.g., in the Otter App). At process 12004, the App (e.g., the Otter App) requests a server for one or more conversation details. At process 12006, the server sends back data of one or more conversation details, including multiple resolutions of each inline photo. For example, the multiple resolutions include a low resolution, a medium resolution, and a high resolution.

At process 12008, the App (e.g., the Otter App) renders a row of low-resolution thumbnails at the top of the conversation detail view. For example, different thumbnails of the low-resolution thumbnails correspond to different inline photos respectively. At process 12010, the App (e.g., the Otter App) renders a medium-resolution version of each photo inline with the transcript based on timestamp. At process 12012, the App (e.g., the Otter App) renders a high-resolution version of each inline photo for full-screen gallery view.

Figure 13:
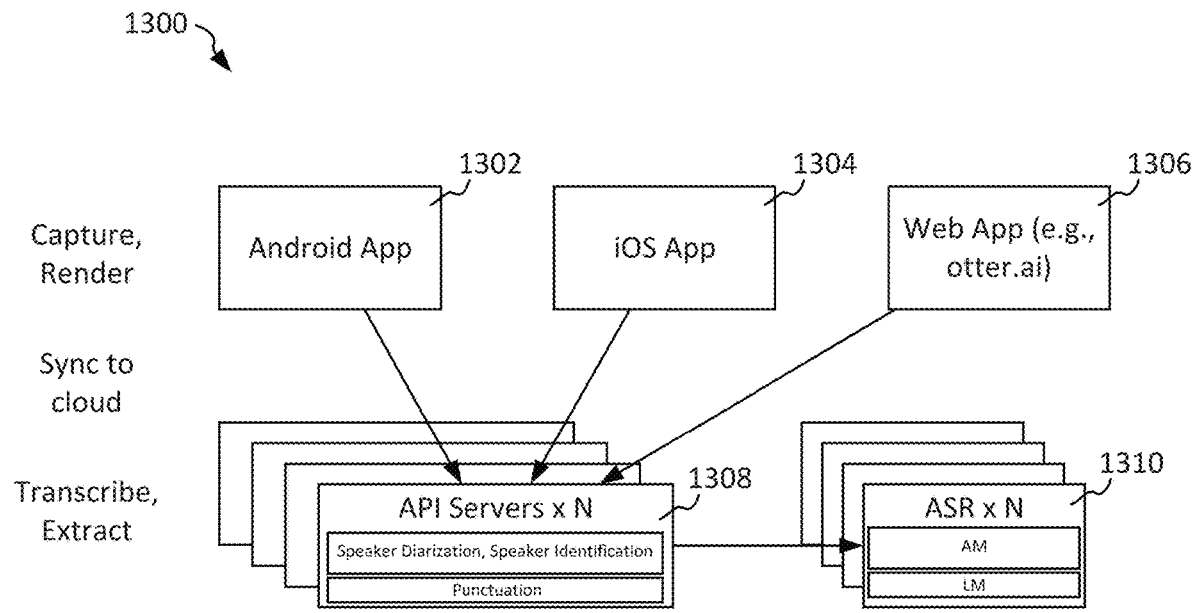
FIG. 13 is a simplified diagram showing a system for real-time capture, processing, and rendering of one or more context-aware conversations according to some embodiments of the present invention.

FIG. 13 is a simplified diagram showing a system for real-time capture, processing, and rendering of one or more context-aware conversations according to some embodiments of the present invention. This diagram is merely an example, which should not unduly limit the scope of the claims. One of ordinary skill in the art would recognize many variations, alternatives, and modifications. The system 1300 includes one or more Apps, such as an Android App 1302, an iOS App 1304, and/or a web App (e.g., otter.ai) 1306. Additionally, the system 1300 includes N application programming interface (API) servers 1308, with N being a positive integer larger than or equal to 1. Moreover, the system 1300 includes N automated speech recognition (ASR) systems 1310, with N being a positive integer larger than or equal to 1. In some examples, the system 1300 is the same as the system 100. In certain examples, the system 1300 is the same as the system 600. In some examples, the system 1300, the system 100, and the system 600 and are the same. For example, the system 1300 performs the method 2000, the method 4000 and/or the method 7000. As an example, the system 1300 performs the process 10000 and/or the process 11000.

Although the above has been shown using a selected group of components for the system 1300, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the one or more conversations that are real-time captured, processed, and rendered by the system 1300 include one or more long-form, multi-party, and/or far-field conversations with voice, photo, and/or video. In certain embodiments, the one or more Apps, such as an Android App 1302, an iOS App 1304, and/or a web App (e.g., otter.ai) 1306 are configured to perform capturing and/or rendering. For example, each web app is a frame and/or a widget. As an example, the one or more Apps are configured to send information to the N application programming interface (API) servers to sync to cloud.

In some embodiments, the N application programming interface (API) servers 1308 and the N automated speech recognition (ASR) systems 1310 are configured to perform transcribing and/or extracting. For example, the N application programming interface (API) 1308 servers are configured to perform speaker diarization, identification, and/or punctuation. As an example, the N automated speech recognition (ASR) systems 1310 are configured to receive information from the N application programming interface (API) servers 1308. For example, the N automated speech recognition (ASR) systems 1308 are configured to use at least one acoustic model (AM) and/or at least one language mode (LM).

As discussed above and further emphasized here, FIG. 13 is merely an example, which should not unduly limit the scope of the claims. One of ordinary skill in the art would recognize many variations, alternatives, and modifications. For example, "Web App" (e.g., a frame and/or a widget) can be embedded in "otter.ai". In yet another example, "otter.ai" is removed from FIG. 13, and "Web App" (e.g., a frame and/or a widget) is embedded in a different internet website and/or in a mobile app.

Figure 14:
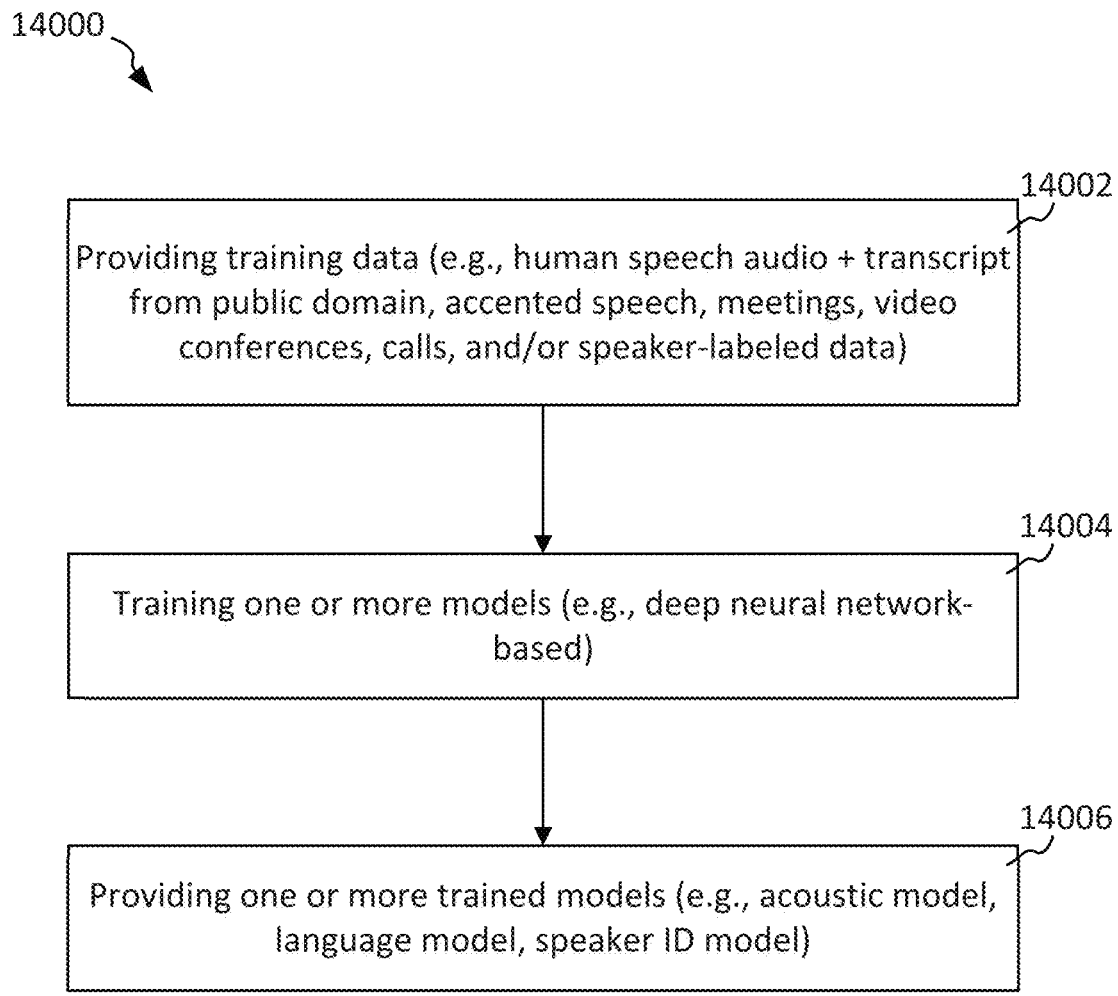
FIG. 14 is a simplified diagram showing a method of training the system as shown in FIG. 13 according to certain embodiments of the present invention.

FIG. 14 is a simplified diagram showing a method of training the system 1300 as shown in FIG. 13 according to certain embodiments of the present invention. This diagram is merely an example, which should not unduly limit the scope of the claims. One of ordinary skill in the art would recognize many variations, alternatives, and modifications. The method 14000 includes processes 14002, 14004, and 14006. For example, the method 14000 is implemented to train the system for real-time capture, processing, and rendering of one or more long-form, multi-party, and/or far-field conversations with voice, photo, and/or video. Although the above has been shown using a selected group of processes for the method 14000, there can be many alternatives, modifications, and variations. For example, some of the processes may be expanded and/or combined. Other processes may be inserted to those noted above. Depending upon the embodiment, the sequence of processes may be interchanged with others replaced.

At process 14002, training data are provided. For example, the training date include one or more human speech audios and/or one or more corresponding transcripts from public domain. As an example, the training date include one or more accented speeches. For examples, the training date including data from one or more meetings, one or more conferences, and/or one or more calls. As an example, training data are provided with one or more speaker names labeled. At process 14004, model training is performed. For example, the model training is based on deep neural network (DNN). At process 14006, one or more models are provided. For example, the models include one or more acoustic models (AMs), one or more language models (LMs), and/or one or more speaker identification (ID) models.

As shown in FIG. 6, the system 600 comprises the moment-capturing device 602, the application programming interface (API) 604, the automatic speech recognition (ASR) system 614, the key-value database 606, one or more dynamic libraries (e.g., related to the dynamic server 608), and optionally the moment-displaying device 610 according to some embodiments. In some examples, the ASR system 614 includes one or more software modules and/or one or more processors. For example, the ASR system 614 is a software system. As an example, the ASR system 614 is a hardware system. For example, the ASR system 614 is a software and hardware system.

As shown in FIG. 4, the moment-capturing device 602 is configured to detect, sense, capture, record, and/or analyze one or more moment-associating elements according to various embodiments. For example, the one or more moment-associating elements include one or more audio elements, one or more visual elements, and/or one or more environmental elements. In another example, it is to be appreciated that one or more moment-capturing devices 602 are utilized in the system 600 and each device captures one or more moment-associating elements characterizing the moment where the elements are captured. In some examples, one or more moments are captured by the system 600, and each capture (e.g., an audio element) is assigned a timestamp for the moment-associating elements to be associated to. For example, a first audio element is associated with a first timestamp indicating that the first audio element is captured at a first moment in which the first timestamp corresponds to.

In some embodiments, the one or more audio elements include one or more voice elements of one or more voice-generating sources (e.g., a user and/or a voice-generating device) and/or one or more ambient sound elements (e.g., sound elements from traffic, music, and/or nature).

In some embodiments, the one or more visual elements include one or more pictures, one or more images, one or more screenshots, one or more video frames, one or more projections, and/or one or more holograms, each corresponding to a timestamp associated with the moment in which the visual element(s) is captured.

In some embodiments, the one or more environmental elements include a global position (e.g., longitude, latitude, altitude, country, city, street), a location type (e.g., home, office, school, coffee shop, indoor, outdoor), a moment condition (e.g., temperature, humidity, movement, velocity, direction, ambient noise level, echo properties).

According to some embodiments, the moment-capturing device 602 includes a stationary device (e.g., a computer, a television, and/or a home appliance) and/or a portable device (e.g., a laptop, a phone, a tablet, a watch, a pair of glasses, apparel, a pair of shoes, and/or an accessory).

In various examples, the moment-capturing device 602 is also a moment-displaying device and/or including a local storage configured to store moment-associating elements and/or its processed form (e.g., transcription). As shown in FIG. 8, the system is configured to establish persistent connection with a server to upload audio and receive transcript update in real time, according to some embodiments.

As shown in FIG. 11, in various examples, a moment-capturing device (e.g., the moment-capturing device 602) includes one or more element-capturing device (e.g., one or more cameras, one or more microphones, one or more touchscreens, one or more global positioning systems, one or more thermometers, one or more compasses, one or more photo sensors, one or more accelerometers, one or more pedometers, one or more heartrate sensors, one or more humidity sensors, one or more pressure sensors, and/or one or more wear sensors) configured to capture one or more moment-associating elements (e.g., picture, video, sound, speech, voice, touch, gesture, position, location, environmental setting, direction, movement, brightness, time-of-day, velocity, distance-from-reference, heartrate, humidity, pressure, and/or degree of wear). According to certain embodiments, each of the moment-associating elements captured by the one or more element-capturing devices is coupled to a timestamp representing and/or corresponding to the time of capture, and is stored in a local storage (e.g., the local storage 612), a dynamic storage (e.g., related to the key-value database 606 and/or the dynamic server 608), and/or a web server storage, as shown in FIG. 10.

In some embodiments, one or more of the moment-associating elements captured are processed and/or transformed into moment-corresponding information (e.g., text) which represents the one or more of the moment-associating elements (e.g., by the system 600 according to the method 7000). For example, voice captured from a speech (i.e., a moment-associating element) is transcribed (i.e., processed) into text (i.e., a moment-associating information). In some examples, a sequence of moment-associating elements is processed (e.g., in conjunction) such that additional moment-associating information is extrapolated from processing. For example, processing a single word recorded is not able to indicate the tone of how the word is spoken. However, processing a sentence including the word as well as additional words captured at different moments enables a corresponding tone to be extrapolated, according to some embodiments.

In some embodiments, as shown in FIG. 6, the application programming interface (API) 604 includes a real time API, and/or a representational state transfer (REST) API. For example, the API 604 is configured to push and pull data (e.g., captured elements and/or transcription) at least between two of the moment-capturing device 602, the ASR system 614, the dynamic storage (e.g., related to the key-value database 606 and/or the dynamic server 608), and the moment-displaying device 610. In some embodiments, the frequency of the push and/or pull is designed, set, adjusted such that the moment-displaying device 610 displays a moment-associating information (e.g., transcription) substantially in real time with the capturing of its corresponding moment-associating element(s) (e.g., voice). For example, the frequency is designed such that transcription of a phrase appears on a mobile device (e.g., the moment-displaying device 610) in less than 5 minutes, such as 1 minute, such as 30 seconds, such as 5 seconds, such as 1 second, from the time of recording of the phrase by a mobile device (e.g., the moment-capturing device 602). In some examples, a device (e.g., a phone) is both the moment-capturing device 602 and the moment-displaying device 610.

In some embodiments, the one or more dynamic storages include a first storage (e.g., the key-value database 606) and a second storage (e.g., the dynamic server 608 such as a web storage server). For example, in the second storage (e.g., the web storage server), the original data (e.g., stored at the local storage 612 of the moment-capturing device 602) are processed (e.g., by the moment-capturing device 602) such that a reduced form of the data is transmitted to the first storage (e.g., the key-value database 606). In some examples, the reduced form of the data also includes analytical information such as one or more timestamps. In some embodiments, the data in the reduced form are then processed (e.g., by the ASR system 614) to transform the moment-associating elements (e.g., audio) into moment-associating information (e.g., transcription) such that the processed, complex data are transmitted to the second storage (e.g., the dynamic server 608 such as a web storage server). For example, the data stored in the second storage are pulled by the moment-displaying device 610 for playback, streaming, and/or editing.

According to some embodiments, the ASR system 614 includes a model (e.g., a mathematical model) configured to receive an input of audio (e.g., speech, voice, and/or playback) and generates an output including audio-representing data such as transcription. For example, the output further includes information (e.g., timestamp, tone, volume, speaker identification, noise level, and/or background acoustic environment identification) associated with the transcription (e.g., associated with each sentence and/or associated with each phrase). In some examples, the model of the ASR system 614 is updated and/or improved, for example, by feeding training data to the model. In some examples, an improved model improves the accuracy and/or speed of the ASR system 614 in transcribing audio data.

As shown in FIG. 14, examples of training data include data including audio data and optionally corresponding transcription according to certain embodiments. For example, the corresponding transcription includes speaker identification (e.g., name, gender, age, and/or other elements that may correspond to the audio source such as a speaker), and/or environmental setting (e.g., indoor, outdoor, closed room, and/or open space). In some examples, the training data include one or more characterizing parameters including language spoken, speaker accent, and/or speech velocity. In some embodiments, feeding training data of a particular type improves capability (e.g., speed and/or accuracy) of the ASR system 614 to transcribe that particular type and optionally similar type of audio data. For example, the more training data with a "business meeting" environmental setting that are fed to the model, the better the ASR system 614 is at transcribing new audio data (e.g., real time recordings) having a "business meeting" environmental setting.

According to some embodiments, the ASR system 614 (e.g., a model, such as a mathematical model, of the ASR system 614) is also updated and/or improved by other means such as user input and/or correction (e.g., via a user interface). For example, the ASR system 614 (e.g., a model, such as a mathematical model, of the ASR system 614) is configured to read a set of parameters (e.g., a user voiceprint) which improves the accuracy (e.g., by 10%, by 20%, by 50%, by 90% or more) and/or transcribing certain audio data (e.g., recording of the user's speech, voice, and/or conversation). For example, the voiceprint of a user becomes more comprehensive as more audio recordings of the user are processed by the ASR system 614 (e.g., refining and/or storing audio cues such as waveform). In some examples, the audio data include short-form (e.g., command) audio data and/or long-form (e.g., conversation) audio data. In some examples, a model (e.g., a mathematical model) of the ASR system 614 includes sub-models such as an acoustic model (AM) and/or a language model (LM), each configured to help the ASR system 614 to recognize specific type of sound (e.g., human-speech sound, ambient sound, and/or environmental sound).

As shown in FIG. 5, a model (e.g., a mathematical model) of the ASR system 614 is improved in real time while audio data is transcribed according to some embodiments. In some embodiments, the moment-capturing device 602 (e.g., a microphone) captures audio data (e.g., a conversation) containing a plurality of segments including a first, a second, and a third segment. For example, a first speaker has said the first and third segment and the second segment spoken by a second speaker. In some examples, as shown in FIG. 7, the real-time transcribing system 600 utilizing the ASR system 614 may have mistakenly identified (e.g., incrementally identified) the speaker of the first segment (e.g., of a live recording and/or of an imported file) to be the second speaker and/or have incorrectly transcribed one or more words in the first sentence. In some examples, as the ASR system 614 proceeds to transcribe the second sentence, the increased amount of data fed to the ASR system 614, for example, helps the ASR system 614 to identify that the first sentence is spoken by someone different than the speaker who spoke the second sentence, and to automatically update the transcription of the first sentence (e.g., on the local storage, on the dynamic storage, and/or on the moment-displaying device) to correct its prior error. And further as the ASR system 614 proceeds to transcribe the third segment, the ASR system 614 improves the accuracy in transcribing speech of the first speaker, for example, owing to the increased amount of data fed through the ASR system 614 according to some embodiments.

According to certain embodiments, the ASR system 614 is also configured to segment an audio recording into segments, such as segments having the same speaker or speakers. For example, in additional to recognizing words, phrases, and other speech-characterizing characteristics (e.g., accent, tone, punctuation, volume, and/or speed), the ASR system 614 is configured to extrapolate a start time and an end time of each word, phrase, sentence, topic, and/or the times where speaker-change occurs. As shown in FIG. 9, using one or more of such information, the ASR system 614 segments an audio recording of a conversation into segments where any of such information changes (e.g., where a speaker-change occurs) according to some embodiments. For example, timestamps are tagged, marked, and/or noted by the ASR system 614 to correspond such transition of information (e.g., a speaker change and/or a tone change) to a specific time of the speech. In some examples, only the timestamps of such transition points are marked with information change, or alternatively, all timestamps are marked by the information.

In various examples, one or more moment-capturing elements (e.g., a word, a phrase, a picture, a screenshot) are used as anchor points by the system 600 to enable a user to navigate the processed data (e.g., transcription) and/or the unprocessed data (e.g., audio recording), and/or to search (e.g., to keyword search) with improved usability according to some embodiments. For example, a transcription of a speech is navigable and/or searchable (e.g., by a user) to quickly (e.g., in less than a second) find where a keyword is said during the speech, and be able to be directed to that segment of the speech (i.e., unprocessed form) and/or to that segment of the transcription (i.e., processed data form). In some examples, the transcription additionally or alternatively includes one or more images (e.g., thumbnails) as anchor points, in which each of the images corresponds to a timestamp and thus the segment where such image is presented is associated to that particular moment or moments. In some embodiments, the images are presented in-line with the rest of the transcription. In some examples, images are presented and/or recreated separately from the text (e.g., a photo-gallery). For example, the one or more images are captured manually (e.g., by a user), and/or automatically (e.g., a computer capturing each slide of a slide show presentation at the time when the slide starts).

In some embodiments, one or more object and/or image recognition systems are utilized such that a user of the system 600 can navigate and/or search the data (e.g., the processed data and/or the unprocessed data) using information beyond text. For example, a user does not need to scroll through a gallery of more than 100 images to find the image of interest, instead, a user can input an image in which the system is configured to search its image anchor points and find the moment where the image inputted by the user matches the image anchor point the most (e.g., more than 60% match, more than 80% match, or more than 90% match).

As shown in FIG. 12 and/or FIG. 13, in some embodiments, the system 600 is a smart note-taking and/or collaboration application according to certain embodiments. For example, the system help aid focus, collaboration and/or efficiency in meetings, interviews, lectures, and/or other important conversations. In some examples, the system 600 ambiently records one or more conversations and transcribes the one or more conversations in real time and/or in near-real time (e.g., delayed by less than 1 min, less than 30 second, or less than 10 second). In some examples, with the power of artificial intelligence (AI), the system 600 automatically identifies keywords and/or speakers, and/or automatically segments an audio recording. In some examples, the system 600 enables the content to be searchable (e.g., via keyword search) and/or shareable (e.g., via social media).

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) supports call recording such that a user can capture audio without needing to activate a microphone manually (e.g., without needing to click a microphone button on a phone), instead, the system can be prompted to start capturing/recording when a call starts. For example, such feature enables the system to be utilized for sales calls, phone interviews, and/or other important conversations.

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) supports advanced export options such that a user can export processed and/or unprocessed data (e.g., audio, transcription, image, video) including one or more of speaker labels, one or more timestamps, one or more text formats (e.g., .txt, .pdf, and/or .vtt) and/or one or more audio formats (e.g., .mp3, m4a, and/or .wma).

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) is configured to export text (e.g., export text to a clipboard, and/or export text directly into one or more other applications and/or software) and/or to export audio (e.g., export audio in .mp3).

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) generates one or more notifications for notifying (e.g., for notifying a user). For example, a notification is a reminder to a user to start capturing of audio and/or one or more other moment-associating elements. For example, a notification is sent to a user at the start of a meeting recorded on a calendar (e.g., the start of a meeting recorded on the calendar that is synced to the system). In some examples, a notification is sent to a second user when a first user shares and/or sends a file to the second user.

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) is configured to rematch one or more speakers to identify and label the speakers automatically, after manually tagging a few voice samples of each speaker in a conversation.

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) is configured such that a user manages and/or edits the local storage (e.g., the local storage 612) such that the user can control how much space the system uses to store data (e.g., one or more local copies of the audio recordings).

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) supports one or more Bluetooth devices such that the one or more Bluetooth-connected devices (e.g., one or more Bluetooth headphones) can be used to capture moment-associating elements (e.g., voice).

In some embodiments, the system (e.g., the system described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) extracts keywords from an audio recording.

In some embodiments, the method (e.g., the method described and/or implemented according to at least FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and/or FIG. 14) is performed automatically with respect to at least one process of the method. For example, some processes of the method are performed automatically. As an example, all processes of the method are performed automatically.

According to some embodiments, systems and methods for live broadcasting of artificial intelligence (AI) based real-time transcription of conversations or speeches are disclosed. According to certain embodiments, systems and methods for live broadcasting of context-aware transcription and/or other elements (e.g., audio and/or photo) related to conversations and/or speeches are disclosed. For example, some embodiments are disclosed to describe systems and methods for processing the voice audio captured from face-to-face conversation, phone calls, conference speeches, lectures, and/or casual presentation in real time using AI-based automatic transcription systems and broadcasting the audio and/or transcriptions to viewers (e.g., lively).

Figure 15:
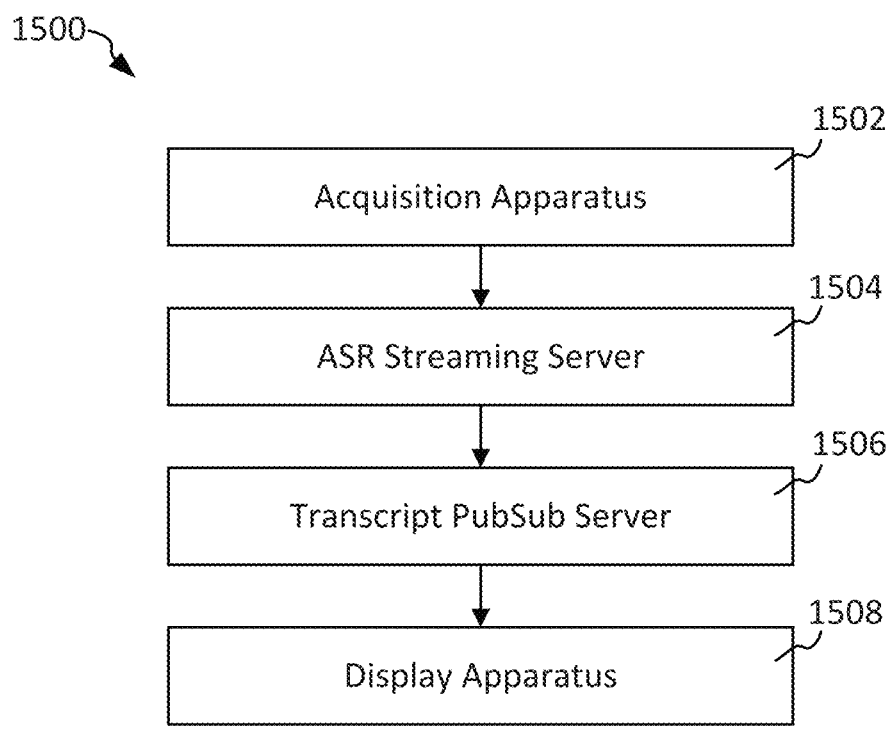
FIG. 15 is a simplified diagram showing a system for processing and broadcasting a moment-associating element according to some embodiments of the present invention.

FIG. 15 is a simplified diagram showing a system for processing and broadcasting one or more moment-associating elements, according to some embodiments of the present invention. This diagram is merely an example, which should not unduly limit the scope of the claims. One of ordinary skill in the art would recognize many variations, alternatives, and modifications. In some examples, the system 1500 includes an acquisition apparatus 1502, an ASR streaming server 1504, a transcript Publish-Subscribe (PubSub) server 1506, and a display apparatus 1508. In certain examples, the system 1500 is for capturing and broadcasting one or more conversations and/or one or more speeches. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In various embodiments, the acquisition apparatus 1502 is configured to receive one or more pre-captured moment-associating elements and/or to capture the one or more moment-associating elements. As an example, the one or more moment-associating elements includes audio data. For example, the acquisition apparatus 1502 includes an audio recorder, such as a microphone, such as a microphone of a mobile phone or a conference room. In certain examples, the acquisition apparatus 1502 is configured to be controlled via a mobile app and/or a web app, such as via a user interface. In various examples, the acquisition apparatus 1502 is a client device configured to deliver the one or more moment-associating elements to the ASR streaming server 1504, such as via a wireless connection (e.g., Bluetooth) or a wired connection (e.g., USB). In some examples, the acquisition apparatus 1502 is configured to stream, such as continuously or in intervals, the one or more moment-associating elements to the ASR streaming server 1504 via a streaming protocol. In some examples, the acquisition apparatus 1502 is further configured to transfer the one or more moment-associating elements to the transcript PubSub Server 1506.

In various embodiments, the ASR streaming server 1504 is configured to receive the one or more moment-associating elements from the acquisition apparatus 1502. In certain examples, the ASR streaming server 1504 is configured to receive moment-associating elements from multiple acquisition apparatuses, such as concurrently. In some examples, the ASR streaming server 1504 is configured to transform the one or more moment-associating elements into one or more pieces of moment-associating information. In various examples, the ASR streaming server 1504 is configured to transform audio data (e.g., as moment-associating element) into a transcript (e.g., as moment-associating information). In certain examples, the ASR streaming server 1504 is configured to transfer, such as in real time or in intervals, the one or more moment-associating elements (e.g., audio data) and/or its corresponding one or more moment-associating information (e.g., transcript) to the acquisition apparatus 1502 and/or the transcript PubSub server 1506.

In various embodiments, the transcript PubSub server 1506 is configured to receive the one or more moment-associating elements (e.g., audio data) and its corresponding one or more moment-associating information (e.g., transcript) from the ASR streaming server 1504. In some examples, the transcript PubSub server 1506 is configured to receive the one or more moment-associating elements (e.g., audio data) from the acquisition apparatus 1502. In various examples, the transcript PubSub server 1506 is configured to accept subscription from the display apparatus 1508. In certain examples, the transcript PubSub server 1506 is configured to accept subscriptions from multiple display apparatuses. In some examples, such as when the acquisition apparatus 1502 is the display apparatus 1508, the transcript PubSub server 1506 is configured to accept subscriptions from the acquisition apparatus. In various examples, the transcript PubSub server 1506 is configured to stream (e.g., publish) the one or more moment-associating information (e.g., transcript) and/or the one or more moment-associating elements (e.g., audio data) to the display apparatus 1508 (e.g., a mobile device). In certain examples, the transcript PubSub server 1506 is configured to stream (e.g., publish) the one or more moment-associating information (e.g., transcript) and/or the one or more moment-associating elements (e.g., audio data) to multiple display apparatuses, such as multiple display apparatuses subscribed to the transcript PubSub server.

In various embodiments, the display apparatus 1508 is configured to subscribe to the transcript PubSub server 1506 and to receive one or more moment-associating information (e.g., transcript) and/or the one or more moment-associating elements (e.g., audio data) from the transcript PubSub server. In certain examples, the display apparatus 1508 is configured to display the received one or more moment-associating information (e.g., transcript) and/or the one or more moment-associating elements (e.g., audio data) to a user, such as via a user interface.

In some embodiments, when the ASR streaming server 1504 generates a new transcript, such as a new transcript with updated transcription of a previously received audio data or a new transcript corresponding to newly received audio data, the ASR streaming server is configured to transmit the new transcript to the transcript PubSub server 1504. In certain examples, the transcript PubSub server 1506, such as when receiving the new transcript, is configured to transmit the new transcript to the display apparatus 1508, such as to one or more subscribed devices (e.g., servers). In various examples, the display apparatus 1508, such as when receiving the new transcript, is configured to display the new transcript to a user in real time.

In certain examples, the acquisition apparatus 1502 is configured to acquire multimedia data of multiple data types including speech audio, photo (e.g., screenshot), and/or video, and to transmit the multimedia data to the transcript PubSub server 1506. In some examples, the transcript PubSub server 1506 is configured to transmit the received multimedia data to the display apparatus 1508. In certain examples, the acquisition apparatus 1502 is configured to transmit the multimedia data to the ASR streaming server 1504 for processing, such as to produce a multimedia transcript corresponding to the multimedia data, which in some examples, is further transmitted to the transcript PubSub server 1506 (e.g., via the ASR streaming server 1504). In some examples, the transcript PubSub server 1506 is configured to transmit the multimedia data and/or the multimedia transcript to one or more subscribed display apparatus (e.g., including display apparatus 1508). In certain examples, the transcript PubSub server is configured to transmit audio data, photo data (e.g., screenshots), video data, and/or a transcript from a first subscriber (e.g., a first mobile device) to a second subscriber (e.g., a second mobile device). In various examples, each subscriber is a different client device.

Figure 16:
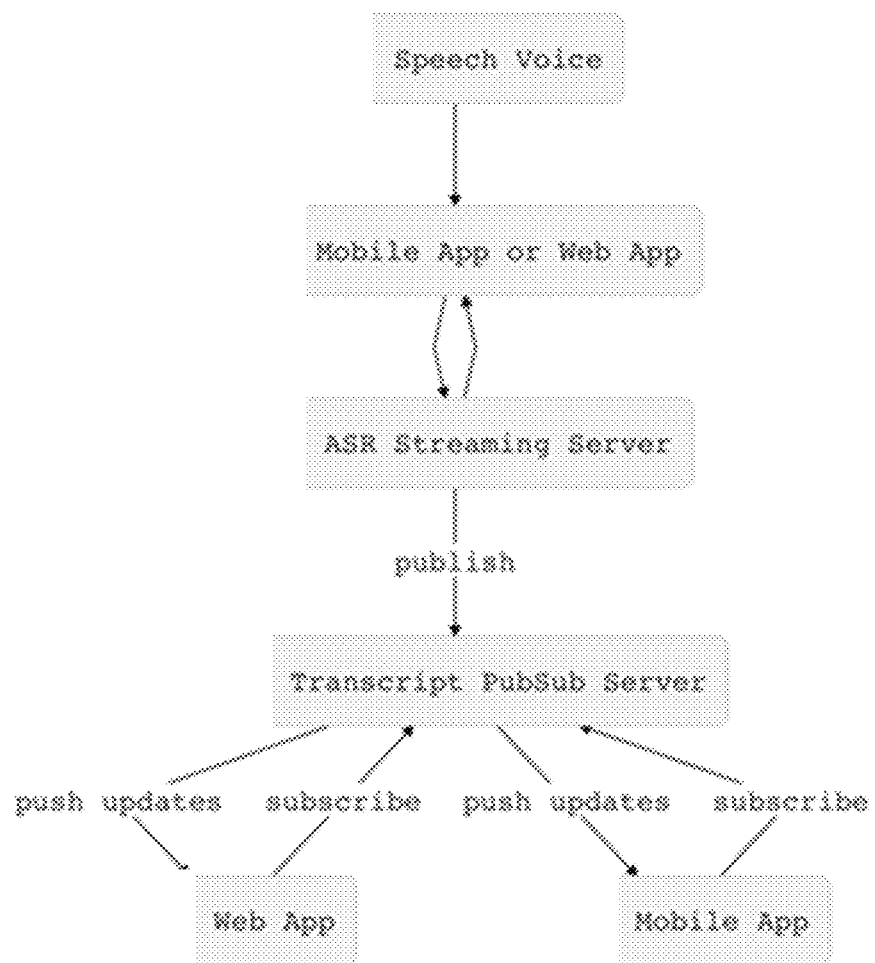
FIG. 16 is a simplified diagram showing a method for processing and broadcasting a moment-associating element, according to some embodiments of the present invention.

FIG. 16 is a simplified diagram showing a method for processing and broadcasting a moment-associating element, according to some embodiments of the present invention. This diagram is merely an example, which should not unduly limit the scope of the claims. One of ordinary skill in the art would recognize many variations, alternatives, and modifications. In some examples, the method includes transmitting the speech voice into a mobile app and/or a web app, transmitting the speech voice to an ASR streaming server, publishing a transcript (e.g., corresponding to the speech voice) to a transcript Pub Sub server, and pushing one or more transcript updates to one or more subscribed web apps and/or one or more subscribed mobile apps. In certain embodiments, the ASR streaming server is configured to transmit the transcript back to the mobile app or web app which received or captured the speech voice. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

Figure 17:
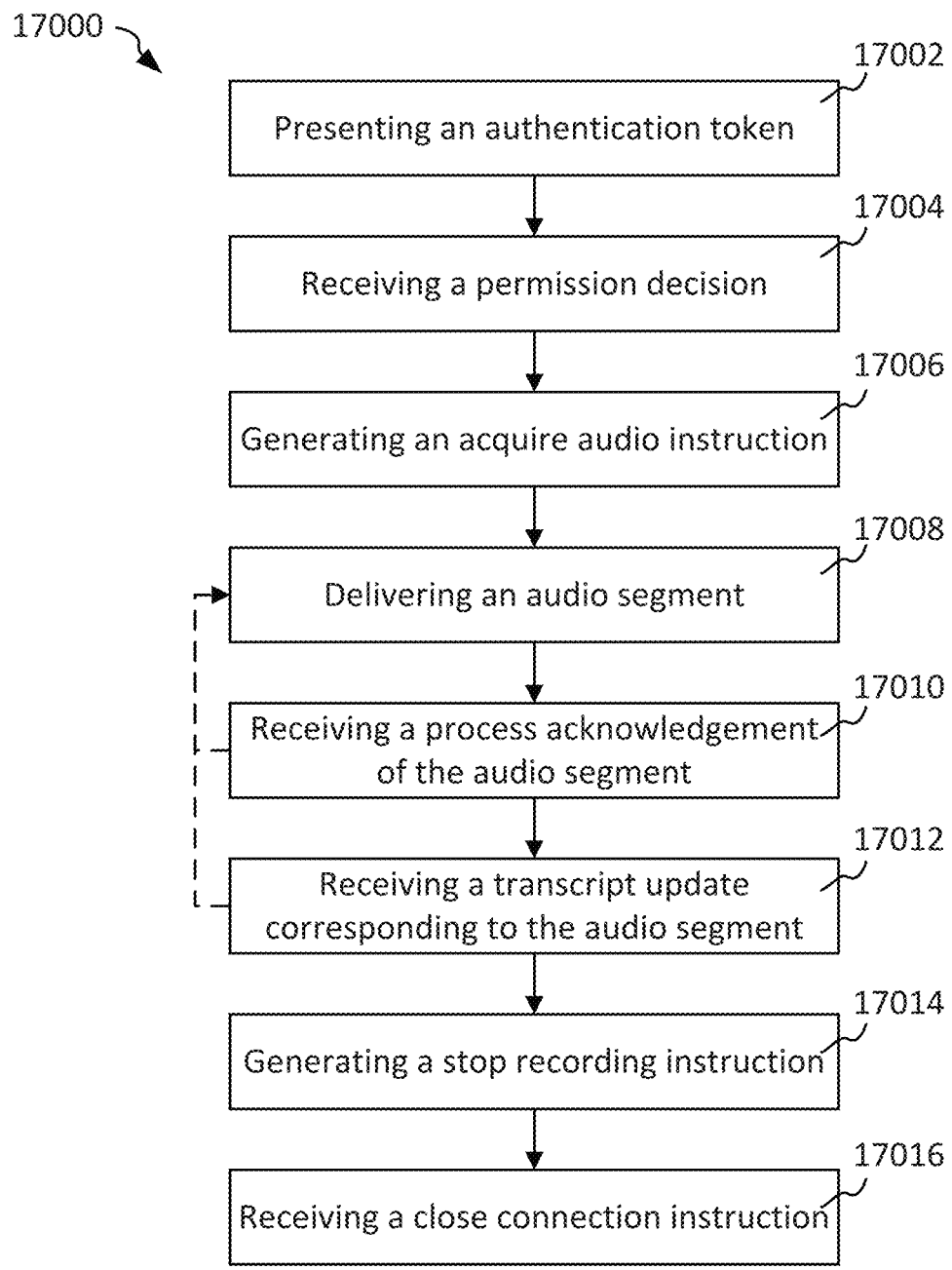
FIG. 17 is a simplified diagram showing a method for processing and broadcasting a moment-associating element, according to some embodiments of the present invention.

FIG. 17 is a simplified diagram showing a method for processing and broadcasting a moment-associating element, according to some embodiments of the present invention. This diagram is merely an example, which should not unduly limit the scope of the claims. One of ordinary skill in the art would recognize many variations, alternatives, and modifications. In some examples, the method 17000 includes a process 17002 of presenting an authentication token, a process 17004 of receiving a permission decision, a process 17006 of generating an acquire audio instruction, a process 17008 of delivering an audio segment, a process 17010 of receiving a process acknowledgement, a process 17012 of receiving a transcript update, a process 17014 of generating a stop recording instruction, and/or a process 17016 of receiving a close connection instruction. In certain examples, the method describes a full-duplex communication protocol (e.g., Web Socket) between a client and a server. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, the process 17002 of presenting an authentication token includes presenting, by a client, the authentication token to a server. In some examples, presenting the authentication token includes presenting, by a subscriber (e.g., the acquisition apparatus 1502 and/or the display apparatus 1508), the authentication token to a publisher (e.g., the ASR streaming server 1504). In certain embodiments, the token authenticates a subscriber (e.g., a mobile app or a web app) to subscribe to a specified speech, such as according to a behavior of a specified user (e.g., the user of client). In some examples, a PubSub subscriber can disconnect (e.g., stop the subscription) at any time. In various examples, a PubSub subscriber can re-subscribe to the PubSub publisher and the PubSub publisher is configured to specify a last previously received transcript update index along with the authentication token.

In various embodiments, the process 17004 of receiving a permission decision includes receiving, by the subscriber, a permission decision transmitted from the publisher. In some examples, the permission decision includes a positive decision (e.g., grant permission), or a negative decision (e.g., deny permission).

In various embodiments, such as when the permission decision is a positive decision, the process 17006 of generating an acquire audio instruction includes generating the start recording instruction and deliver the instruction to an acquisition apparatus (e.g., acquisition apparatus 1502). In some examples, the acquire audio instruction includes a start offset for instructing the acquisition apparatus to begin acquisition (e.g., of audio data) after a time delay indicated by the start offset (e.g., in milliseconds or seconds). As an example, the start offset is non-zero and/or is determined according to a previously-received offset, such as when resuming capturing of audio data after a pause. In certain examples, generating the acquire audio instruction includes generating an audio retrieval instruction for receiving pre-captured audio data, such as from a cloud storage of the server or a local storage of the client.

In various embodiments, the process 17008 of delivering an audio segment includes delivering by a client, such as a mobile phone (e.g., acquisition apparatus 1502) with an audio recorder, to a server, such as an ASR streaming server (e.g., ASR streaming server 1504). In certain examples, delivering the audio segment includes delivering multiple audio segments, such as multiple audio segments of the same audio recording (e.g., a conversation). In various examples, delivering the audio segment includes delivering the audio segment in the form of raw data, encoded data, or compressed data. In some examples, the process 17008 of delivering an audio segment is repeated, such as until a whole audio recording is delivered.

In various embodiments, the process 17010 of receiving a process acknowledgement includes receiving, by the client, the process acknowledgement from a server. In some examples, the process acknowledgement corresponds to the server having completed processing the audio segment or multiple audio segments. For example, the process acknowledgement corresponds to the server having completed processing all the audio segments of an audio recording (e.g., conversation). In various examples, the process 17010 and the process 17008 are asynchronous. For example, the process 17010 of receiving a process acknowledgement occurs for every two or more audio segments delivered according to the process 17008. In certain examples, the process 17008 of delivering an audio segment and the process 17010 of receiving a process acknowledgement are repeated.

In various embodiments, the process 17012 of receiving a transcript update includes receiving, such as by a display apparatus (e.g., display apparatus 1508), the transcript update from a server, such as a ASR streaming server (e.g., ASR streaming server 1504) or from the transcript PubSub server (e.g., transcript PubSub server 1506). In some examples, receiving the transcript update includes receiving a transcript update for replacing a previously received transcript or transcript update. In certain examples, receiving the transcript update includes receiving a transcript update for appending one or more new transcriptions to a previously received transcript or transcript update. In various examples, receiving the transcript update includes receiving a transcript update for revising one or more existing transcriptions. In some examples, the process 17012 of receiving a transcript update is repeated, such as until all a complete transcript corresponding to an audio recording is received.

In various embodiments, the process 17014 of generating a stop recording instruction includes generating, by the client (e.g., display apparatus 1508) or by the server (e.g., ASR streaming server 1504 or transcript PubSub server 1506), the stop recording instruction and delivering the stop recording instruction to an acquisition apparatus (e.g., acquisition apparatus 1502). In some examples, the stop recording instruction is generated when the whole (e.g., 100%) audio recording (e.g., a speech conversation) has been delivered from the client to the server, such as according to the process 17008. In certain examples, the stop recording instruction is generated when the process acknowledgement for each and all segments of the audio recording have been received, such as by the client from the server. In various embodiments, the stop recording instruction is configured for, when received by the acquisition apparatus (e.g., having an audio recorder), terminate capturing of audio data.

In various embodiments, the process 17016 of receiving a close connection instruction includes receiving, by the client, the close connection instruction delivered from the server. In some examples, the close connection instruction is configured for closing the communication between the server and client such that transmission of audio data and transcript data is terminated between the server and client, such as until connection is re-established (e.g., when the server grant a new permission).

Figure 18:
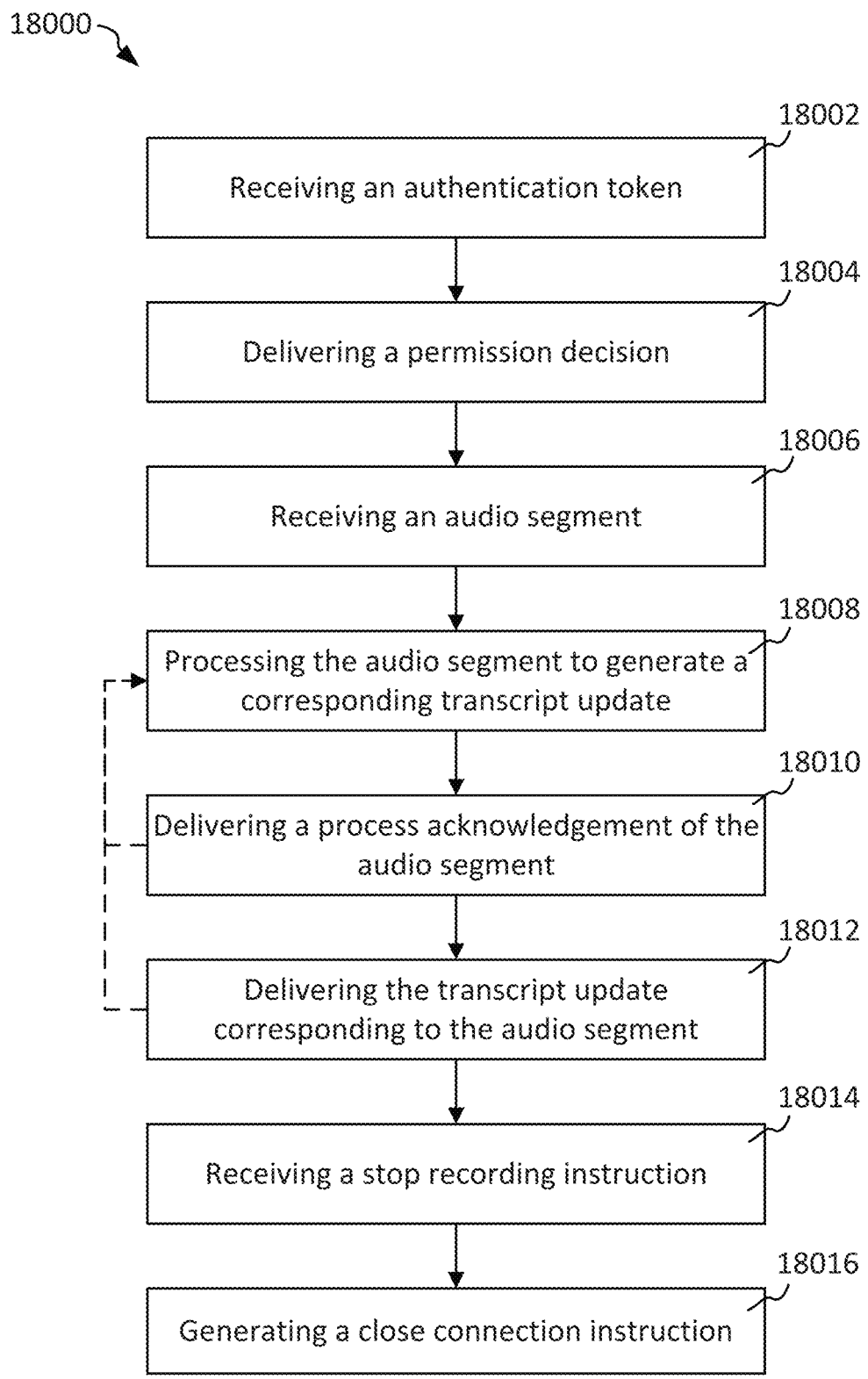
FIG. 18 is a simplified diagram showing a method for processing and broadcasting a moment-associating element, according to some embodiments of the present invention.

FIG. 18 is a simplified diagram showing a method for processing and broadcasting a moment-associating element, according to some embodiments of the present invention. This diagram is merely an example, which should not unduly limit the scope of the claims. One of ordinary skill in the art would recognize many variations, alternatives, and modifications. In some examples, the method 18000 includes a process 18002 of receiving an authentication token, a process 18004 of delivering a permission decision, a process 18006 of receiving an audio segment, a process 18008 of processing the audio segment to generate a transcript update, a process 18010 of delivering a process acknowledgement, a process 18012 of delivering the transcript update, a process 18014 of receiving a stop recording instruction, and/or a process 18016 of generating a close connection instruction. In certain examples, the method describes a full-duplex communication protocol (e.g., WebSocket) between a client and a server. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, the process 18002 of receiving an authentication token includes receiving, by a server, the authentication token from a client. In some examples, receiving the authentication token includes receiving, by a publisher (e.g., the transcript Pub Sub server 1506 and/or the ASR streaming server 1504), the authentication token from a subscriber (e.g., the acquisition apparatus 1502 and/or the display apparatus 1508).

In various embodiments, the process 18004 of delivering a permission decision includes delivering, by the publisher, a permission decision transmitted to the subscriber. In some examples, the permission decision includes a positive decision (e.g., grant permission), or a negative decision (e.g., deny permission).

In various embodiments, the process 18006 of receiving an audio segment includes receiving by a server, such as an ASR streaming server (e.g., ASR streaming server 1504) from a client, such as a mobile phone (e.g., acquisition apparatus 1502) with an audio recorder. In certain examples, receiving the audio segment includes receiving multiple audio segments, such as multiple audio segments of the same audio recording (e.g., a conversation). In various examples, receiving the audio segment includes receiving the audio segment in the form of raw data, encoded data, or compressed data. In some examples, the process 18006 of receiving an audio segment is repeated, such as until a whole audio recording is delivered.

In various embodiments, the process 18008 of processing the audio segment to generate a corresponding transcript update includes transcribing the audio segment into a transcript update. In various examples, processing the audio segment includes feeding the audio segment into an automatic speech recognition module (e.g., as part of the ASR streaming server 1504). In some examples, processing the audio segment includes processing multiple audio segments. In certain examples, the process 18008 of processing the audio segment is repeated, such as repeated until each and all audio segments received is processed.

In various embodiments, the process 18010 of delivering a process acknowledgement includes delivering, by a server, the process acknowledgement to a client. In some examples, the process acknowledgement corresponds to the server having completed processing the audio segment or multiple audio segments. For example, the process acknowledgement corresponds to the server having completed processing all the audio segments of an audio recording (e.g., conversation). In various examples, the process 18010, the process 18008, and/or the process 18006 are asynchronous. For example, the process 18010 of delivering a process acknowledgement occurs for every two or more audio segments received according to the process 18006 and/or processed according to the process 18008. In certain examples, the process 18006 of receiving an audio segment, the process 18008 of processing an audio segment, and the process 18010 of delivering a process acknowledgement are repeated.

In various embodiments, the process 18012 of delivering a transcript update includes delivering from a server, such as a ASR streaming server (e.g., ASR streaming server 1504) or from the transcript PubSub server (e.g., transcript PubSub server 1506), the transcript update to a display apparatus (e.g., display apparatus 1508). In some examples, delivering the transcript update includes delivering a transcript update for replacing a previously delivered transcript or transcript update. In certain examples, delivering the transcript update includes delivering a transcript update for appending one or more new transcriptions to a previously delivered transcript or transcript update. In various examples, delivering the transcript update includes delivering a transcript update for revising one or more existing transcriptions. In some examples, the process 18012 of delivering a transcript update is repeated, such as until all a complete transcript corresponding to an audio recording is delivered.

In various embodiments, the process 18014 of receiving a stop recording instruction includes receiving, by a server (e.g., ASR streaming server 1504 or transcript PubSub server 1506), the stop recording instruction (e.g., from a client) and delivering the stop recording instruction to an acquisition apparatus (e.g., acquisition apparatus 1502). In some examples, the stop recording instruction is received when the whole (e.g., 100%) audio recording (e.g., a speech conversation) has been received by the server from the client, such as according to the process 18006. In certain examples, the stop recording instruction is received when the process acknowledgement for each and all segments of the audio recording have been received, such as by the client from the server. In various embodiments, the stop recording instruction is configured for, when received by the acquisition apparatus (e.g., having an audio recorder), terminate capturing of audio data.

In various embodiments, the process 18016 of generating a close connection instruction includes generating the close connection instruction by the server and delivering the close connection instruction to the client. In some examples, the close connection instruction is configured for closing the communication between the server and client such that transmission of audio data and transcript data is terminated between the server and client, such as until connection is re-established (e.g., when the server grant a new permission).

Figure 19:
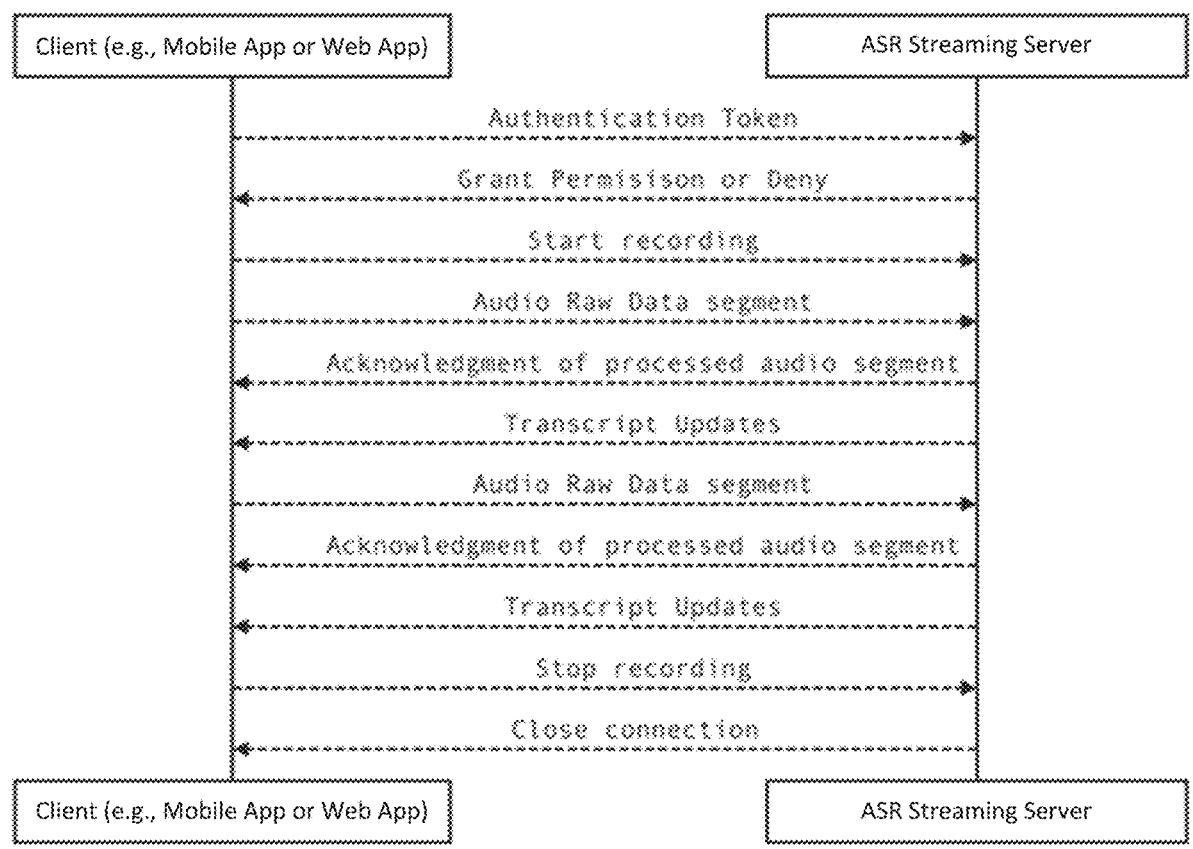
FIG. 19 is a simplified diagram showing a method for processing and broadcasting a moment-associating element, according to some embodiments of the present invention.

FIG. 19 is a simplified diagram showing a method for processing and broadcasting a moment-associating element, according to some embodiments of the present invention. This diagram is merely an example, which should not unduly limit the scope of the claims. One of ordinary skill in the art would recognize many variations, alternatives, and modifications. In some examples, the method includes transferring an authentication token, receiving a permission decision, transferring an acquire audio instruction, transferring an audio segment, transferring a process acknowledgement, transferring a transcript update, transferring a stop recording instruction, and/or transferring a close connection instruction. In certain examples, the method describes a full-duplex communication protocol (e.g., WebSocket) between a client and a server. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

Figure 20:
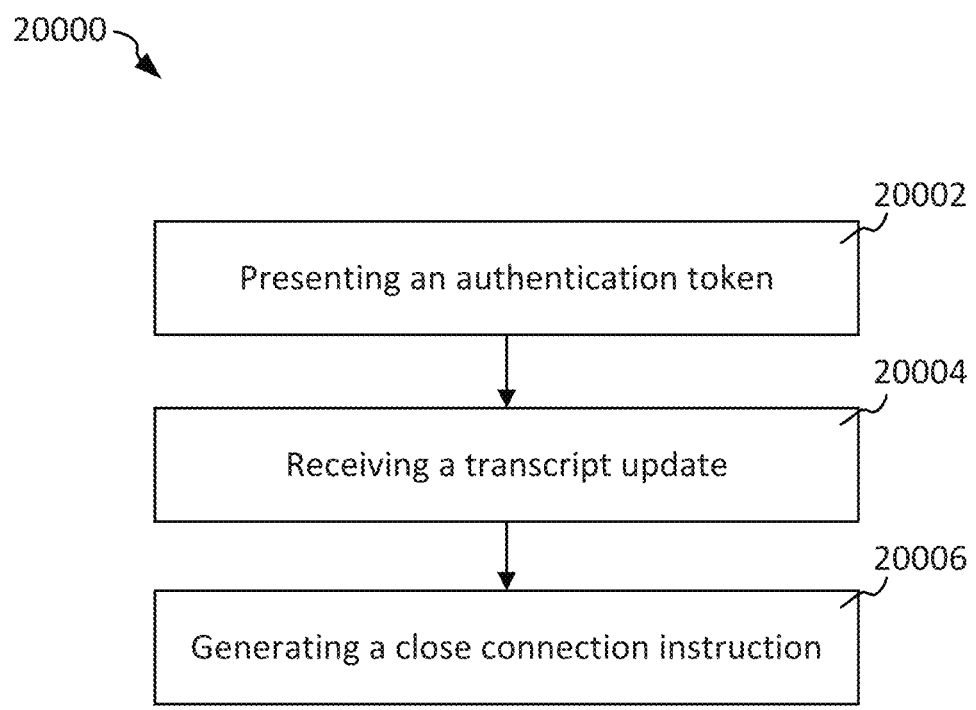
FIG. 20 is a simplified diagram showing a method for processing and broadcasting a moment-associating element, according to some embodiments of the present invention.

FIG. 20 is a simplified diagram showing a method for processing and broadcasting a moment-associating element, according to some embodiments of the present invention. This diagram is merely an example, which should not unduly limit the scope of the claims. One of ordinary skill in the art would recognize many variations, alternatives, and modifications. In some examples, the method 20000 includes a process 20002 of presenting an authentication token, a process 20004 of receiving a transcript update, and a process 20006 of generating a close connection instruction. In certain examples, the method describes a full-duplex communication protocol (e.g., Web Socket) between a Pub Sub client and a Pub Sub server. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, the process 20002 of presenting an authentication token includes presenting, by a client, the authentication token to a server. In some examples, presenting the authentication token includes presenting, by a subscriber (e.g., the acquisition apparatus 1502 and/or a web app or a mobile app), the authentication token to a publisher (e.g., the transcript PubSub server 1506).

In various embodiments, the process 20004 of receiving a transcript update includes receiving, such as by a display apparatus (e.g., a web app or a mobile app), the transcript update from a server, such as from publisher (e.g., transcript PubSub server 1506). In some examples, receiving the transcript update includes receiving a transcript update for replacing a previously received transcript or transcript update. In certain examples, receiving the transcript update includes receiving a transcript update for appending one or more new transcriptions to a previously received transcript or transcript update. In various examples, receiving the transcript update includes receiving a transcript update for revising one or more existing transcriptions. In some examples, the process 20004 of receiving a transcript update is repeated, such as until all a complete transcript corresponding to an audio recording is received.

In various embodiments, the process 20006 of generating a close connection instruction includes generating the close connection instruction by the client, such as the subscriber (e.g., a web app or a mobile app) and delivering the close connection instruction to the server, such as the publisher (e.g., the transcript PubSub server 1506). In some examples, the close connection instruction is configured for closing the communication between the server and client such that transmission of transcript data is terminated between the server and client, such as until connection is re-established (e.g., when the server grant a new permission).

Figure 21:
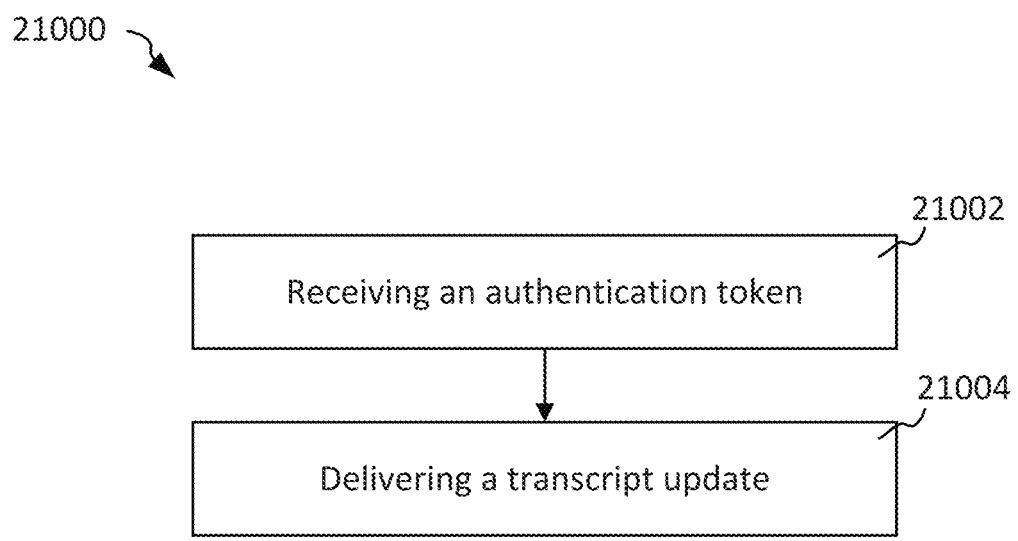
FIG. 21 is a simplified diagram showing a method for processing and broadcasting a moment-associating element, according to some embodiments of the present invention.

FIG. 21 is a simplified diagram showing a method for processing and broadcasting a moment-associating element, according to some embodiments of the present invention. This diagram is merely an example, which should not unduly limit the scope of the claims. One of ordinary skill in the art would recognize many variations, alternatives, and modifications. In some examples, the method 21000 includes a process 21002 of receiving an authentication token, and a process 21004 of delivering a transcript update. In certain examples, the method describes a full-duplex communication protocol (e.g., Web Socket) between a Pub Sub client and a Pub Sub server. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, the process 21002 of receiving an authentication token includes receiving, by a server, the authentication token from a client. In some examples, receiving the authentication token includes receiving, by a publisher (e.g., the transcript PubSub server 1506), the authentication token to a subscriber (e.g., the acquisition apparatus 1502 and/or a web app or a mobile app).

In various embodiments, the process 21004 of delivering a transcript update includes delivering, such as by a publisher (e.g., transcript PubSub server 1506), the transcript update to a subscriber, such as a display apparatus (e.g., a web app or a mobile app). In some examples, delivering the transcript update includes delivering a transcript update for replacing a previously received transcript or transcript update. In certain examples, delivering the transcript update includes delivering a transcript update for appending one or more new transcriptions to a previously delivered transcript or transcript update. In various examples, delivering the transcript update includes delivering a transcript update for revising one or more existing transcriptions. In some examples, the process 21004 of delivering a transcript update is repeated, such as until all a complete transcript corresponding to an audio recording is delivered.

In various embodiments, the method 21000 further includes receiving a close connection instruction by the publisher from the client. In some examples, the close connection instruction is configured for closing the communication between the server and client such that transmission of transcript data is terminated between the server and client, such as until connection is re-established (e.g., when the server grant a new permission).

Figure 22:
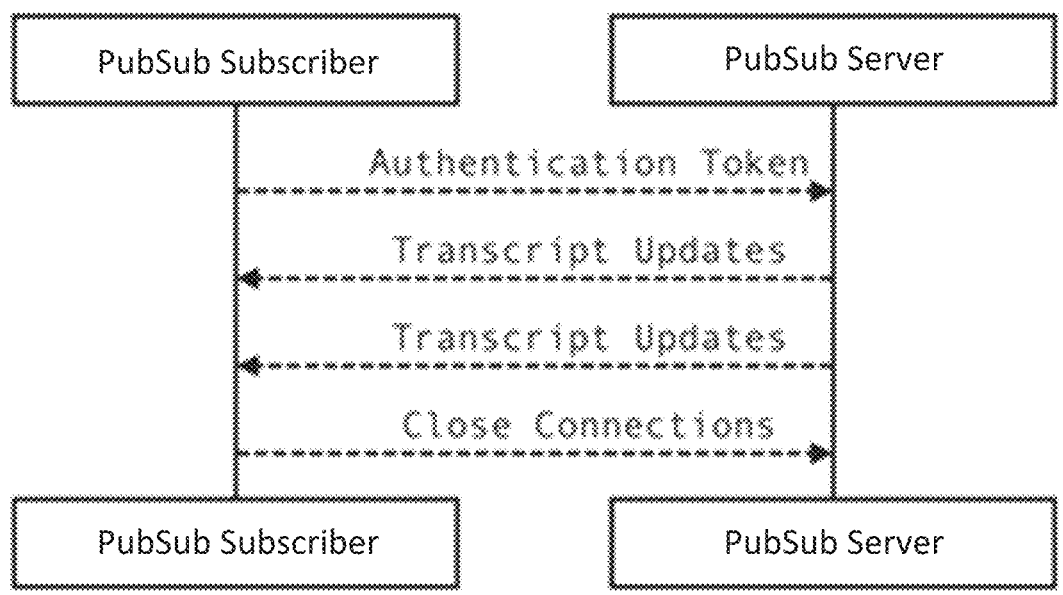
FIG. 22 is a simplified diagram showing a method for processing and broadcasting a moment-associating element, according to some embodiments of the present invention.

FIG. 22 is a simplified diagram showing a method for processing and broadcasting a moment-associating element, according to some embodiments of the present invention. This diagram is merely an example, which should not unduly limit the scope of the claims. One of ordinary skill in the art would recognize many variations, alternatives, and modifications. In some examples, the method includes transferring an authentication token, transferring a transcript update, and transferring a close connection instruction. In certain examples, the method describes a full-duplex communication protocol (e.g., Web Socket) between a Pub Sub client and a Pub Sub server. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

Figure 23:
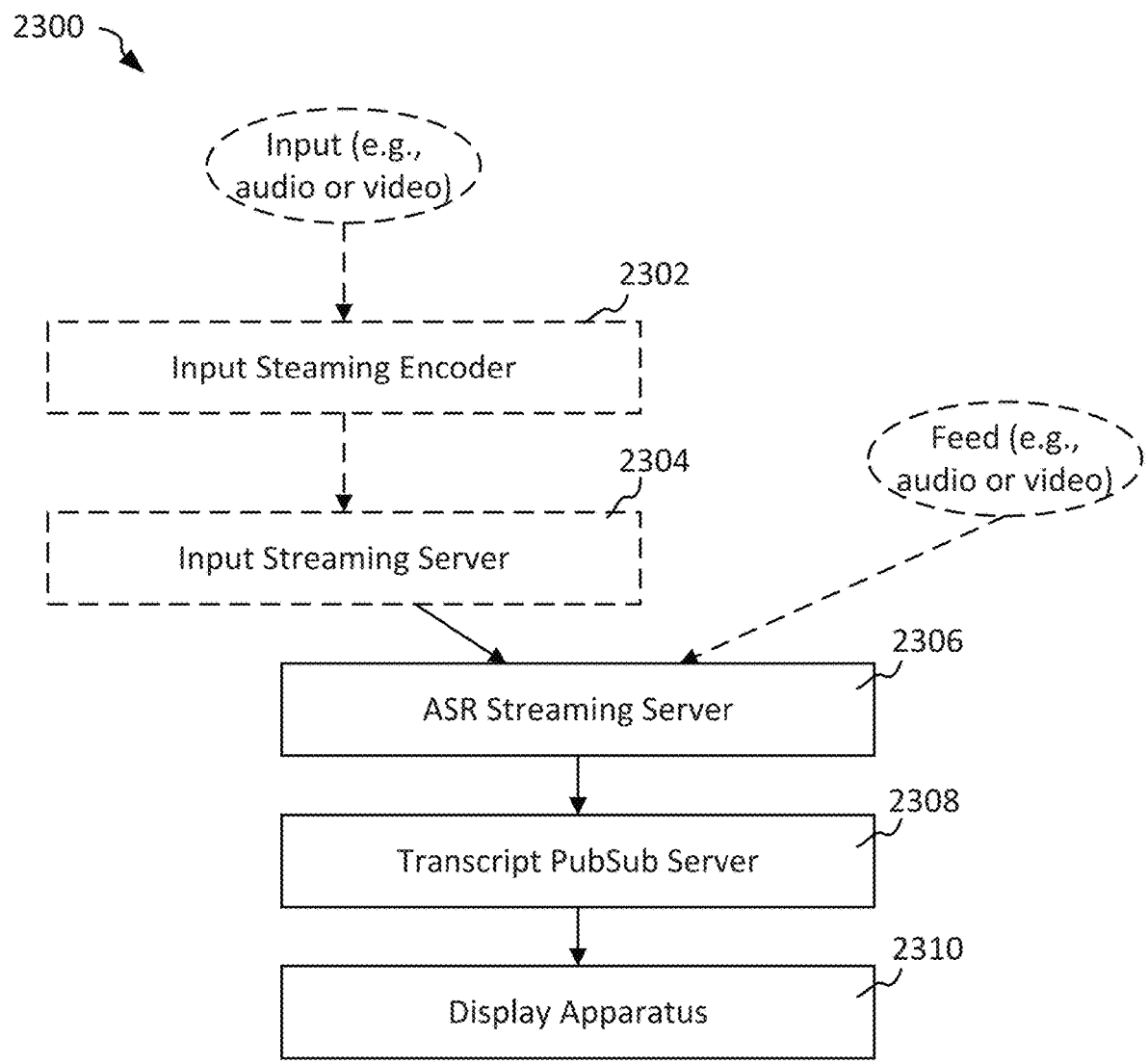
FIG. 23 is a simplified diagram showing a system for processing and broadcasting a moment-associating element, according to some embodiments of the present invention.

FIG. 23 is a simplified diagram showing a system for processing and broadcasting one or more moment-associating elements, according to some embodiments of the present invention. This diagram is merely an example, which should not unduly limit the scope of the claims. One of ordinary skill in the art would recognize many variations, alternatives, and modifications. In some examples, the system 2300 includes an automatic voice recognition (ASR) streaming server 2306, a transcript PubSub server 2308, and a display apparatus 2310. In certain examples, the system 2300 further includes an input steaming encoder 2302 and an input streaming server 2304. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In various examples, the system 2300 is configured to capture and broadcast one or more conversations and/or one or more speeches. In certain examples, the system 2300 is configured to receive audio and/or video input, such as of a recording of a conference speech. As an example, the system 2300 is configured to capture, process, and broadcast a conference speech, such as in real time (e.g., live input to live output), by receiving audio or video input captured through a microphone or a video camera.

In various embodiments, the input streaming encoder 2302 is configured to receive an input (e.g., an audio input or a video input), process the input such as to encode the input, and deliver a streaming feed to the input streaming server 2304. In certain examples, the input streaming encoder 2302 is configured to encode the input using a network streaming protocol such as RTMP, SDI, MPEG-TS. In various embodiments, the input streaming server 2304 is configured to receive and decode the streaming feed from the input streaming encoder 2302, encode the decoded input stream into a format (e.g., an audio format, such as the PCM raw audio format) that the ASR streaming server 2306 is configured to accept, and to deliver the streaming feed to the ASR streaming server 2306. In certain examples, the input streaming encoder 2302 and the input streaming server 2304 are positioned in different locations, such as geographically different locations. For example, the input streaming encoder 2302 is positioned at a conference venue where the conference speech is given, whereas the input streaming server 2304 is positioned in a server room.

In various embodiments, the ASR streaming server 2306 is configured to receive an encoded input stream (e.g., an audio or video stream) from the input streaming server 2304 and/or from the Internet. In some examples, the ASR streaming server 2306 is configured to transcribe an input audio stream, such as in real time, to generate a transcript, and to push the transcript to the transcript Pub Sub server 2308. In various examples, the transcript Pub Sub server 2308 is configured to be subscribed by multiple web apps and/or mobile apps. In certain examples, once a new transcript or a transcript update is generated on the ASR streaming server 2306, the transcript Pub Sub server 2308 is configured to deliver (e.g., push an update) the newly updated or generated transcript to its subscribers (e.g., web apps and/or mobile apps), such as in real time with the input stream (e.g., of a live speech). In some examples, each subscriber (e.g., a web app or a mobile app) is presented on a display apparatus 2310.

Figure 24:
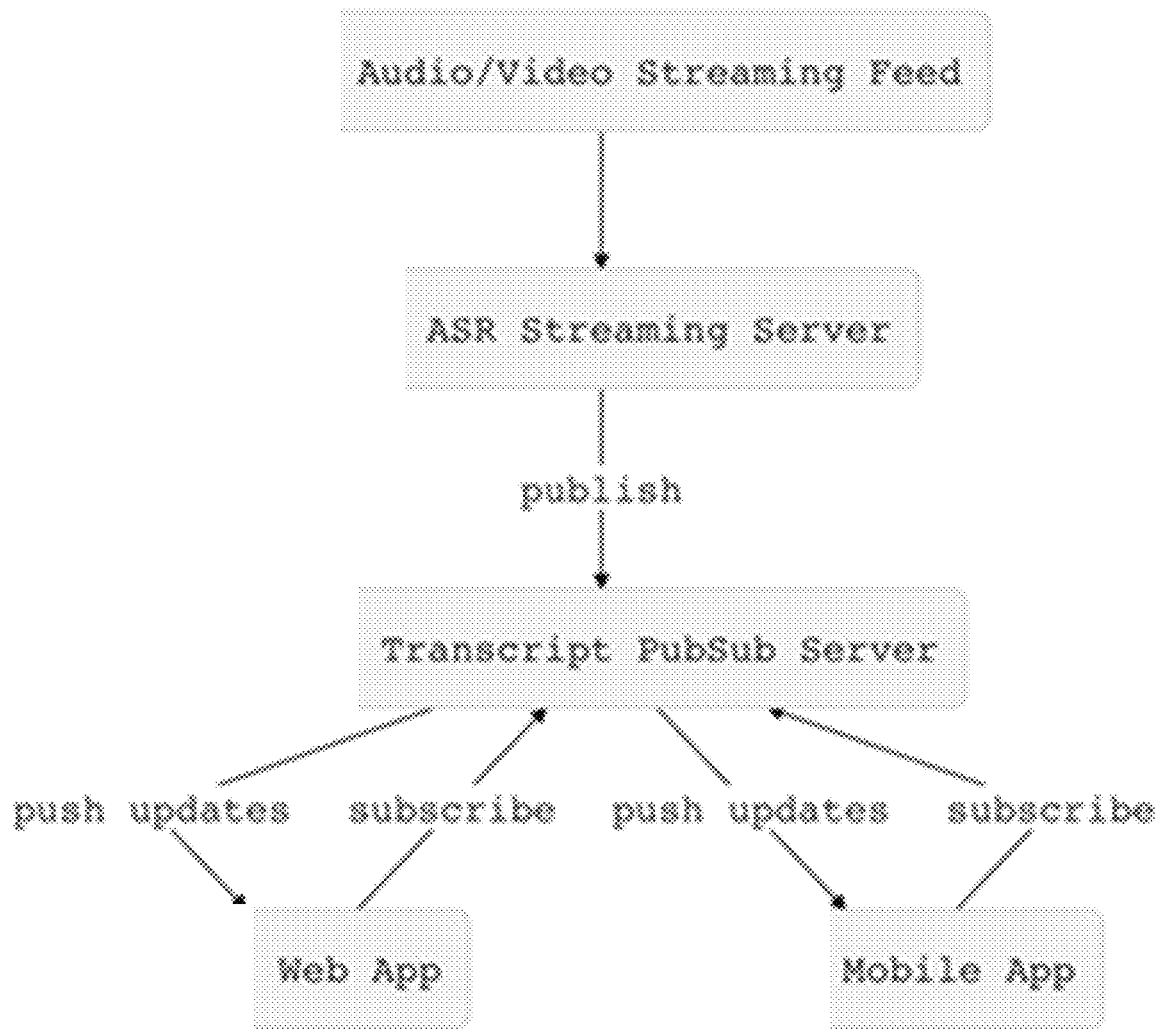
FIG. 24 is a simplified diagram showing a system for processing and broadcasting a moment-associating element, according to some embodiments of the present invention.

FIG. 24 is a simplified diagram showing a system for processing and broadcasting one or more moment-associating elements, according to some embodiments of the present invention. This diagram is merely an example, which should not unduly limit the scope of the claims. One of ordinary skill in the art would recognize many variations, alternatives, and modifications. In some examples, the system includes an ASR streaming server configured to receive a streaming feed and transcript the streaming feed into a transcript update, and a transcript Pub Sub server configured to receive and publish the transcript update to one or more subscribers including a web app and/or a mobile app. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

Figure 25:
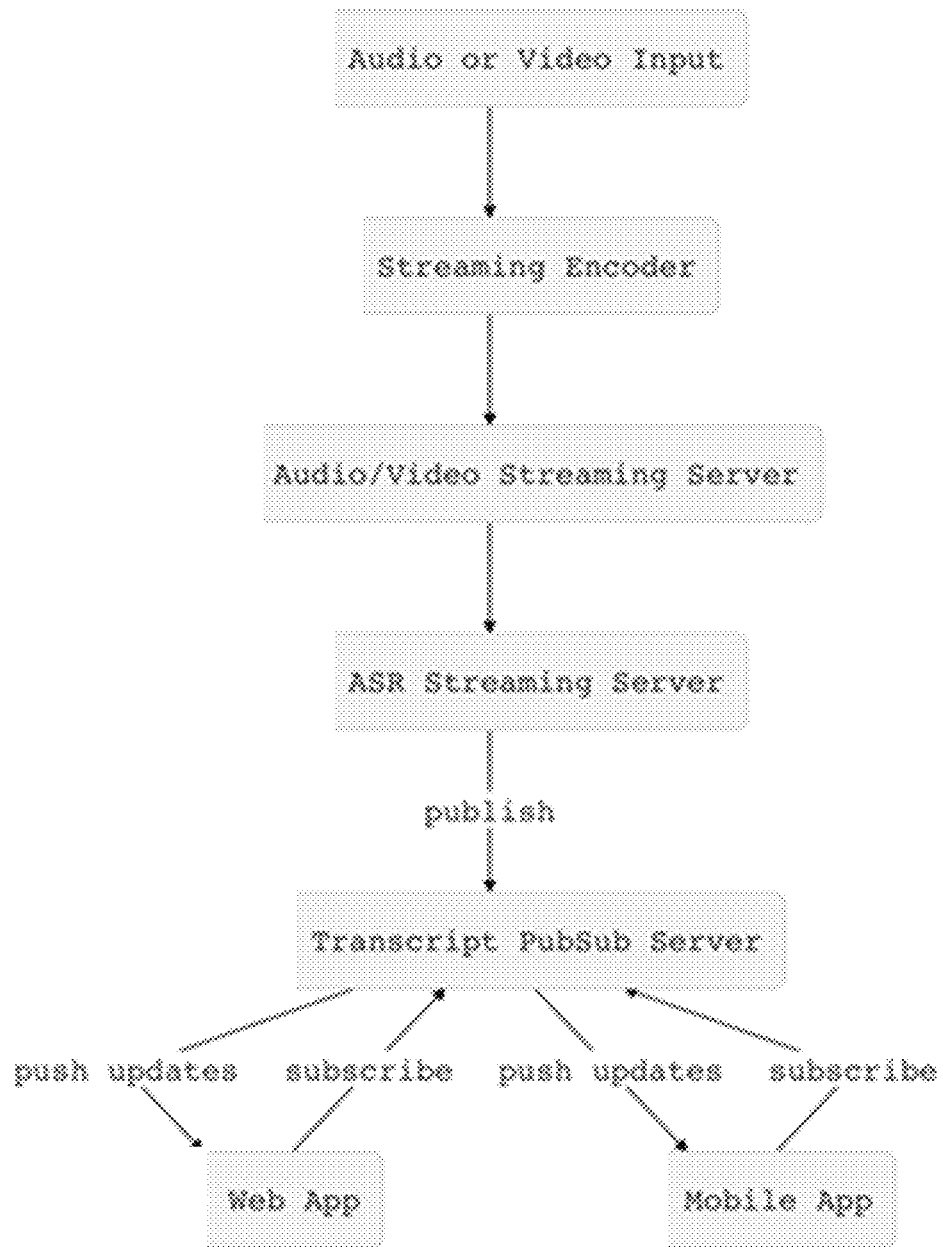
FIG. 25 is a simplified diagram showing a system for processing and broadcasting a moment-associating element, according to some embodiments of the present invention.

FIG. 25 is a simplified diagram showing a system for processing and broadcasting one or more moment-associating elements, according to some embodiments of the present invention. This diagram is merely an example, which should not unduly limit the scope of the claims. One of ordinary skill in the art would recognize many variations, alternatives, and modifications. In some examples, the system includes an ASR streaming server configured to receive a streaming feed and transcript the streaming feed into a transcript update, and a transcript Pub Sub server configured to receive and publish the transcript update to one or more subscribers including a web app and/or a mobile app. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In certain embodiments, a system (e.g., system 1500 and/or system 2300) for processing and broadcasting one or more moment-associating elements is further configured to schedule, such as automatically schedule, a recording based at least in part on a calendar. As an example, the system is configured to receive a conference itinerary as an input which includes scheduling information (e.g., start time, end time, speaker information, speech title) corresponding to one or more speeches, and to automatically schedule a recording for each speech of the one or more speeches. In certain examples, the system is configured to indicate, such as automatically indicate, a broadcasting status based at least in part on the scheduling information. For example, the system is configured to show whether a broadcast is live or in a break. In some examples, the system is configured to hide, such as automatically hide, finished (e.g., played) sections of the broadcast. In various examples, the system is configured to stop, such as automatically stop, and resume, such as automatically resume, broadcasting based at least in part on the scheduling information. In some examples, the system is configured to start and stop recording conversations (e.g., personal conversations) based at least in part on a synced calendar system (e.g., Google calendar, Apple calendar, or Microsoft calendar). In various examples, the system is configured to keep a recording in its entirety and/or to crop, such as automatically crop, a recording into multiple segments. As an example, the system is configured to segment a conference recording including multiple speeches into multiple speech segments, each speech segment containing a speech. In various examples, the system is configured to receive a listing of attendees and/or attendee information from a synced calendar system, such as for a personal conversation and/or for a professional conversation.

In certain embodiments, a system (e.g., system 1500 and/or system 2300) for processing and broadcasting one or more moment-associating elements is further configured to incorporate domain information to generate the transcript (e.g., of higher accuracy). For example, the system is configured to crawl, such as automatically crawl, related websites based on the speaker name, the speech title, the company associated with the speaker, and/or the area of the conferences. In various examples, a custom language model for the streaming ASR server (e.g., streaming ASR server 1504 and/or streaming ASR server 2306) is configured to be previously trained based at least in part on the domain information (e.g., obtained by crawling). In some examples, crawling is performed using a bot for data scraping. In various examples, the system is configured to receive, such as from a conference organizer, custom vocabulary of special terms, acronyms, and/or human names, and to integrate the custom vocabulary into the custom language model. In certain examples, the system is configured to select, such as automatically determine, a location information associated with the transcript based at least in part on a location information of the acquisition apparatus. As an example, the location information of the acquisition apparatus is recorded by a client (e.g., a mobile app or a web app). In some examples, the system is configured to receive one or more points of interest corresponding to the location information and to determine, such as automatically determine, a language model based at least in part on the one or more points of interest.

In certain embodiments, a system (e.g., system 1500 and/or system 2300) for processing and broadcasting one or more moment-associating elements is further configured to receive social information corresponding to one or more participants of a conversation that is to be recorded or has been recorded by the system. For example, the one or more participants includes a speaker or an attendee or a conference event. In some examples, the system is configured to receive social information via one or more social networks (e.g., LinkedIn, Facebook, Twitter), such as from an event page or a profile page. In certain examples, the social information includes company information, industry information, school information, participant information, and/or location information. In various examples, the system is configured to build (e.g., generate) a custom language model based at least in part on the social information. In various embodiments, the system is configured to identify context of speech and generate transcript update based at least in part on the identified context of speech, such as in real time. In certain examples, the system is configured to generate a transcript revision including one or more corrections (e.g., including a word, a phrase, a punctuation) applied to a previously generated transcript. In some examples, the system is configured to render (e.g., generate and publish) transcript in real time, such as starting at the beginning of a recording. In various examples, the system is configured to identify, using newly recorded information as the recording length increases, context of speech with improved language accuracy, and to generate the transcript revision based at least in part on the more accurate context of speech.

In certain embodiments, a system (e.g., system 1500 and/or system 2300) for processing and broadcasting one or more moment-associating elements is further configured to perform, such as automatically perform, diarization for a speech (e.g., in real time) and identify, such as automatically identify, one or more speaker names (e.g., based on previously obtained speaker profiles) associated with one or more speakers. In some examples, the system is configured to identify, such as automatically identify, a speaker change time point corresponding when the speaker of a speech changed from a first speaker to a second speaker, such as during a conversation. In various examples, the system is configured to modify the speaker change time point, such as via a metadata update (e.g., accompanying each transcript update), as the recording length increases. In certain examples, the system is configured to, such as once the system identifies a speaker change time point, identify a speech segment based at least in part on the speaker change time point. In some examples, a speech segment is a bubble including a start time and an end time. In various examples, the system is configured to automatically label the bubble with a speaker name (e.g., based at least in part on a best match with previously obtained speaker profiles). In some embodiments, a speaker profile includes an acoustic signature and a language signature of the speaker.

Figure 26:
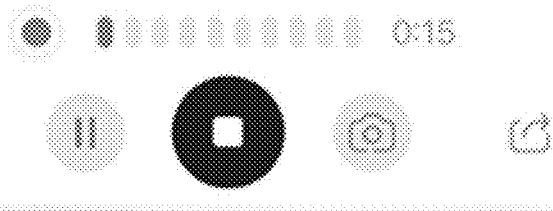
FIG. 26 shows a live recording page, according to some embodiments of the present invention.

FIG. 26 shows a live recording page (e.g., of a meeting), according to some embodiments. In some examples, FIG. 26 shows a page (e.g., of a mobile app or web app) when a conversation (e.g., a meeting) is being recorded (e.g., by a user of a client). In certain examples, the live recording page (e.g., of a mobile app) is configured to present a live transcript in real time. In various examples, the live transcript includes a time stamp, transcript text, capitalization, and punctuation. In certain embodiments, the transcript is segmented into bubbles based on speaker identification and/or conditions such as silence pause or semantic reasons.

Figure 27:
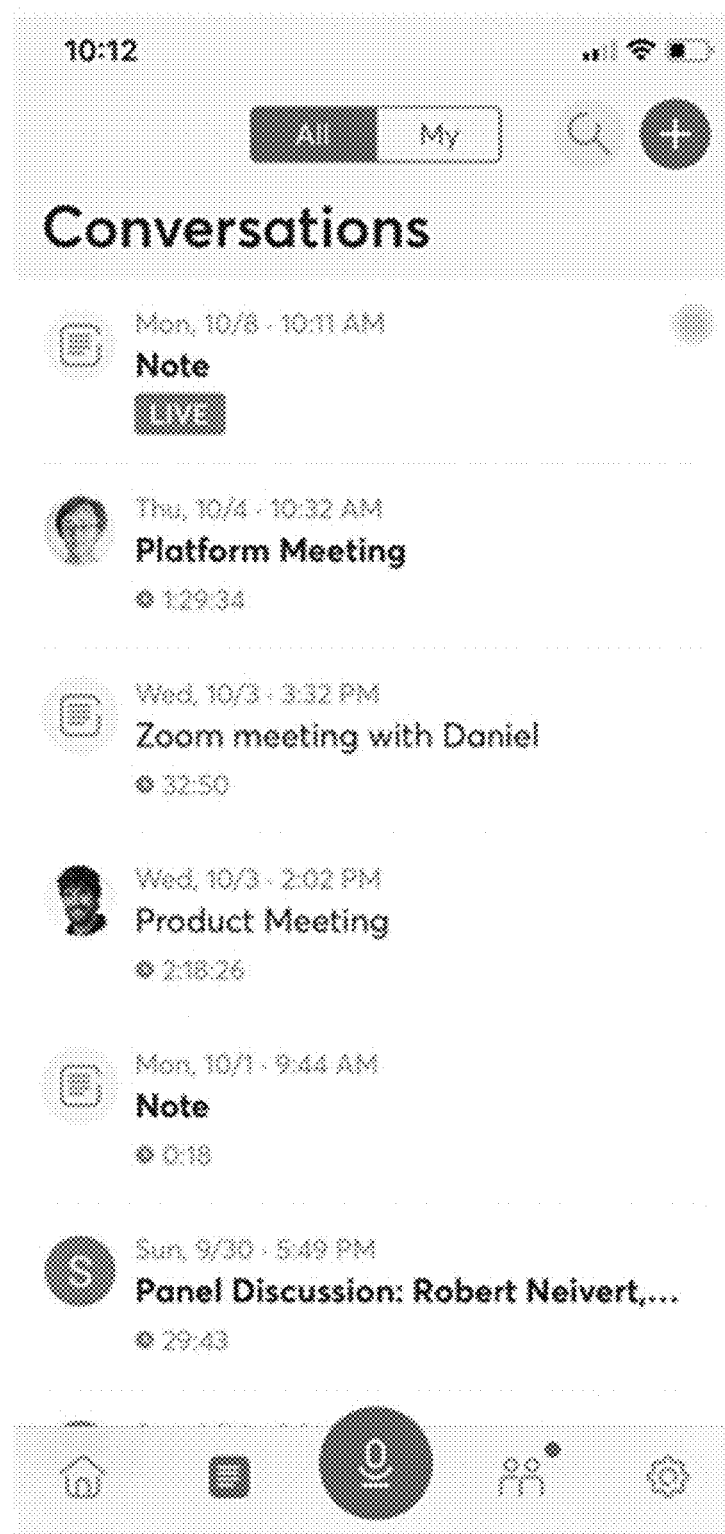
FIG. 27 shows a listing page, according to some embodiments of the present invention.

FIG. 27 shows a listing page (e.g., of a client and/or of a subscriber), according to some embodiments. In some examples, the listing page shows a speech shared by a recording user (e.g., of a client) to a non-recording user, such as a subscriber. For example, the listing page shows when a recording user is capturing a speech and sharing the speech, such as via a PubSub server (e.g., the ASR streaming server), to one or more subscribers. In certain examples, once a subscriber (e.g., a user other than the recording user) receives the shared speech, the listing page provides the subscriber a speech status of the shared speech (e.g., lively broadcasted).

Figure 28:
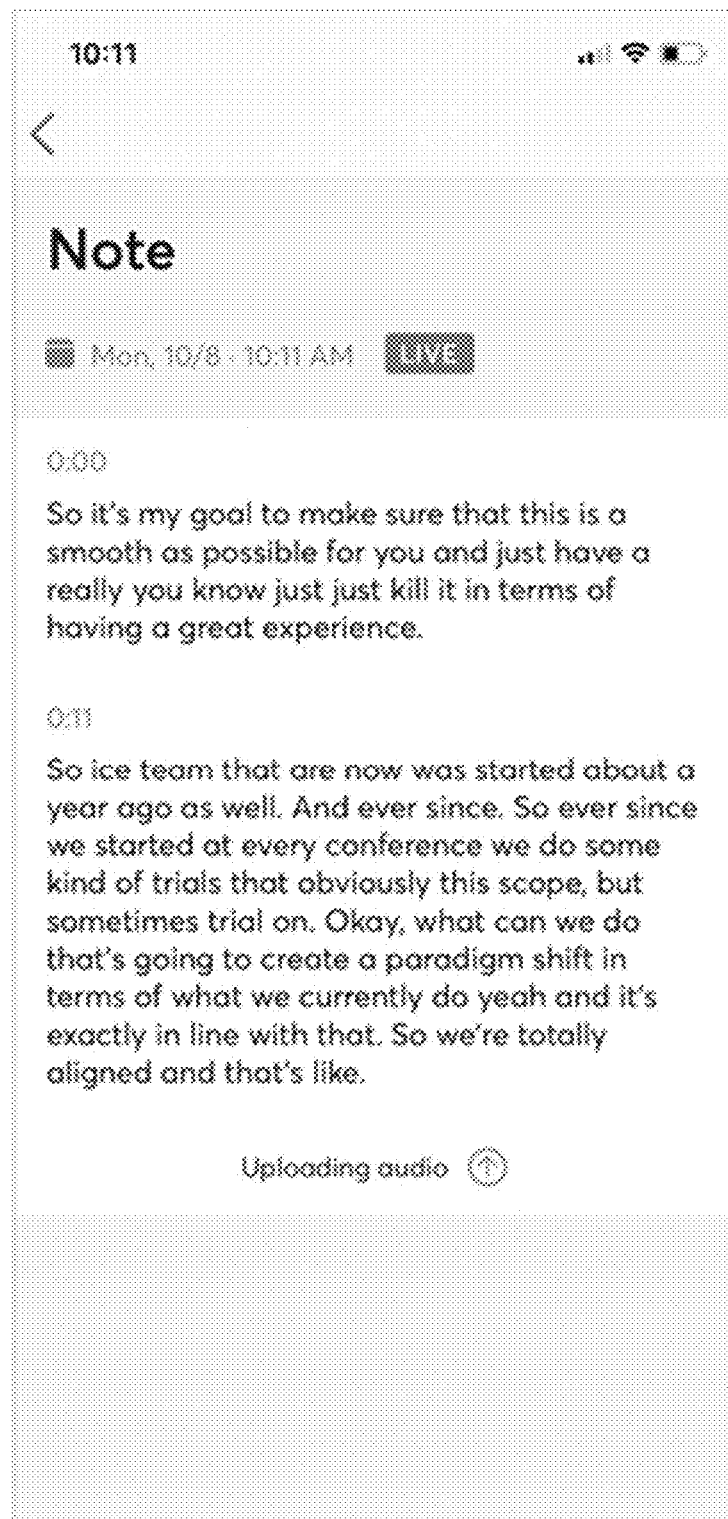
FIG. 28 shows a content page, according to some embodiments of the present invention.

FIG. 28 shows a content page (e.g., of a live recording), according to some embodiments. In various examples, the content page shows a live broadcasting transcript to a subscriber. In certain embodiments, once a user (e.g., of a subscriber) opens a shared speech, the content page shows the user the transcript of the shared speech speech with continuous or intermittent transcript updates (e.g., including new text or revision text) of the shared speech. In some examples, the content page shows the subscriber a lively broadcasted transcript, such as a transcript having speech bubbles, timestamps, texts, capitalizations, and punctuations.

In some embodiments, a system (e.g., system 1500 and/or system 2300) for processing and broadcasting one or more moment-associating elements is further configured to present a real-time transcript for a conference speech on a large screen or a projector. In certain examples, the system is configured to present the transcript in real time. In some examples, such as based at least in part on improved context identified as more audio data is processed, the system is configured to generate a transcript update including one or more corrections to correct a previously generated transcript. In certain examples, the system is configured to be implemented, such as by a public group (e.g., on a mobile app), for use at a conference to, for example, broadcast one or more speeches to one or more subscribers. For example, the system is configured to present lively broadcasted sessions to the one or more subscribers. In some embodiments, the system is configured to present recorded and/or transcribed speeches of a group to one or more subscribers, such as on-demand. In various examples, the system is configured to present multiple sections of a speech (e.g., a continuous liver speech), conversation, or recording with a session title and/or speaker information for each section.

In various embodiments, a computer-implemented method for processing and broadcasting one or more moment-associating elements includes: granting subscription permission to one or more subscribers; receiving the one or more moment-associating elements; transforming the one or more moment-associating elements into one or more pieces of moment-associating information; and transmitting at least one piece of the one or more pieces of moment-associating information to the one or more subscribers. In certain examples, the transforming the one or more moment-associating elements into one or more pieces of moment-associating information includes: segmenting the one or more moment-associating elements into a plurality of moment-associating segments; assigning a segment speaker for each segment of the plurality of moment-associating segments; transcribing the plurality of moment-associating segments into a plurality of transcribed segments; and generating the one or more pieces of moment-associating information based at least in part on the plurality of transcribed segments and the segment speaker assigned for each segment of the plurality of moment-associating segments. In some examples, the computer-implemented method is implemented by or implemented according to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, and/or FIG. 25.

In some embodiments, the computer-implemented method further includes receiving event information associated with an event. In certain examples, the event information includes one or more speaker names; one or more speech titles; one or more starting times; one or more end times; a custom vocabulary; location information; and/or attendee information. In certain examples, the transforming the one or more moment-associating elements into one or more pieces of moment-associating information includes transforming the one or more moment-associating elements into one or more pieces of moment-associating information based at least in part on the event information.

In some embodiments, the computer-implemented method further includes connecting with one or more calendar systems containing the event information; and receiving the event information from the one or more calendar systems.

In some embodiments, transforming the one or more moment-associating elements into one or more pieces of moment-associating information based at least in part on the event information includes: creating a custom language model based at least in part on the event information; and transcribing the plurality of moment-associating segments into a plurality of transcribed segments based at least in part on the custom language model.

In some embodiments, receiving the one or more moment-associating elements includes assigning a timestamp associated with each element of the one or more moment-associating elements.

In some embodiments, receiving the one or more moment-associating elements includes receiving one or more audio elements, receiving one or more visual elements, and/or receiving one or more environmental elements.

In some embodiments, receiving one or more audio elements includes receiving one or more voice elements of one or more voice-generating sources and/or receiving one or more ambient sound elements.

In some embodiments, receiving one or more visual elements includes receiving one or more pictures, receiving one or more images, receiving one or more screenshots, receiving one or more video frames, receiving one or more projections, and/or receiving one or more holograms.

In some embodiments, receiving one or more environmental elements includes receiving one or more global positions, receiving one or more location types, and/or receiving one or more moment conditions.

In some embodiments, receiving one or more environmental elements includes receiving a longitude, receiving a latitude, receiving an altitude, receiving a country, receiving a city, receiving a street, receiving a location type, receiving a temperature, receiving a humidity, receiving a movement, receiving a velocity of a movement, receiving a direction of a movement, receiving an ambient noise level, and/or receiving one or more echo properties.

In some embodiments, transforming the one or more moment-associating elements into one or more pieces of moment-associating information includes: segmenting the one or more audio elements into a plurality of audio segments; assigning a segment speaker for each segment of the plurality of audio segments; transcribing the plurality of audio segments into a plurality of text segments; and generating the one or more pieces of moment-associating information based at least in part on the plurality of text segments and the segment speaker assigned for each segment of the plurality of audio segments.

In some embodiments, transcribing the plurality of audio segments into a plurality of text segments includes transcribing two or more segments of the plurality of audio segments in conjunction with each other.

In some embodiments, the computer-implemented method further includes receiving one or more voice elements of one or more voice-generating sources; and receiving one or more voiceprints corresponding to the one or more voice-generating sources respectively.

In some embodiments, transforming the one or more moment-associating elements into one or more pieces of moment-associating information further includes segmenting the one or more moment-associating elements into the plurality of moment-associating segments based at least in part on the one or more voiceprints; assigning a segment speaker for each segment of the plurality of moment-associating segments based at least in part on the one or more voiceprints; and transcribing the plurality of moment-associating segments into the plurality of transcribed segments based at least in part on the one or more voiceprints.

In some embodiments, receiving one or more voiceprints corresponding to the one or more voice-generating sources respectively includes at least one of: receiving one or more acoustic models corresponding to the one or more voice-generating sources respectively; and receiving one or more language models corresponding to the one or more voice-generating sources respectively.

In some embodiments, transcribing the plurality of moment-associating segments into a plurality of transcribed segments includes: transcribing a first segment of the plurality of moment-associating segments into a first transcribed segment of the plurality of transcribed segments; transcribing a second segment of the plurality of moment-associating segments into a second transcribed segment of the plurality of transcribed segments; and correcting the first transcribed segment based at least in part on the second transcribed segment.

In some embodiments, segmenting the one or more moment-associating elements into a plurality of moment-associating segments includes: determining one or more speaker-change timestamps, each timestamp of the one or more speaker-change timestamps corresponding to a timestamp when a speaker change occurs; determining one or more sentence-change timestamps, each timestamp of the one or more sentence-change timestamps corresponding to a timestamp when a sentence change occurs; and/or determining one or more topic-change timestamps, each timestamp of the one or more topic-change timestamps corresponding to a timestamp when a topic change occurs.

In some embodiments, segmenting the one or more moment-associating elements into a plurality of moment-associating segments is performed based at least in part on the one or more speaker-change timestamps; the one or more sentence-change timestamps; and/or the one or more topic-change timestamps.

In various embodiments, a system for processing and broadcasting one or more moment-associating elements includes: a permission module configured to grant subscription permission to one or more subscribers; a receiving module configured to receive the one or more moment-associating elements; a transforming module configured to transform the one or more moment-associating elements into one or more pieces of moment-associating information; and a transmitting module configured to transmit at least one piece of the one or more pieces of moment-associating information to the one or more subscribers. In certain examples, the transforming module is further configured to: segment the one or more moment-associating elements into a plurality of moment-associating segments; assign a segment speaker for each segment of the plurality of moment-associating segments; transcribe the plurality of moment-associating segments into a plurality of transcribed segments; and generate the one or more pieces of moment-associating information based at least in part on the plurality of transcribed segments and the segment speaker assigned for each segment of the plurality of moment-associating segments. In some examples, the system is configured similar to or configured to implement one of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, and/or FIG. 25.

In various embodiments, a non-transitory computer-readable medium with instructions stored thereon, that when executed by a processor, perform the processes including granting subscription permission to one or more subscribers; receiving the one or more moment-associating elements; transforming the one or more moment-associating elements into one or more pieces of moment-associating information; and transmitting at least one piece of the one or more pieces of moment-associating information to the one or more subscribers. In certain examples, transforming the one or more moment-associating elements into one or more pieces of moment-associating information includes: segmenting the one or more moment-associating elements into a plurality of moment-associating segments; assigning a segment speaker for each segment of the plurality of moment-associating segments; transcribing the plurality of moment-associating segments into a plurality of transcribed segments; and generating the one or more pieces of moment-associating information based at least in part on the plurality of transcribed segments and the segment speaker assigned for each segment of the plurality of moment-associating segments. In some examples, the non-transitory computer-readable medium, when executed, perform one or more processes described in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, and/or FIG. 25.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A computer-implemented method for processing and broadcasting one or more moment-associating elements, the method comprising:
connecting with one or more calendar systems containing event information associated with an event;
receiving the event information from the one or more calendar systems, the event information including one or more speaker names associated with one or more speakers, one or more speech titles, one or more starting times, one or more end times, a custom vocabulary, location information, and attendee information associated with one or more attendees;
receiving one or more voiceprints corresponding to one or more voice-generating sources respectively;
granting subscription permission to one or more subscribers;
receiving the one or more moment-associating elements, the one or more moment-associating elements including one or more voice elements of the one or more voice-generating sources;
transforming the one or more moment-associating elements into one or more pieces of moment-associating information based at least in part on the one or more voiceprints and the event information; and transmitting at least one piece of the one or more pieces of moment-associating information to the one or more subscribers;

wherein the transforming the one or more moment-associating elements into one or more pieces of moment-associating information based at least in part on the one or more voiceprints and the event information includes:

segmenting the one or more moment-associating elements into a plurality of moment-associating segments based at least in part on the one or more voiceprints;

assigning a segment speaker for each segment of the plurality of moment-associating segments based at least in part on the one or more voiceprints;

creating a custom language model based at least in part on the event information;

transcribing the plurality of moment-associating segments into a plurality of transcribed segments based at least in part on the custom language model and the one or more voiceprints; and generating the one or more pieces of moment-associating information based at least in part on the plurality of transcribed segments and the segment speaker assigned for each segment of the plurality of moment-associating segments;

wherein the creating a custom language model based at least in part on the event information includes:

determining the language model based at least in part on one or more points of interest corresponding to the location information;

building the custom language model based at least in part on social information corresponding to the one or more speakers and the one or more attendees; and integrating the custom vocabulary into the custom language model.

2. The computer-implemented method of claim 1 wherein the social information includes company information, industry information, and school information.

3. The computer-implemented method of claim 1 wherein the creating a custom language model based at least in part on the event information includes:

receiving the social information via one or more social networks.

4. The computer-implemented method of claim 3 wherein the receiving the social information via one or more social networks includes:

receiving the social information from an event page or a profile page.

5. The computer-implemented method of claim 1 wherein the receiving the one or more moment-associating elements includes assigning a timestamp associated with each element of the one or more moment-associating elements.

6. The computer-implemented method of claim 1 wherein the receiving the one or more moment-associating elements includes at least one selected from a group consisting of receiving one or more ambient sound elements, receiving one or more visual elements, and receiving one or more environmental elements.

7. The computer-implemented method of claim 6 wherein the receiving one or more visual elements includes at least one selected from a group consisting of receiving one or more pictures, receiving one or more images, receiving one or more screenshots, receiving one or more video frames, receiving one or more projections, and receiving one or more holograms.

8. The computer-implemented method of claim 6 wherein the receiving one or more environmental elements includes at least one selected from a group consisting of receiving one or more global positions, receiving one or more location types, and receiving one or more moment conditions.

9. The computer-implemented method of claim 8 wherein each global position of the one or more global positions is represented by at least one selected from a group consisting of a longitude, a latitude, an altitude, a country, a city, and a street.

10. The computer-implemented method of claim 8 wherein each location type of the one or more location types is represented by at least one selected from a group consisting of home, office, school, coffee shop, indoor, and outdoor.

11. The computer-implemented method of claim 8 wherein each moment condition of the one or more moment conditions is represented by at least one selected from a group consisting of a temperature, a humidity, a movement, a velocity, a direction, an ambient noise level, and an echo property.

12. The computer-implemented method of claim 1 wherein the transcribing the plurality of moment-associating segments into a plurality of transcribed segments based at least in part on the custom language model and the one or more voiceprints includes:

transcribing a first segment of the plurality of moment-associating segments into a first transcribed segment of the plurality of transcribed segments;

transcribing a second segment of the plurality of moment-associating segments into a second transcribed segment of the plurality of transcribed segments; and correcting the first transcribed segment based at least in part on the second transcribed segment.

13. The computer-implemented method of claim 1 wherein the segmenting the one or more moment-associating elements into a plurality of moment-associating segments based at least in part on the one or more voiceprints includes:

determining one or more speaker-change timestamps, each timestamp of the one or more speaker-change timestamps corresponding to a timestamp when a speaker change occurs;

determining one or more sentence-change timestamps, each timestamp of the one or more sentence-change timestamps corresponding to a timestamp when a sentence change occurs; and determining one or more topic-change timestamps, each timestamp of the one or more topic-change timestamps corresponding to a timestamp when a topic change occurs.

14. The computer-implemented method of claim 13 wherein the segmenting the one or more moment-associating elements into a plurality of moment-associating segments is performed based on at least one selected from a group consisting of the one or more speaker-change timestamps, the one or more sentence-change timestamps, and the one or more topic-change timestamps.

15. A non-transitory computer-readable medium with instructions stored thereon, that when executed by a processor, perform the processes comprising:

connecting with one or more calendar systems containing event information associated with an event;

receiving the event information from the one or more calendar systems, the event information including one or more speaker names associated with one or more speakers, one or more speech titles, one or more starting times, one or more end times, a custom vocabulary, location information, and attendee information associated with one or more attendees;

receiving one or more voiceprints corresponding to one or more voice-generating sources respectively;

granting subscription permission to one or more subscribers;

receiving the one or more moment-associating elements, the one or more moment-associating elements including one or more voice elements of the one or more voice-generating sources;

transforming the one or more moment-associating elements into one or more pieces of moment-associating information based at least in part on the one or more voiceprints and the event information; and transmitting at least one piece of the one or more pieces of moment-associating information to the one or more subscribers;

wherein the transforming the one or more moment-associating elements into one or more pieces of moment-associating information based at least in part on the one or more voiceprints and the event information includes:

segmenting the one or more moment-associating elements into a plurality of moment-associating segments based at least in part on the one or more voiceprints;

assigning a segment speaker for each segment of the plurality of moment-associating segments based at least in part on the one or more voiceprints;

creating a custom language model based at least in part on the event information;

transcribing the plurality of moment-associating segments into a plurality of transcribed segments based at least in part on the custom language model and the one or more voiceprints; and generating the one or more pieces of moment-associating information based at least in part on the plurality of transcribed segments and the segment speaker assigned for each segment of the plurality of moment-associating segments;

wherein the creating a custom language model based at least in part on the event information includes:

determining the language model based at least in part on one or more points of interest corresponding to the location information;

building the custom language model based at least in part on social information corresponding to the one or more speakers and the one or more attendees; and integrating the custom vocabulary into the custom language model.

\* \* \* \* \*